United States Patent [19]

Frantz et al.

[11] Patent Number: 4,507,750
[45] Date of Patent: Mar. 26, 1985

[54] ELECTRONIC APPARATUS FROM A HOST LANGUAGE

[75] Inventors: Gene A. Frantz; Kun-Shan Lin, both of Lubbock, Tex.

[73] Assignee: Texas Instruments Incorporated, Dallas, Tex.

[21] Appl. No.: 377,734

[22] Filed: May 13, 1982

[51] Int. Cl.³ ............................................. G06F 15/38
[52] U.S. Cl. ................................. 364/900; 364/513.5; 364/419; 381/41
[58] Field of Search ............. 364/419, 900, 513, 513.5; 381/41, 49, 42, 50, 43, 51, 44, 52, 45, 53, 46, 47, 48

[56] References Cited

U.S. PATENT DOCUMENTS

| | | | |
|---|---|---|---|
| 4,211,892 | 7/1980 | Tanimoto et al. | 364/513.5 |
| 4,282,403 | 8/1981 | Sakoe | 364/513.5 |
| 4,363,102 | 12/1982 | Holmgren et al. | 381/42 |
| 4,373,192 | 2/1983 | Yanagiuchi et al. | 364/900 |
| 4,412,098 | 10/1983 | An | 364/513.5 |
| 4,412,305 | 10/1983 | Yoshida | 364/900 |

FOREIGN PATENT DOCUMENTS 2014765  8/1979  United Kingdom ................ 364/900

OTHER PUBLICATIONS

Rabiner, Lawrence et al., "Isolated and Connected Word Recognition-Theory and Selected Applications", IEEE Trans. Comm., vol. COM-29, No. 5, May 1981, pp. 621-659.

Primary Examiner—Jerry Smith
Assistant Examiner—Michael R. Fleming
Attorney, Agent, or Firm—William E. Hiller; James T. Comfort; Melvin Sharp

[57] ABSTRACT

An electronic apparatus for translation from a host language to a non-host language in which the individual word is evaluated as to its contextual meaning. The sequence of words, typically a sentence, within the host language, which is communicated to the electronic apparatus is translated, through a recognition device into a series of recognized words. These recognized words are further refined through analysis of their contextual meaning within the sequence (sentence) so as to differentiate between words of similar pronunciation and between homonyms. The present invention permits the direct entry, from voice, to a translator to a foreign language or alternatively to control language for use with an electronic or electromechanical apparatus.

12 Claims, 73 Drawing Figures

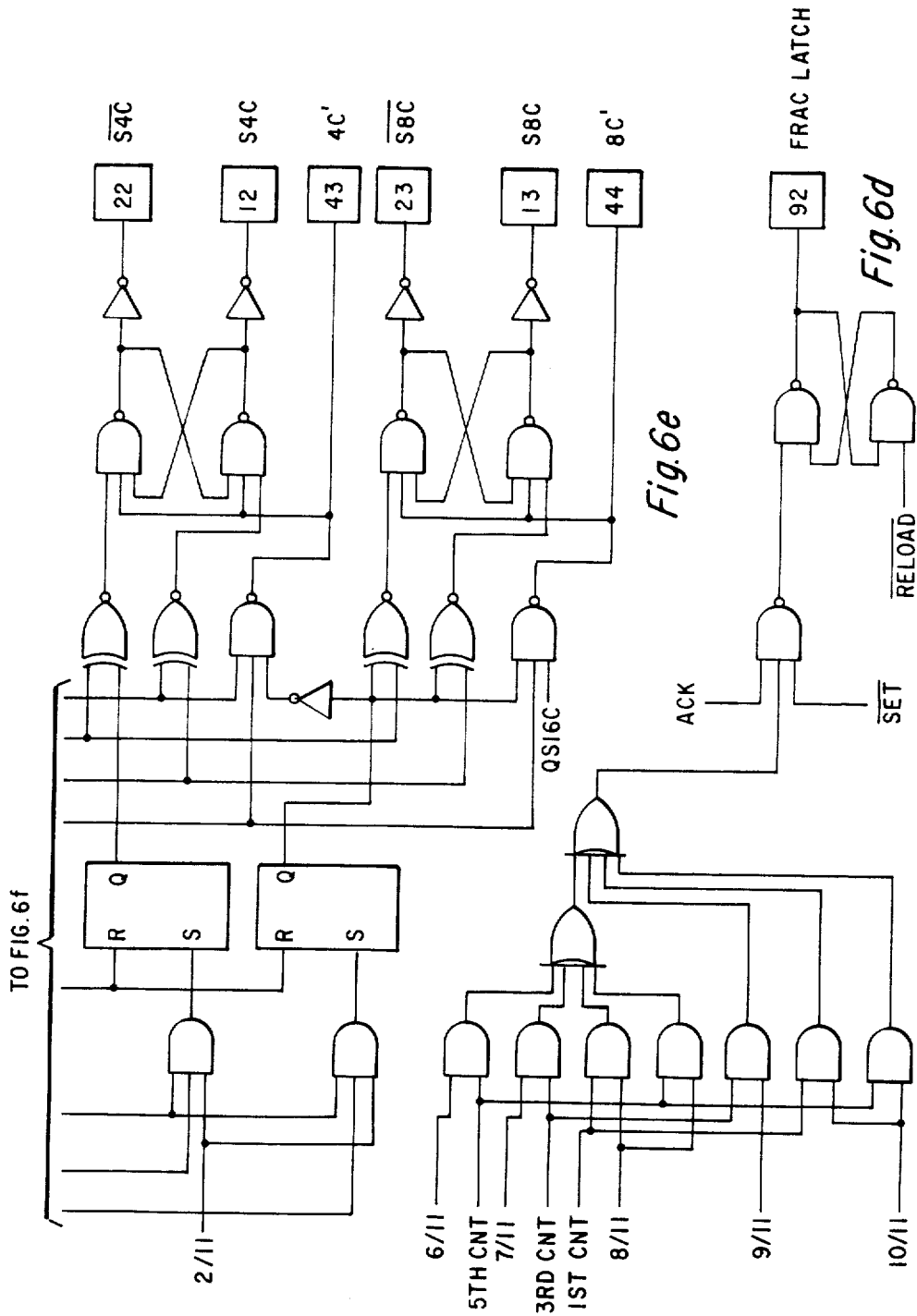

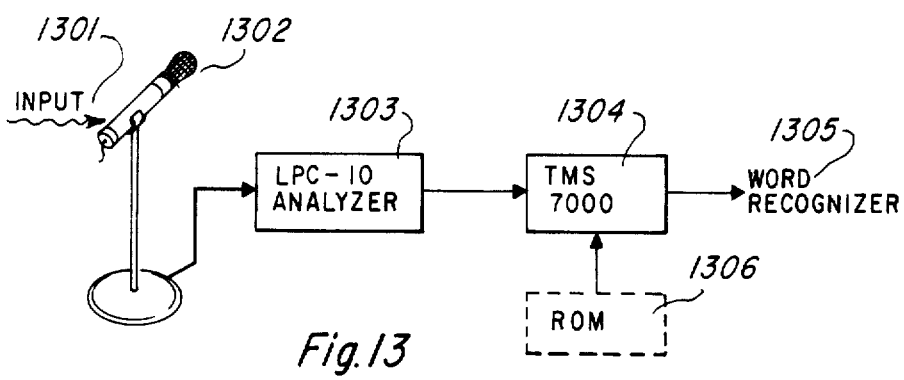

STAGE (Σ)

ITERATION 1

| WORD NO. | 1 | 2 | 3 | 4 | 5 |
|---|---|---|---|---|---|
| 1 | 0.5 *1609* | | | | |
| *1601* 2 | 0 *1602* | 1.0 *1603* | | | |
| 3 | 3.0 | | | | |
| 4 | 1.0 | | | | |
| 5 | 3.0 | | | | |

*Fig.16a*

ITERATION 2

| | 1 | 2 | 3 | 4 | 5 |
|---|---|---|---|---|---|
| 1 | 0.5 | 0.5 | 1.0 | 3.0 *1604* | |
| *1601* 2 | 0 | 1.0 *1603* | | | |
| 3 | 3.0 | | | | |
| 4 | 1.0 | | | | |
| 5 | 3.0 | | | | |

*Fig.16b*

ITERATION 3

| | 1 | 2 | 3 | 4 | 5 |
|---|---|---|---|---|---|
| 1 | 0.5 | 0.5 | 1.0 | 3.0 | *1605* |
| 2 | 0 *1607* | 1.0 | 1.5 | 3.5 | |
| *1606* 3 | 3.0 | | | | |
| 4 | 1.0 | | | | |
| 5 | 3.0 | | | | |

*Fig.16c*

ITERATION 4

| | 1 | 2 | 3 | 4 | 5 |
|---|---|---|---|---|---|
| 1 | 0.5 | 0.5 | 1.0 | 3.0 | |
| 2 | 0 | 1.0 | 1.5 | 3.5 | |
| 3 | 3.0 | | | | |
| 4 | 1.0 | 1.5 | 2.0 | 2.5 | 2.5 *1608* ← BEST MATCH |
| 5 | 3.0 | | | | |

*Fig.16d*

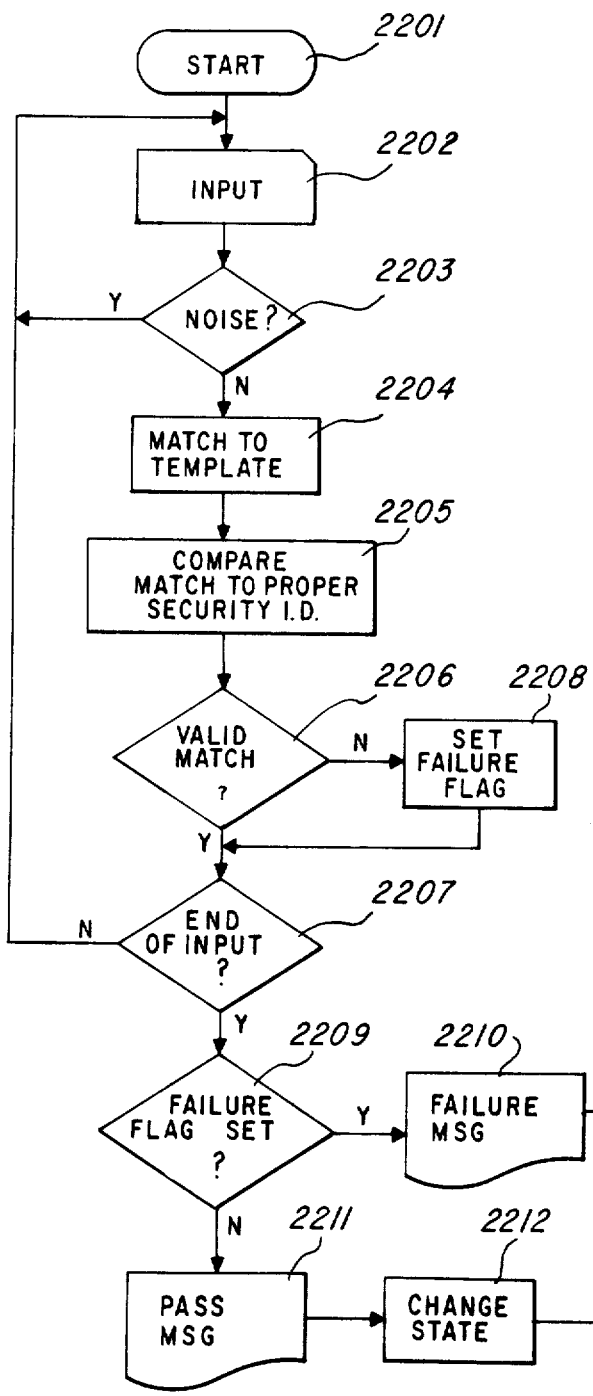
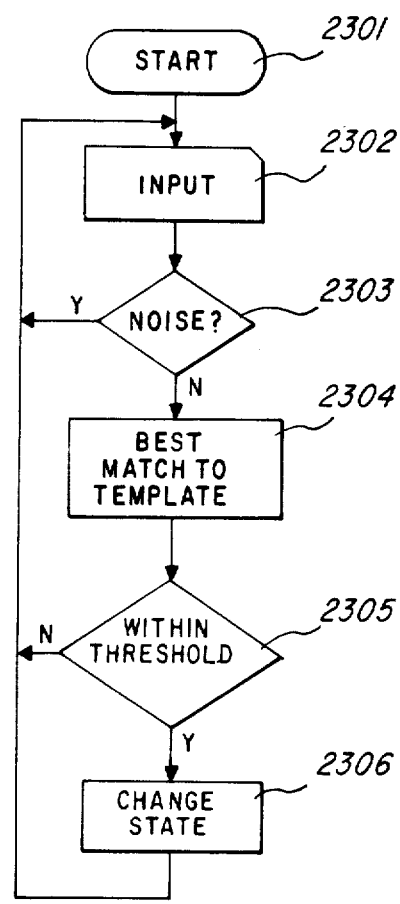
Fig. 22
Fig. 23

4,507,750

ELECTRONIC APPARATUS FROM A HOST LANGUAGE

BACKGROUND

The present invention relates generally to speech recognition and more particularly to contextual speech recognition.

As technology has advanced from the controlled areas in which only technical users interface with machines to the office and home use, it has become increasingly important to develop a friendly interface between man and machine. Speech synthesis has provided ease of communicating from the machine to the man in a friendly manner. It has remained difficult, or impossible, for the man to operate in a natural human language and have proper machine recognition.

Typically, speech recognition isolates particular words which may be recognized. This repertoire of recognition is almost universally limited to a few words which the machine is capable of understanding. As the repertoire of the machine is limited, so is its applicability to many situations. The user upon attempting to interface with the machine, when he finds it unable to understand the spoken word, is frustrated and tends to avoid interaction with the machine. This alienation of the user prevents the electronic apparatus from properly providing the aid and assistance for which it was designed.

Recognition of the meaning of spoken words has remained a perplexing problem due to cultural, geographic, and physical differences between speakers. A good tutorial article on speech recognition is "Isolated and Connected Word Recognition-Theory and Selected Applications" by Lawrence Rabiner and Stephen E. Levinson in *IEEE Trans. Comm.*, Vol Com-29, No. 5, May 1981, pages 621–659. The Rabiner et al article though remains in the theoretical stage and does not allow for the meaning of words to flow past the recognition stage.

The necessity to go to a limited repertoire has been created in part by an inability on the part of technology to be fully comfortable with the myriad of variations available in the human language. Besides the variations available, many thoughts are communicated which are literal translations; or, similar words or homonyms tend to confuse the electronic apparatus.

Word for word translation alone is insufficient to provide proper interfacing.

SUMMARY OF THE INVENTION

The present invention stores a plurality of template data in the host language which is used to match with the operator spoken sequence of words (typically a sentence). This match is also made in conjunction with the particular order of the sequence and other grammatical rules.

In this fashion, the proper contextual meaning of the sentence or phrase in the host language is properly translated to the non-host language.

In this context, the use of the phrase "non-host" is used to mean either a translation to a foreign human language or to another language suitable for use in interfacing with an electronic or an electromechanical apparatus.

It is clear from the foregoing that the contextual consideration for evaluating the word being spoken is highly important so as to properly encode into the non-host language. The human language is far to complex too allow word to word translations. For example, the operator input of "The two dogs are red". In a word to word translation is confusingly similar to the phrase "The to dogs are read".

In the present invention, the words "two" and "red" are analyzed as to their proper position within the sentence so as to determine what each word contextually means. That is, the word "two" is not interpreted as being either "to" (a preposition) or "too" (an adverb) since contextually these alternatives do not exist for the input as given (requiring an adjective). In similar fashion, the noun "red" is not confused with the verb "read".

Besides handling homonym confusion, one embodiment of the invention studies closely sounding words to decide which is correct due to the contextual meaning. In this regard, a word slot within a sequence has a plurality of possibilities, that is more than one template indicative of the word may face within a predetermined threshold. The optimal matching template is not necessarily the word spoken.

For example, assume the operator enunciates the sequence "I will be there at eight". The templates "will" and "well" and the templates "eight" and "gate" are similar enough so as to be confusing solely when attempting a word template match. When taken in context though, even if the template "well" is hypothetically optimal, it is not chosen since it is contextually inconsistent.

It will be appreciated that numerous other grammatical rules exist in which all sequences of words from the operator must fit. These grammatical rules are stored in a memory which is selectively used by the control means together with the template memory in the translation of the input sequence into an analogous sequence in the non-host language.

Hence, once translated into a non-host language, the words have not lost their contextual meaning and therefore are usable in a variety of ways. In the preferred application, the non-host language sequence so derived is used in conjunction with a speech synthesizer for the synthesis of an audible message in a foreign tongue. This provides direct translation from a host language into a foreign language without the need of look-up tables and which provides the retention of the contextual meaning given. The phrase "to the house" is translated from English to the Spanish equivalent of "a la casa" and not to the phrase "dos la casa"; the contextual meaning is retained.

In another embodiment of the invention, the non-host language includes control means for the operation of an electro-mechanical apparatus. This electro-mechanical apparatus includes a typewriter. This embodiment provides for the direct entry of voice commands for the typing of a phrase so that the phrase "to the house" is typed out correctly without the word "to" being confused by the typewriter with the words "two" or "too".

Still another embodiment utilizes the non-host language equivalent for generating a high level computer language equivalent such as Fortran, assembly, etc. This allows spoken words to be translated directly into control instructions.

It is clear from the foregoing that the present invention allows speech recognition to advance far from its current state of the art of word to word translation into contextual retention. This contextual retention allows the speech recognition apparatus of the present invention to progress much farther and to be applicable to more situations than previously used.

The present invention is more clearly explained and defined by the following description of an embodiment thereof and ramifications thereon.

DESCRIPTION

In general, the recognition of an analog or spoken signal entails the translation of the spoken signal into an electronic signal. This is typically done by way of a microphone or other such signal pick up device. This electronic signal is manipulated to be in the proper format for later use. The formatted signal is analyzed so as to develop appropriate data therefrom. This analysis data is used to determine or recognize which word or phrase has been spoken in the original analog input. The recognized word or phrase has an identifying indicia associated therewith which is used for storage, later reference, or control of an apparatus.

In this context, the alteration or change of an operation is as simple as communicating the indicia to an operator or as complex as the control of some other electronic apparatus.

The subheadings used herein are meant only so as to aid the reader and are not meant to be limiting or controlling with respect to the invention. Generally, the contents of each subheading are readily utilized in association with structures described under the other subheadings.

Formatting:

The electronic signal from the microphone or other such pick up means is manipulated so that it is either rectified, multiplied or otherwise structured so as to place it in a better condition for the analysis. This formatting of the electronic signal speeds up the entire operation significantly.

Rectification of the signal is particularly important so as to allow reduced circuitry. In the preferred embodiment of rectification, the incoming signal is communicated to a plurality of capacitors. A sensing means, connected to ground, activates switches so as to tap the node of the capacitors which rectify the incoming signal.

Multiplication is effected in the same circuitry by selectively connecting the capacitors in series (thereby multiplying the signal) or parallel (dividing the signal). This switching operation maintains the signal between two bounds for ease in operating thereon.

The circuitry above is readily implementable on a semiconductor unit such as a metal-oxide-silicon (MOS) device.

Analysis:

The preferred analysis operation passes the formatted electronic signal through an automatic gain control (AGC) then through a low pass filter. In this context, it has been found that a low pass filter of 500 hertz (Hz) is suitable for this operation. The automatic gain control is used as an interface with the analog signal from the microphone. The AGC provides a more or less constant peak output level having a sufficient amplitude so as to drive the low pass filter and other components thereafter.

In this context, it has been found that an AGC having a peak signal level less than 80% of the full voltage and greater than 40% of full voltage provides satisfactory results. Additionally, a total 54 dB of gain reduction and a potential of better than 80 dB total gain is also desirable.

The low pass filter is used to roll off the high frequency components of the signal. The filter preferably provides an antialiasing for a signal so that no high frequency component of the signal overpowers the system sample rate of preferably 8 kHz so as to produce an interference signal. Preferably the cutoff frequency is 3.4 kHz.

The signal from the low pass filter is communicated to a pre-emphasis circuit so as to help eliminate any glottal waveform and lip radiation which may be included within the speech. It has been found that the glottal waveform and lip radiation components of speech interfere dramatically with the vocal tract estimation when using linear predictive coding (LPC) analysis. In this context, it has been found that a pre-emphasis transformation of the formula: $S(n) - uS(n-1)$, where $S(n)$ is the sample at time N and where preferably $0.9 \leq \mu \leq 1.0$ performs suitably. This equation is preferably performed in an analog sample data domain.

The calculation of the autocorrelation terms in LPC analysis requires the computation of numerous multiplications and additions. So as to reduce the time necessary for these computations, a logarithmic analog to digital (Log A/D) converter is utilized which translates the analog signal from the pre-emphasis into its logarithmic digital equivalent. This allows the logarithmic digital equivalent sequence to be selectively added to other logarithmic digital equivalents so as to effectively perform a "logarithmic multiplication". The logarithmic multiplication product is thereafter transformed into its linear equivalent and selectively accumulated with other linear equivalents. In this fashion, the need to perform multiplications upon digital values is completely eliminated since only addition operations are necessary. This elimination of multiplication operations significantly accelerates the entire process allowing for "real time" operation.

The selective accumulation of the products generates autocorrelation terms which are utilized by the Le-Roux/Gueguen equations so as to develop reflection coefficients which are usable in an LPC synthesizer. The reflection coefficients are formatted and coded appropriately and then stored in a memory for later retrieval.

It is important to note that the reflection coefficients are particularly well suited for recognition and/or synthesis. Since they are already in proper format for synthesis, they are readily usable for matching to template data to determine the word, phrase, sentence, allophone, or sound.

Matching:

The preferred apparatus for matching the reflection coefficients derived from the spoken speech to template data involves dynamic programming which time warps the input to the template. Time warping is necessary since the same word takes a varying amount of time to be spoken by different people as well as by the same person. Time warping allows one frame of input to correspond to varying amounts of times within reference frames of the template.

For example, assume that N templates exist; that is, N words or phrases are independently recognizable. If template j has 50 frames associated therewith and each frame takes 25 milliseconds, then the speech input which takes 75 frames should not necessarily be discarded. A particular frame within the input is mapped to varying numbers of frames with the template.

In the computation, the minimal contour to a target frame of a particular template is determined. In this apparatus, only the past four columns of minimal distance or path data are kept. The preferred embodiment utilizes LPC-4 (linear predictive coding having a filter order of 4). THe Euclidean distance between the input frame and each target frame of the template is computed. This generates, for time t, a distance column which is dynamically mapped to the minimal matrix for time, $t-1$, $t-2$, $t-3$, and $t-4$. The minimal value between each value within the distance column and a prior minimum of the minimum matrix is derived. This generates a minimum column. The minimum column replaces the oldest column with the minimum matrix.

Generally, this technique maps the minimum contour for a particular input frame being associated with a particular target frame within the template.

When the end of word is determined, whether by operator input or by sensing the amplitude of the speech, the most current upper value having the minimal value of all templates is chosen. The template associated therewith is the "best" match for the spoken word. The basic premise is to determine with which template does a sequence of input frames most closely align itself. The width of a frame is "warped" to allow an input frame to be associated with half, one, two, three, etc target frames.

In this manner the optimal match between the spoken word or phrase is made. The computation of the minimal value is performed continuously and only when the end of word or phrase is given is the minimal value of the templates determinative of the word having been spoken.

Recognition:

The preferred recognition apparatus utilizes a microphone with the LPC analysis already described together with the control means. The control means accepts the reflection coefficient developed through the analysis and compares these with template data. An indicia of the recognized template is communicated so as to communicate the word associated therewith.

Two semiconductors units are therefore all that is necessary so as to create a recognition device. Optionally, a read-only-memory (ROM) or other such memory device is usable for expansion of the vocabulary repertoire. An expansion of the template library is placed on the ROM.

Since two semiconductor units are all that is necessary, it is practical to make the recognition apparatus as a portable hand held device. Battery power, solar energy or other such means for portable power supply allows the device to be readily moved to remote areas for privacy or for a specific application.

This arrangement allows for the creation of a learning aid which accepts spoken words as well as tactile input data.

Pronunciation Tutor:

The preferred pronunciation tutor chooses a word from the library and communicates it to the operator. Communication in this aspect includes both visual displays and speech synthesis generation of the word. Selection of the word is random or in a preselected manner so as to test a particular area. One embodiment allows operator selection of the word through keyboard entry.

The operator attempts to pronounce the chosen word whereby the analysis circuitry and controller determine the parameters associated therewith. A score is generated by comparing the incoming parameters to those of the selected word. This score is compared to a threshold level to determine if the pronunciation was of sufficient quality. If the quality of the human pronunciation is inadequate, then a correction message is communicated back to the operator who is allowed a second attempt. The correction message is alternatively either a raw score and/or a repronunciation (by a synthesis means) of the chosen word followed by the operator input. Synthesis of the operator input is facilitated since the parameters developed in the analysis as described above are reflection coefficients which are amenable to ready synthesis.

If the pronunciation by the operator is of sufficient quality, then a praise or positive message is given to the operator and another word is chosen. The operation repeats itself.

One embodiment of the pronunciation tutor provides for a variation of threshold level so as to provide more difficult tasks for the operator. This variation is done either through automatic restructure of the threshold or by operator selective restriction of the threshold. This procedure encourages the operator to improve his pronunciation steadily without creating an impossible task.

One other aspect of the pronunciation tutor allows for addition of a plug-in module or other such detachable memory so as to expand or augment the existing repertoire of choosable words. This allows the pronunciation tutor to grow with the student or to address other tasks such as foregin languages.

In one embodiment, the indicia is visually communicated to the operator so as to simultaneously test the reading and pronunciation skills. This embodiment is particularly advantageous for early learning since it forces visual skills as well as oral skills.

It is clear from the foregoing that the recognition aspect is almost entirely eliminated since the word with which the operator is to speak has already been chosen by the apparatus. Only a raw score is necessary. The machine, at all times, is cognizant of what word should be entered and its associated parameters.

Sentence Recognition:

In the sentence recognition embodiment, as each word is spoken by the operator it is identified by one of the previously discussed methods and either the indicia and/or the reflection coefficients are stored. When the end of the sentence is encountered, these indicia and/or reflection coefficients are recalled and their score is determined individually.

This score is determined in the same manner as has been discussed before. Again the total score is reflected to some threshold level and if a good pronunciation of the sentence has been communicated, (below threshold,) a positive reinforcing message such as "good job" is given the operator; if the pronunciation is of poor quality, a correction message together with the total score is preferably communicated together with the proper pronunciation in conjunction with the pronunciation given by the student. In this manner the student is presented both the proper pronunciation and his pronunciation so that an independent comparison is made.

In one embodiment, should the apparatus be unable to identify a particular word within the sequence of words, a prompting message is communicated to the operator so that the operator is alternatively able to repronounce the word or query as to if a proper identification has been made. In this fashion the apparatus may ask the student "was the word 'cat'?" This allows the continuous recording of the words spoken by the student since no word is omitted.

As opposed to the previous pronunciation tutor, this apparatus determines the words spoken by the student and recognizes them relative to a library or repertoire of recognizable words, phrases, allophones, numerals, and the like. The present invention tests the sentence pronunciation ability of the operator.

The score communicated to the student is reflective of the entire summation, or functional relationship of the individual words, of individual word scores and preferably includes scoring of the timing between words, intonation, and other selected factors which make up good pronunciation. These factors are well known in the art and are readily testable.

Intonation is detectable by way of a pitch tracker which is well known in the art.

Translator:

The embodiment of the translator provides for a translation from a host language into a nonhost language. As discussed before, the individual word is communicated, via the analysis circuit to the controller, the controller matches the incoming autocorrelation terms to a particular set of autocorrelation terms associated with a library word within the host language. An indicia of this word is stored until the end of the phrase or sentence is encountered. Once the end of the phrase or sentence is encountered, the sequence of words is retrieved.

The sequence of words thereafter is contextually adjusted so as to retain the proper meanings of the identified words. This is particularly important in this situation since it avoids the confusion between the definitional differences of words which sound similar but have different meanings and true homonyms. Thus, the words "to", "too", and "two" are contextually different and therefore encoded differently one from the other. The matching to a template though between the three variations of the sound is impossible since they entail the same sound. The only way to differentiate is to contextually analyze them.

Another example of contextual adjustment is for words having plural meaning with the same spelling. For example, the word "watch" is contextually different in the phrase "it is the midnight watch" and "my watch needs a battery".

Contextual adjustment includes not just homonyms but words which sound similar. The optimal match is not necesssarily the word spoken. For example, the words "state" and "stake" are confused easily by the recognition of single words but when taken in context are not confused.

Once the analysis has accomplished the contextual retention of their meaning, the sequence is translated into the appropriate nonhost language. The nonhost language in this context is used to mean both a foreign human language as well as machine language.

The foreign human language application provides for a portable language translator in which the operator speaks into the apparatus, and the apparatus translates into a foreign language for communication to an observer. This communication is preferably done through speech synthesis but alternatively is done through a visual display. Note that since the contextual purity of the phrase has been maintained, the foreign language also reflects this contextual meaning.

For example, the word "to" in English is not translated to the Spanish "dos" but rather to the Spanish "a".

In a similar fashion, the machine language translation allows for the contextual purity to be communicated to the language. For example, assume the electrical mechanical device being controlled by machine language is an electronic typewriter; therefore when instructed verbally to type the word "two dogs", it does not erroneously type "too dogs".

It is clear that retention of the contextual meaning is imperative for the entry of certain spoken commands. The present embodiment allows for the creation of a vocally controlled electronic typewriter.

Voice Activation:

Activation of an electrical apparatus is made possible by one embodiment since it allows the input of an operator spoken command, the matching of indicia from the operator spoken command to the proper input and action in response thereto. If the command matches the proper input, the electrical apparatus is either activated or deactivated accordingly. This allows for the control, through speech, of a remote electrical apparatus.

In operation, the recognition apparatus continuously monitors for a spoken input. Upon the recognition of a spoken input, an indicia respresentative of the spoken command or input is utilized in determining if an activation/deactivation is desired or permitted. In this context, the input acts as a locking type device, thereby preventing access to the electrical apparatus without the proper input. Although the input sequence may be a standard term such as "lights on", it is also possible to require an elaborate and secretive code for the similar activation. Hence, should the electrical apparatus to be controlled be an electrical lock on a door, the operator chooses an input sequence which is secretive enough to allow access to the electrical lock to only those who should have access.

The requirement of more than a single word as the input is desirable since it prevents the lights from being turned on and off inadvertently by idle conversation within the room.

In one embodiment, a memory means such as a random access memory (RAM) is utilized which is preferably constantly powered so as to be removable from the apparatus and transported to another apparatus. In this fashion, the operator is provided a plug-in RAM which acts as a key device for control.

The operation of the voice activation apparatus consists of a matching of the recognized indicia to the proper sequence and deciding thereon whether access should be permitted. If access is allowable, the electrical apparatus is powered or depowered accordingly. In the lock-in situation, the operator is provided a default signal, such as a buzzer, should the combination he enters via his speech be not acceptable.

Telephone Answering Apparatus:

The telephone answering apparatus embodiment provides for the prioritization of incoming telephone calls so as to allow for the selective connection to the local receiver or for the assignment of flags for later selective retrieval by the local receiver operator.

In one embodiment, this prioritization includes the retention of the connection between a remote receiver and the answering apparatus for a predetermined amount of time (being indicative of the need for connection to the local receiver). A message is communicated to the remote transmitter indicating that interruption of the local receiver is not warranted unless it is an emergency or the like. Upon retention of connection for a predetermined amount of time, the remote transmitter is connected to the local receiver which causes the local receiver to ring or otherwise notify the operator of the incoming call.

In another embodiment, the operator of the remote transmitter is allowed to state a particular identifying word, such as "emergency", which is recognized by the speech recognition apparatus, already described in detail, so as to permit the answering apparatus to connect to the local receiver and thereby cause it to ring.

Still another embodiment provides for the word by word recognition of incoming speech signals and the comparison thereof with a selected set of indicia. This allows the local operator to select certain words as keys. The local operator upon returning to the local receiver or having time to address the incoming messages, is able to input, either by keyboard or voice input, an indicia representative of the key, and receive messages which utilize the word associated with the indicia. For example, the operator is able to input selected indicia such as "widgets", "XYZ Corporation", and "IRS audit". The incoming messages are received, recognized, stored, and marked with flags if any of the selected words have been used. The operator of the local receiver, at his discretion, has the messages which have "IRS audit" played back. Thereafter, the operator selects the messages having the indicia corresponding to "widgets" and addresses these messages; thereafter he addresses the messages having "XYZ Corporation" therein; finally the operator chooses to address the remaining messages which typically are of a much lower priority than the three classes of messages already addressed.

At least two ways of input for the operator for access to selective indicia exist. One way is for the operator to input, via the keyboard on the local receiver telephone, a number or other such sequence indicative of the indicia requested. Another form of selection is for the local operator to state orally the word which is recognized by the answering apparatus and thereby matched for selective withdrawal of the corresponding messages.

This embodiment of the answering apparatus provides for more efficient operator time through use of the answering apparatus since it prioritizes incoming calls for selective connection or selective retrieval. In this way it reduces the number of interruptions and also provides for a more efficient use of the operator's time in addressing particular messages having a higher perceived priority.

Spelling Learning Aid:

In the spelling learning aid, the operator is able to select his repertoire of words and their associated spelling. The operator dictates orally the pronunciation of the word and enters, typically via a keyboard, the appropriate spelling or characters associated with the orally inputted word. These two components establish the set which is stored in the memory. A plurality of these sets is so stored. The apparatus selects one of these sets for use in testing the operator upon his skills.

In the testing operation, preferably, the word is spoken utilizing synthesis control data generated from the original operator spoken word. The operator then attempts spelling the synthesized word. The operator's response is judged relative to the spelling or other characteristics previously entered and derived from the set of data. In the spelling application, if the spelling in response by the operator coincides with the correct spelling previously entered by the operator, a positive reinforcing message is given to the operator; otherwise, a negative message is given. In the preferred embodiment, the operator is allowed two attempts at the correct spelling before the correct spelling is given to him.

In this context it has been found that a keyboard is preferred for the entry of the spelling and a visual display is used to facilitate the visual feeback of the already entered spelling. Additionally, the visual display is beneficial in the prompting of the operator in entry of the data set.

In contrast to the other applications discussed previously, the spelling learning aid does not require that the oral input of the operator be "recognized". That is, the oral input need merely be analyzed so as to generate synthesis control data. It is irrelevant in this embodiment that the operator inputs the proper pronunciation associated with the word to be spelled. It is only critical that the word being orally inputted prompts the operator to spell the targeted word. For example, it is immaterial for the spelling of the word "pneumatic" that the operator state the word "penumatic". Rather, the operator may state a definition or any other clue to the word "pneumatic".

That is, the operator is able to orally input the statement "air pressure" and yet input the spelling for the word "pneumatic". The operator when hearing the phrase "air pressure" is prompted, due to his basic knowledge, to spell the word "pneumatic".

This aspect allows the operator to input definitions, homonyms, antonyms, or the like with which the apparatus quizzes the operator utilizing this input as the prompting message. Preferably though, the operator inputs orally the same word which is to be spelled.

The present embodiment of the spelling learning aid is also applicable for use with a character set such as numerals, foreign symbols, allophonic symbols, and the like. It is not necessary that the spelling be merely of a word. The "character" entered by the operator may include all of the above.

The following drawings with their accompanying descriptions and discussion more fully describe the present invention, its embodiments, and ramifications thereupon.

DRAWINGS IN BRIEF

FIGS. 6a-6j are circuit diagrams of an embodiment of the logarithmic analog to digital control circuitry of the analysis circuit described in FIG. 3.

Figure 10A:
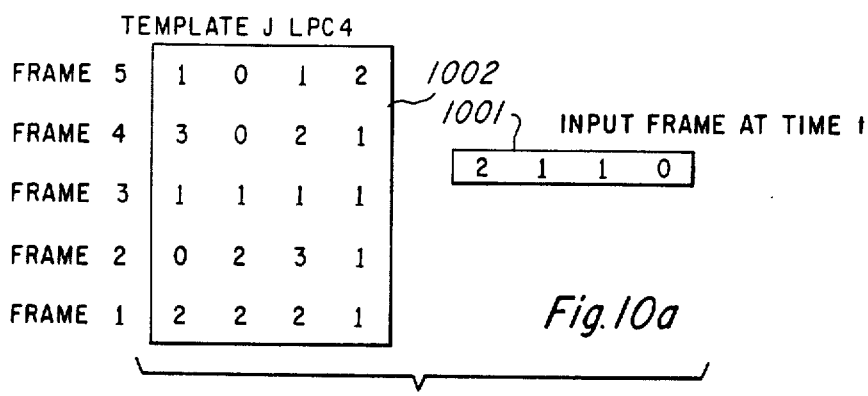
Figure 10B:
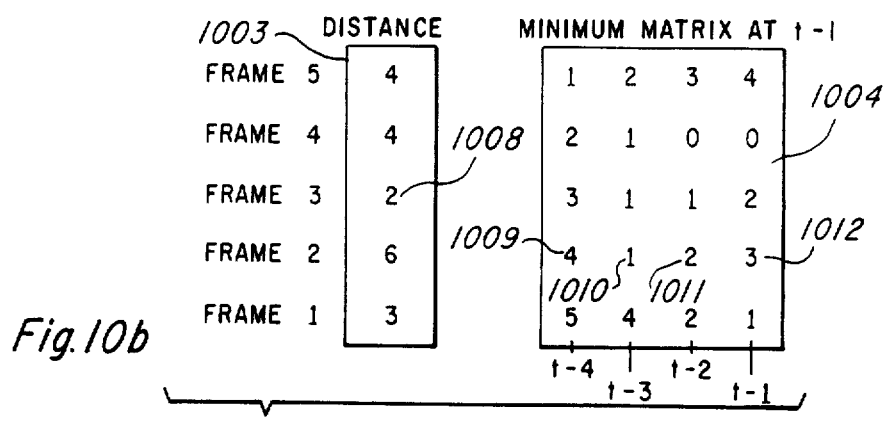
Figure 10C:
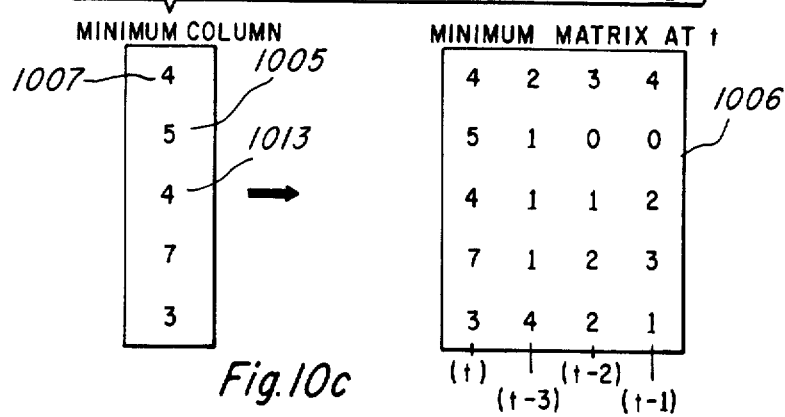

FIGS. 10a, 10b, and 10c illustrate the memory manipulation in the preferred embodiment for dynamic time warping.

Figure 11:
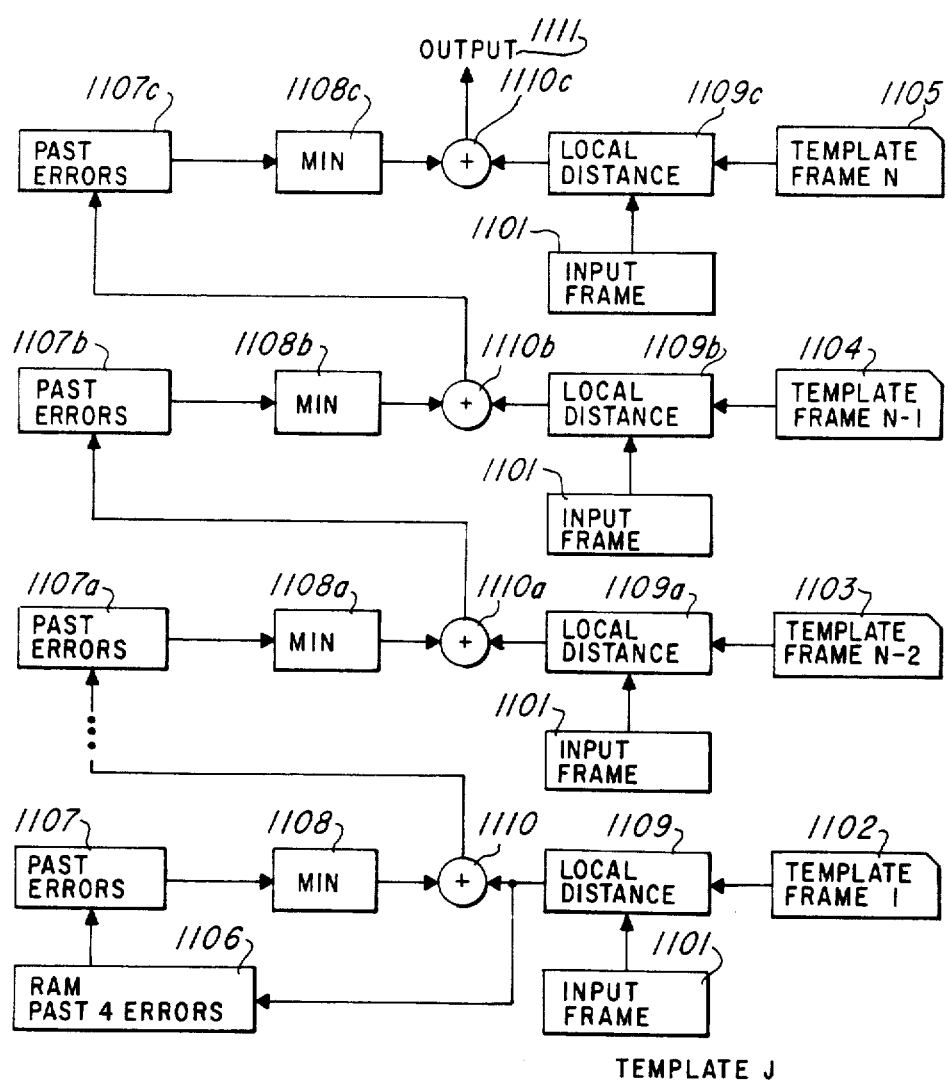

FIG. 11 is an architectural arrangement for the determination of dynamic time warping.

Figure 12A:
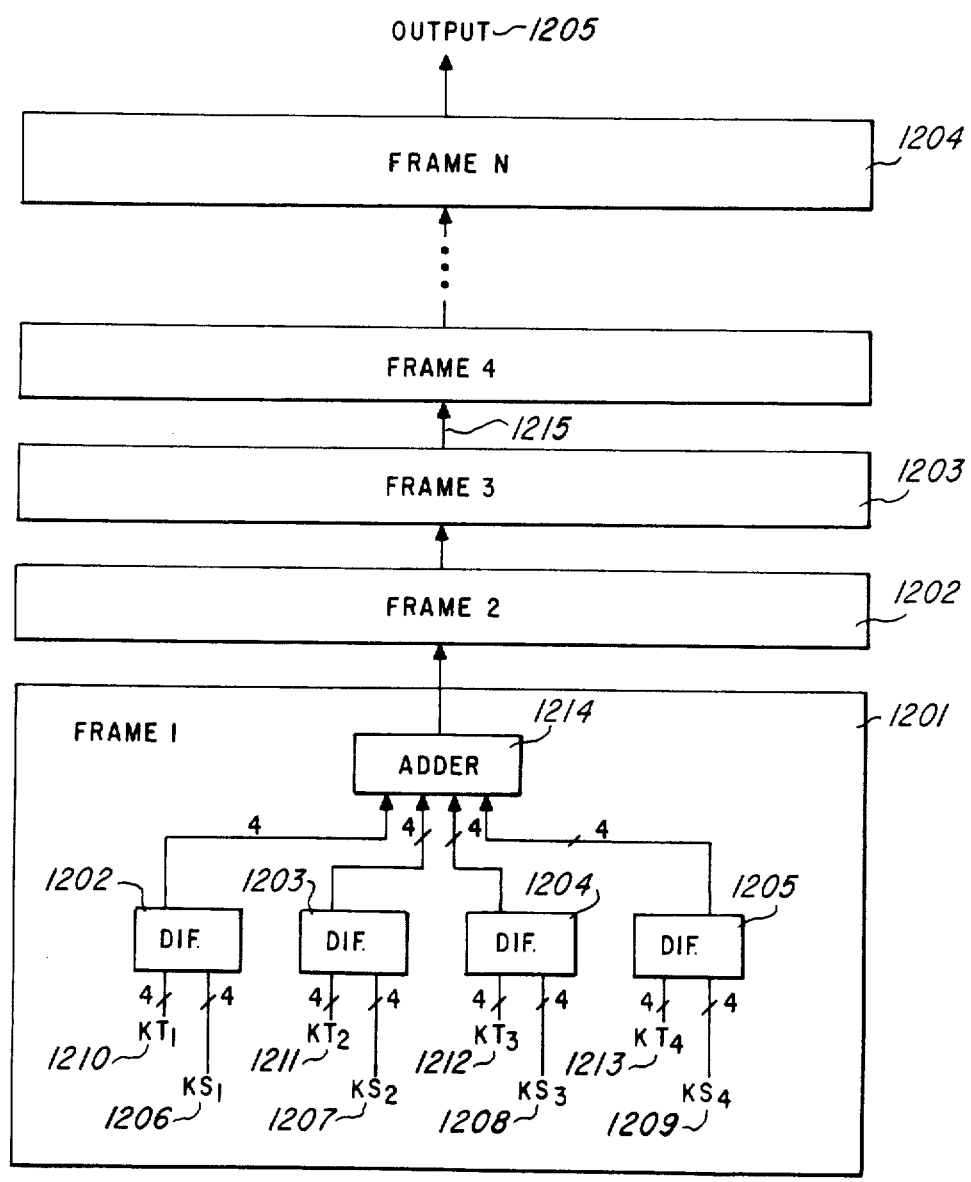
Figure 12B:
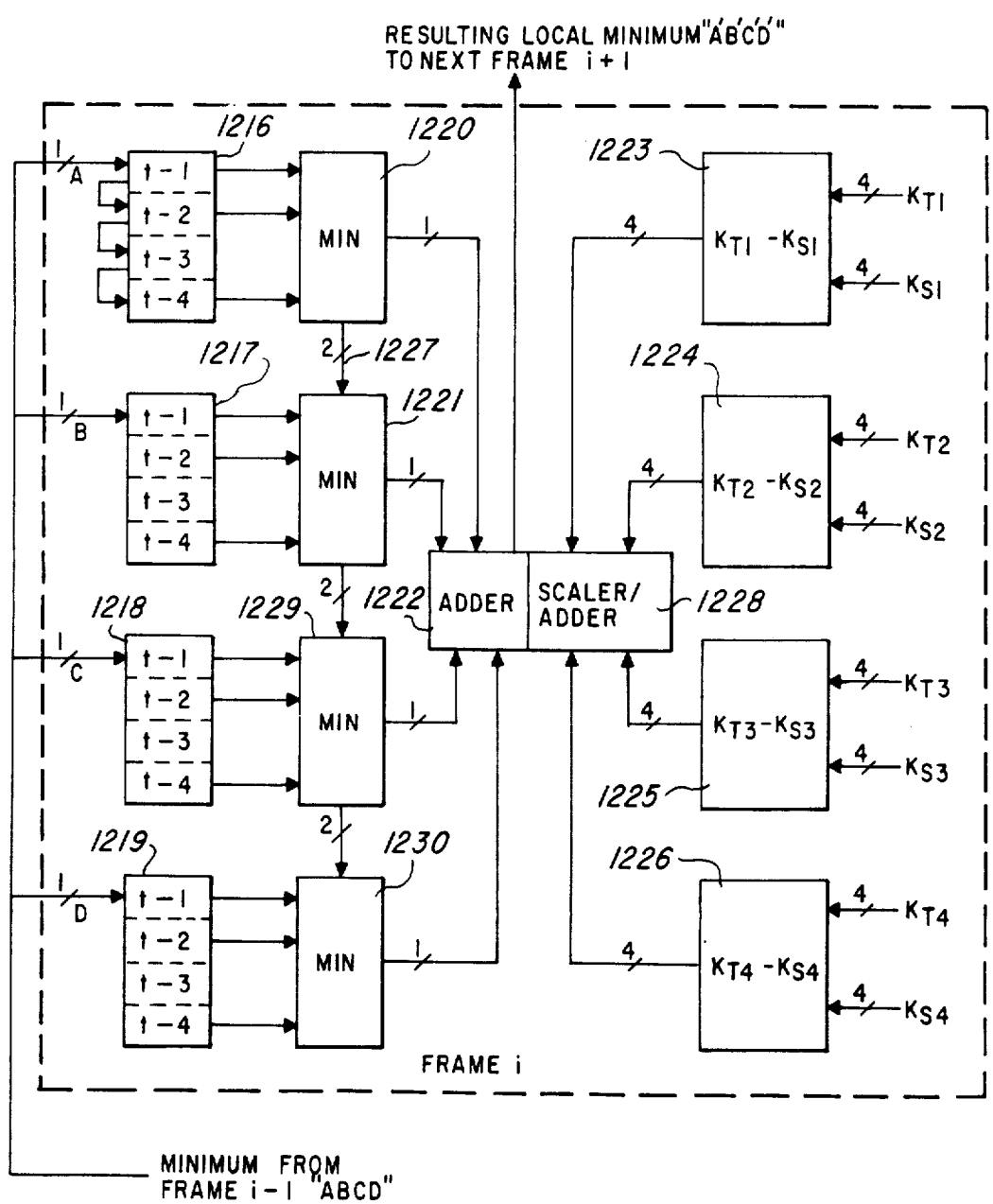

FIGS. 12a and 12b are alternative architectural arrangements for generating dynamic time warping.

FIG. 13 is a block diagram of an embodiment of the pronunciation tutor.

Figure 14:
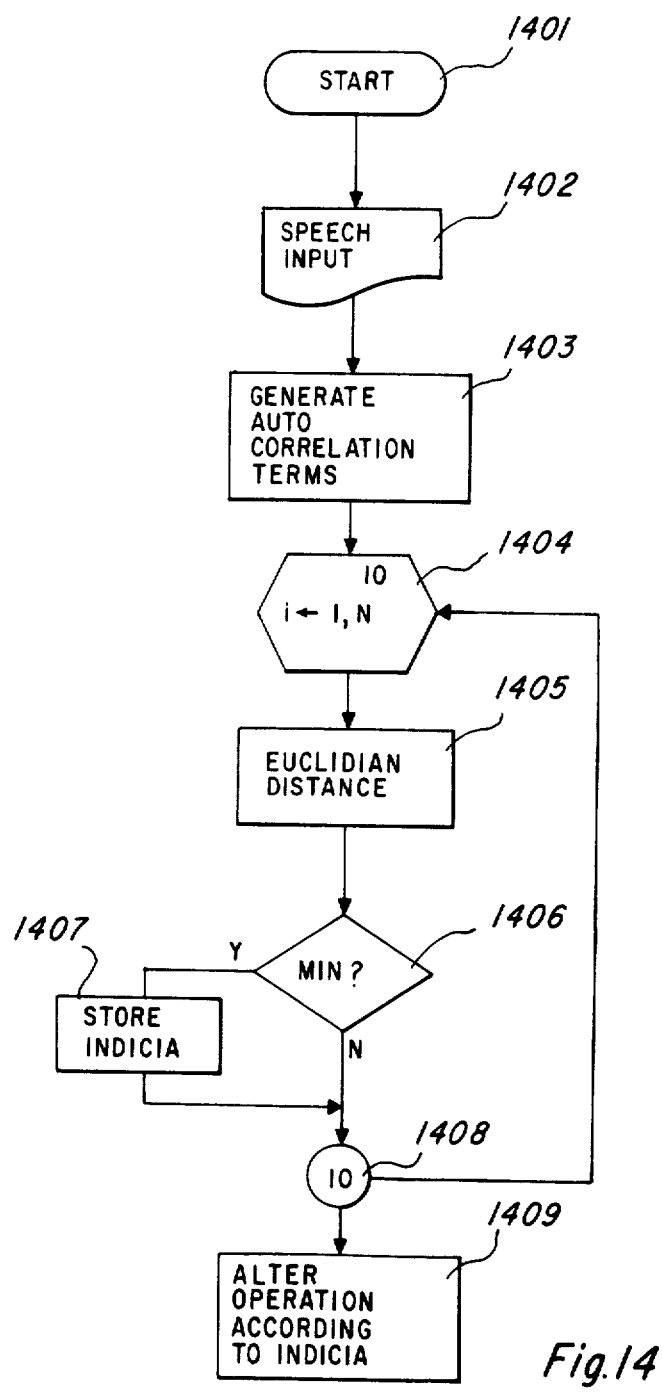

FIG. 14 is a flow chart of the operation of the pronunciation tutor.

FIGS. 15a, 15b, and 15c illustrate an template matching algorithm usable for the pronunciation tutor.

FIGS. 16a, 16b, 16c, and 16d illustrate an algorithm for determining an optimal match for template to input.

Figure 17:
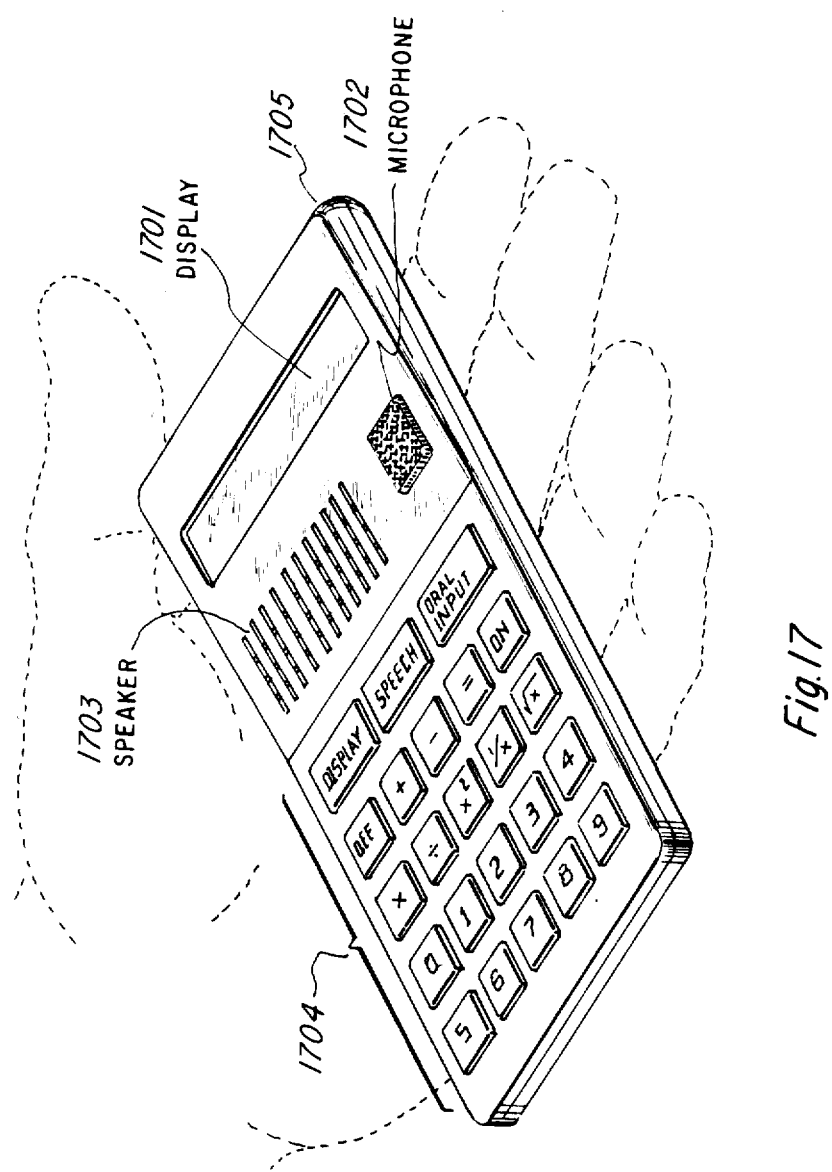

FIG. 17 is a pictorial diagram of a speech recognition apparatus which performs calculator type functions.

Figure 18:
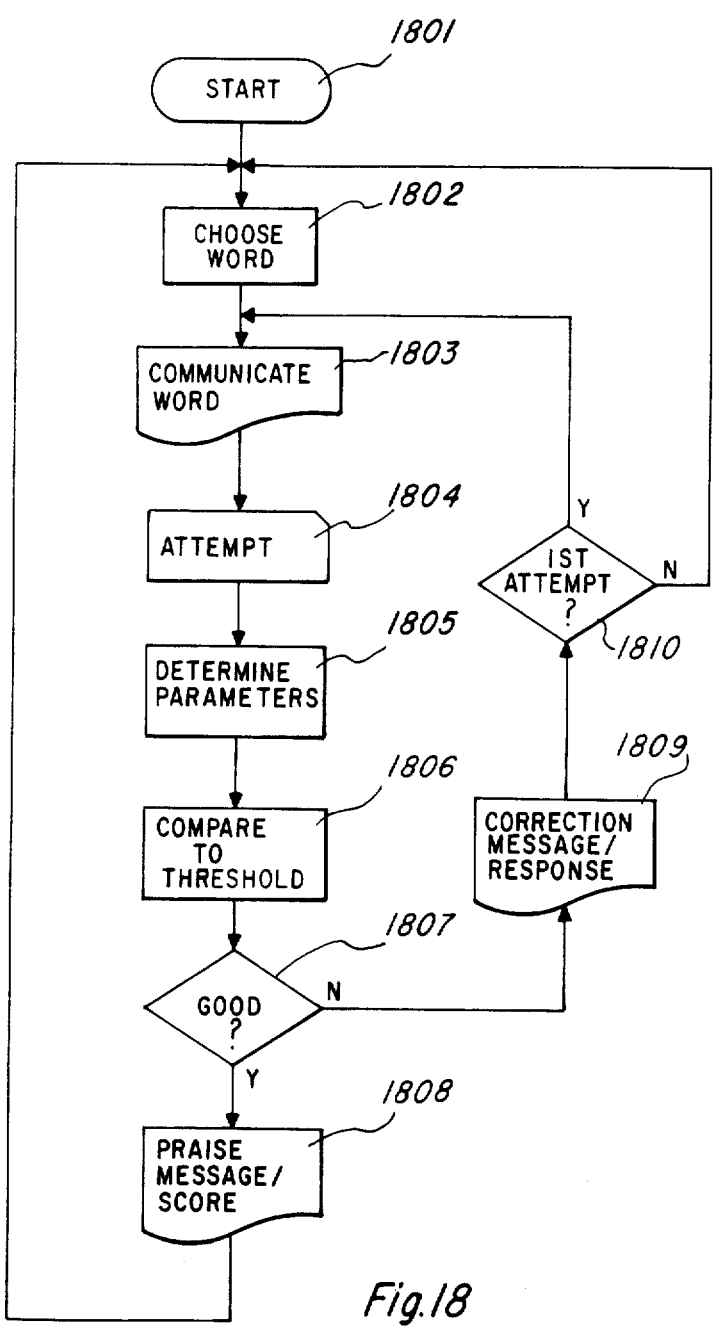

FIG. 18 is a flow chart of the operation of the pronunciation tutor.

Figure 19:
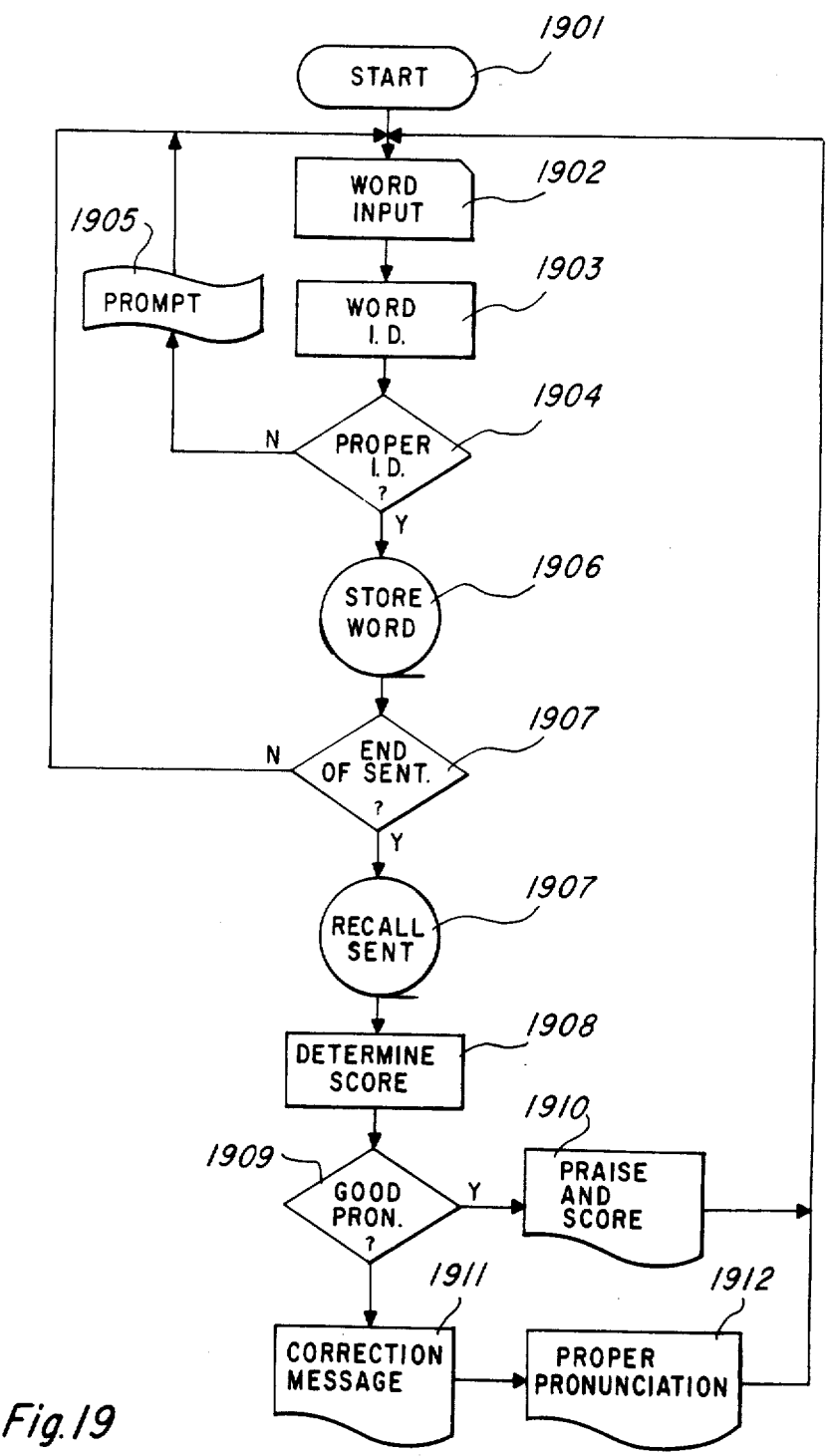

FIG. 19 is a flow chart of the sentence pronunciation evaluation apparatus.

Figure 20A:
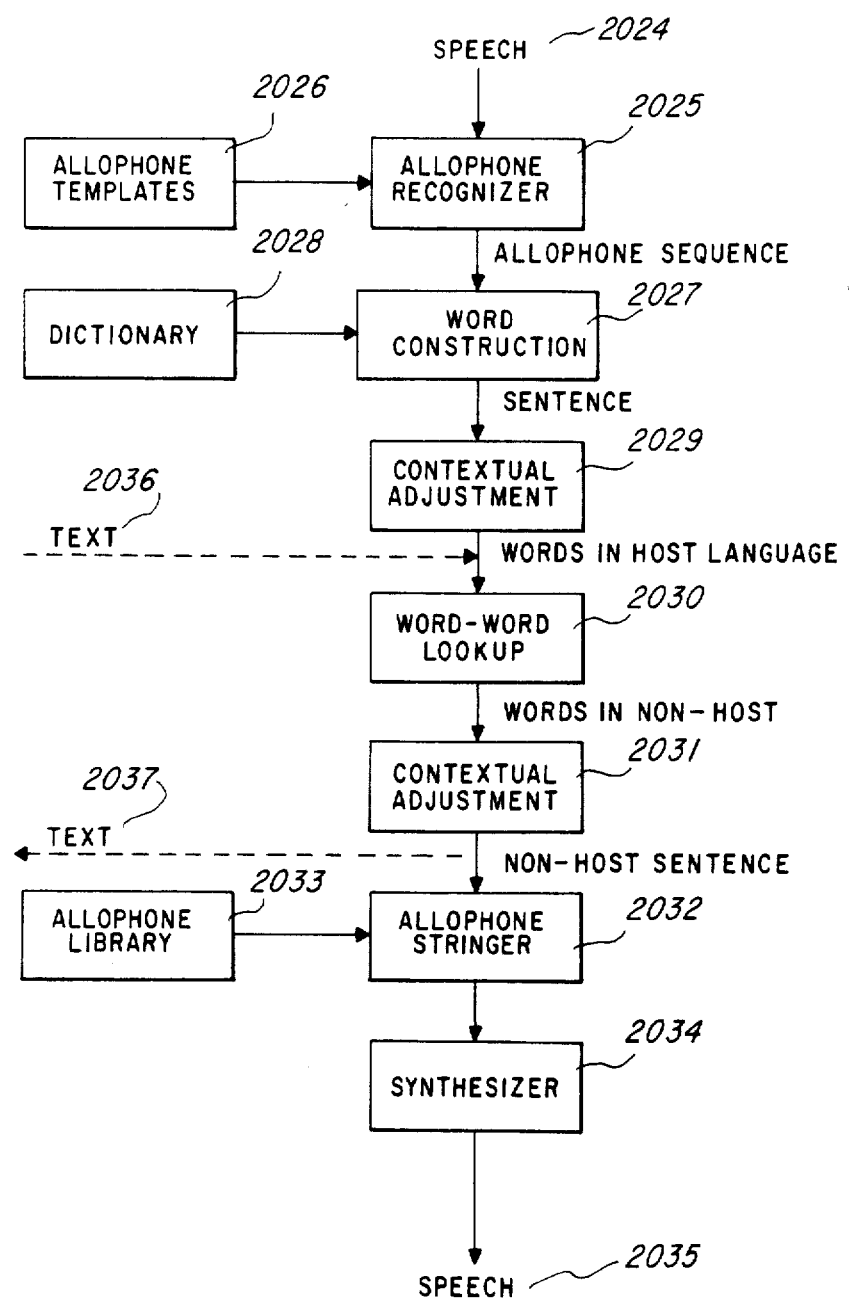

FIG. 20a is a block diagram of an embodiment for translating from a host to a non-host language.

Figure 20B:
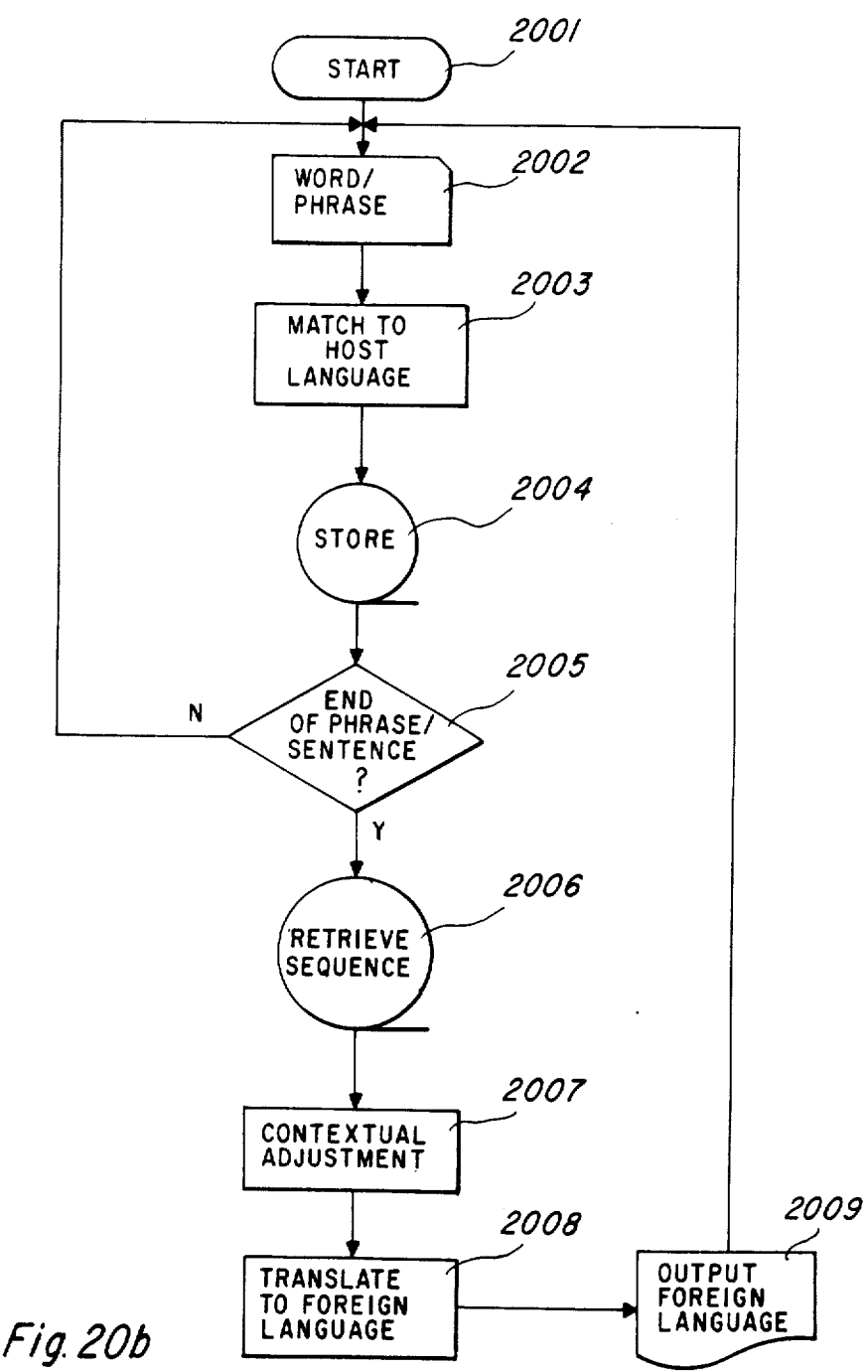
Figure 20C:
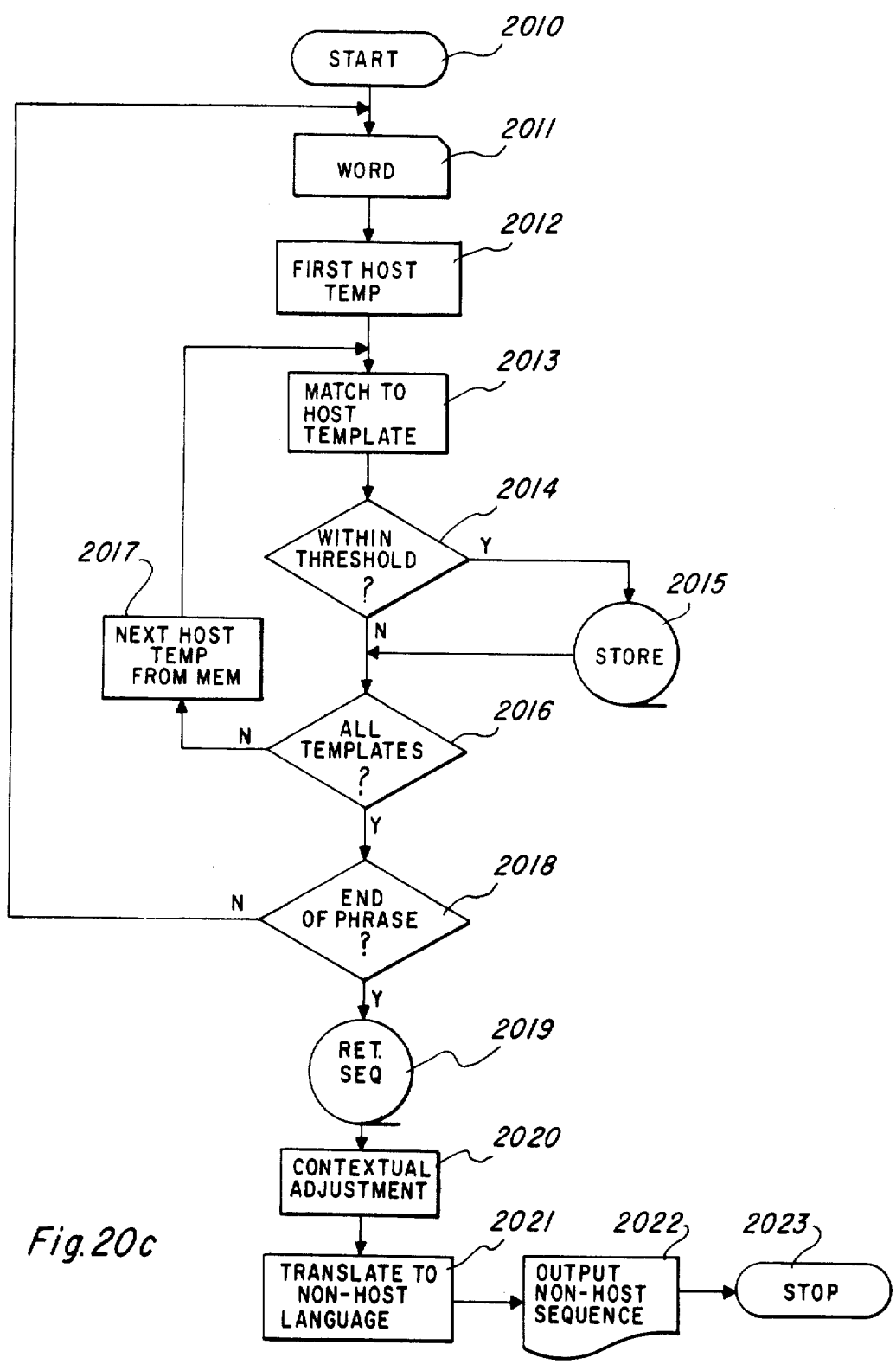

FIGS. 20b and 20c are flow charts of two translator devices.

Figure 21:
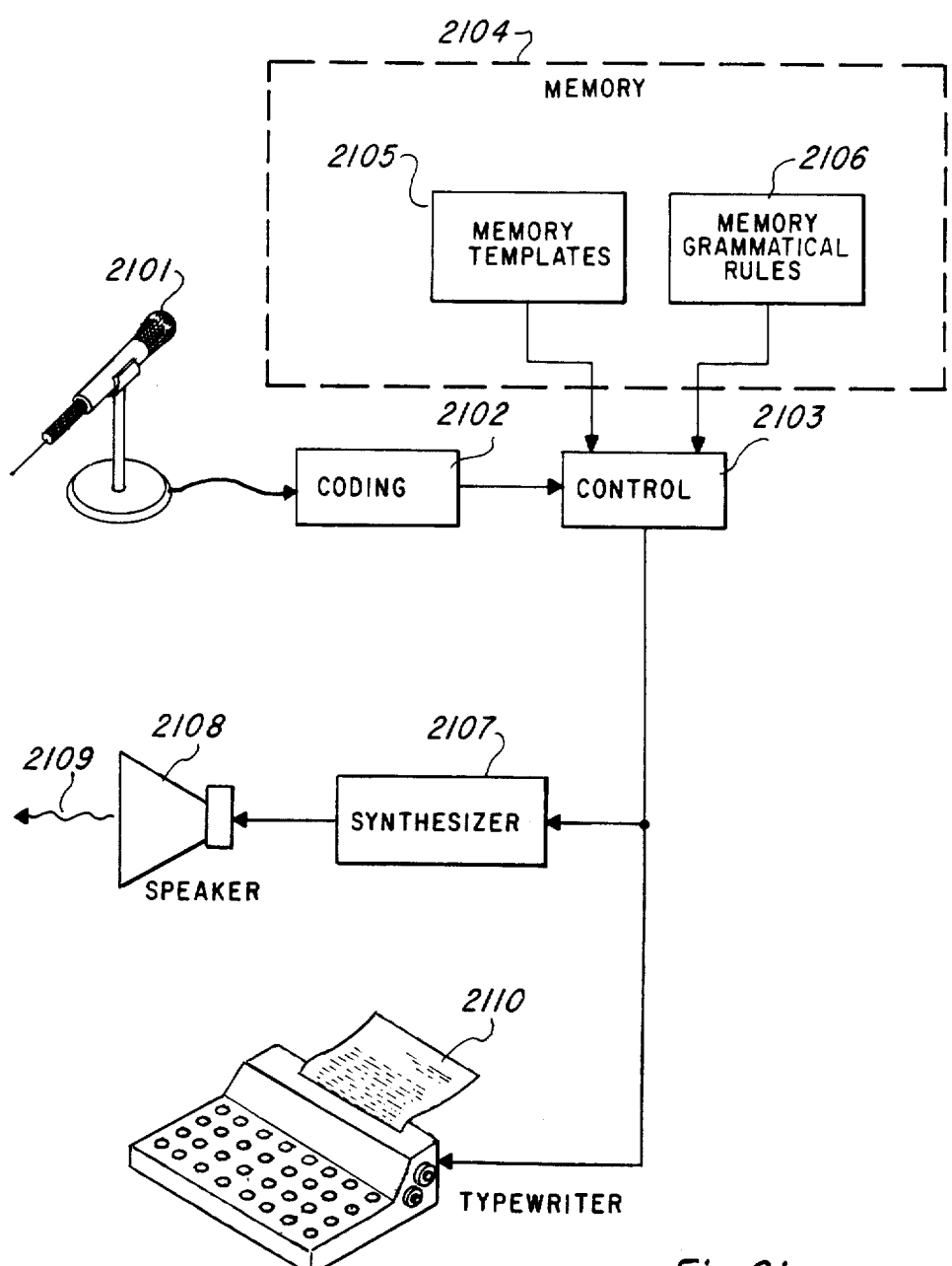

FIG. 21 is a block diagram of the components and their interaction of the translator together with its communication ability.

FIG. 22 is a flow chart of the operation of the voice activation apparatus.

FIG. 23 is a flow chart of the state alteration operation.

Figure 24A:
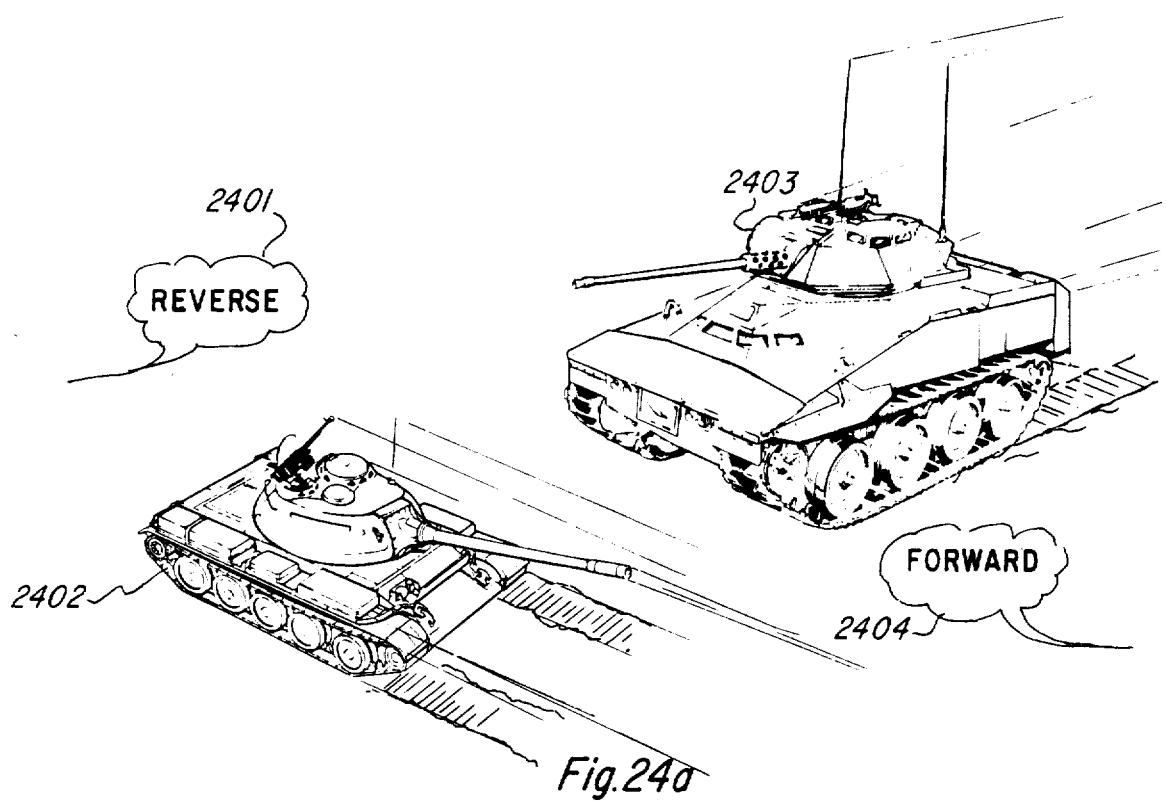
Figure 24B:
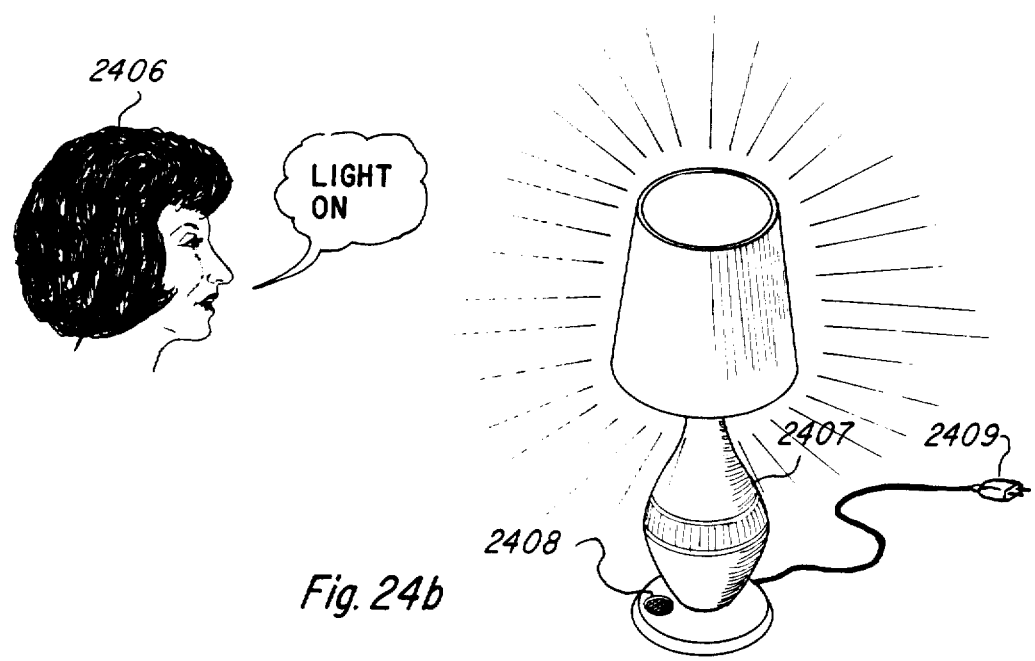

FIGS. 24a and 24b are pictorial representations of the voiced activation and voice control apparatus.

Figure 25:
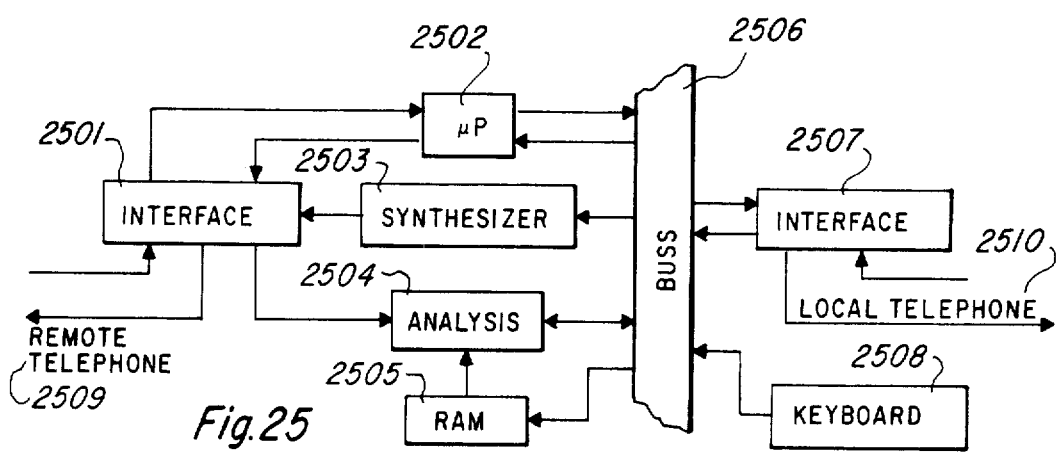

FIG. 25 is a block diagram of the embodiment of the answering apparatus.

Figure 26A:
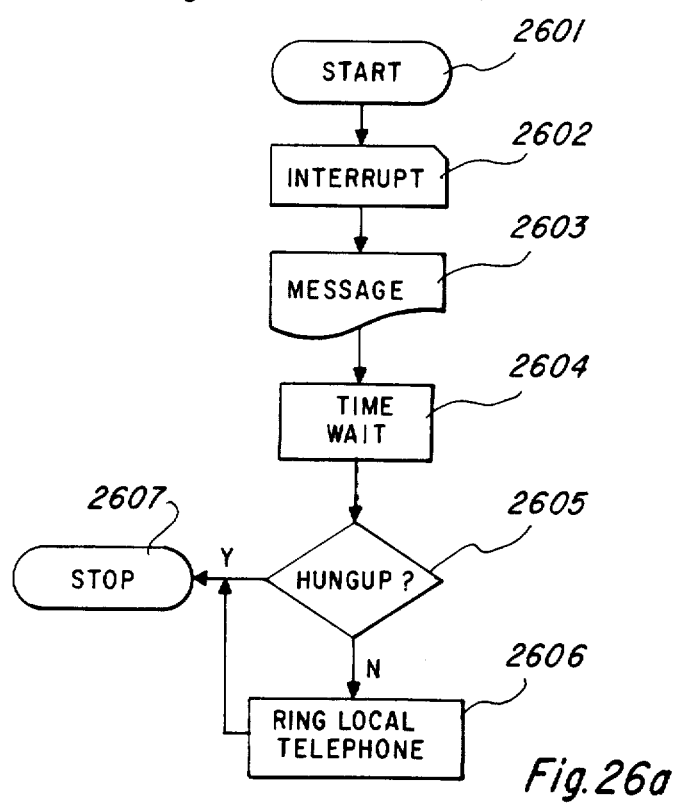
Figures 26B, 27C:
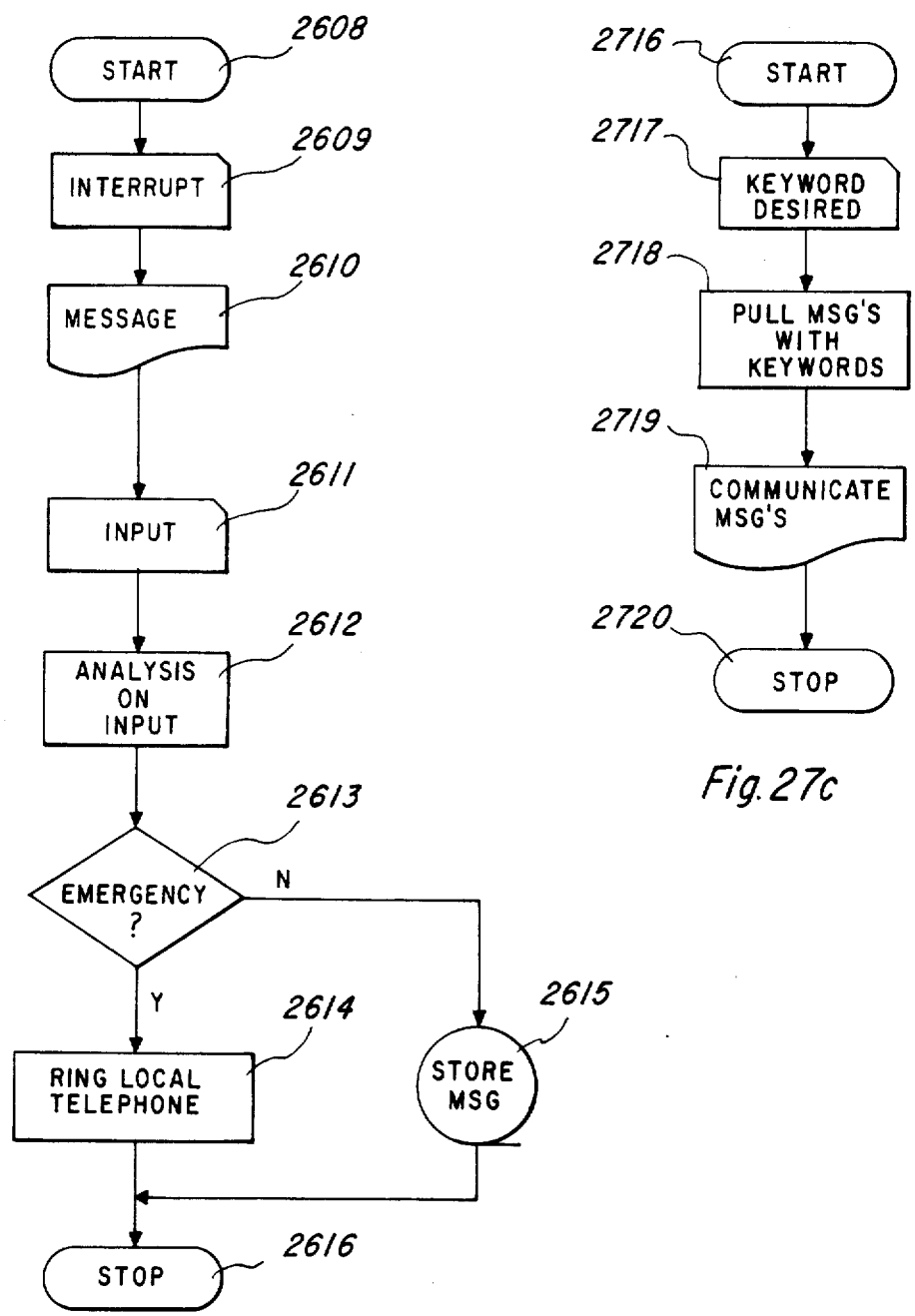

FIGS. 26a and 26b are flow chart diagrams of the operation for the telephone answering apparatus.

Figure 27A:
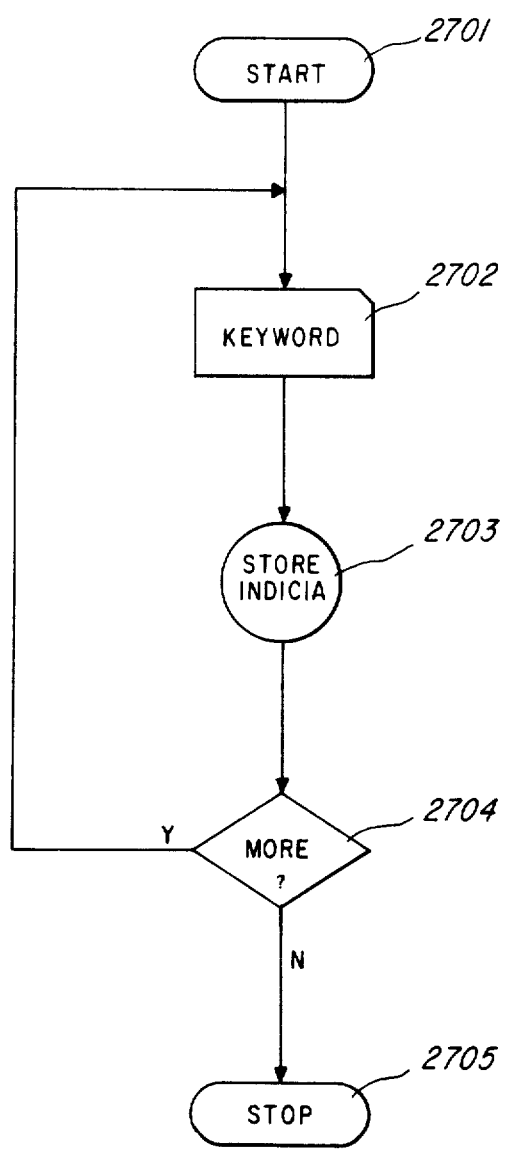
Figure 27B:
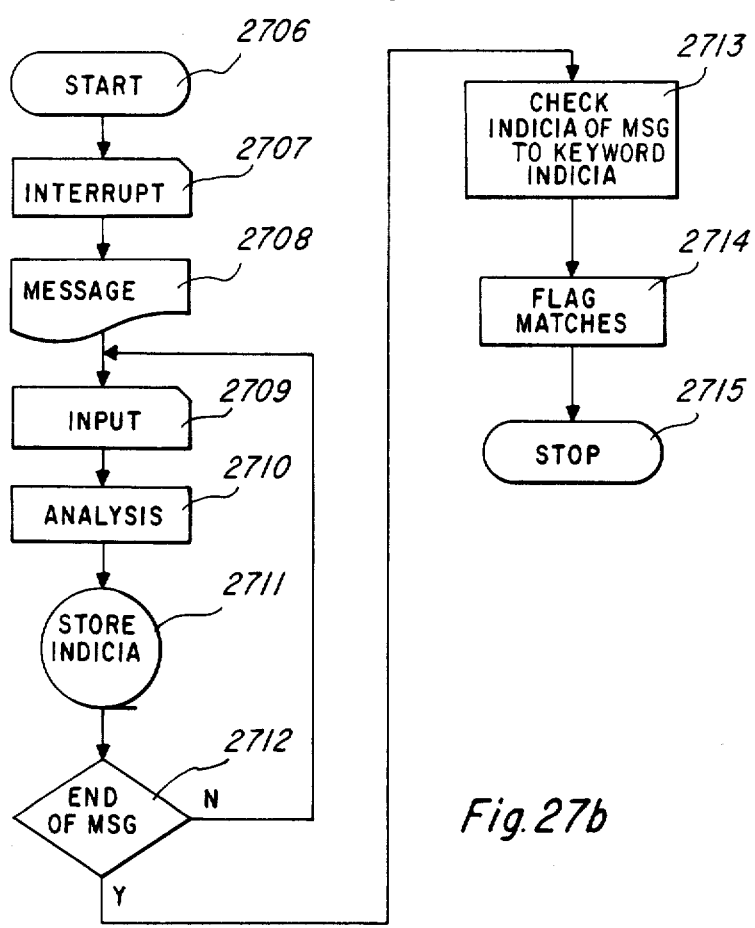

FIGS. 27a, 27b, and 27c are flow charts of the operation for the selective flagging of incoming messages and their retrieval for the telephone answering apparatus.

Figure 28:
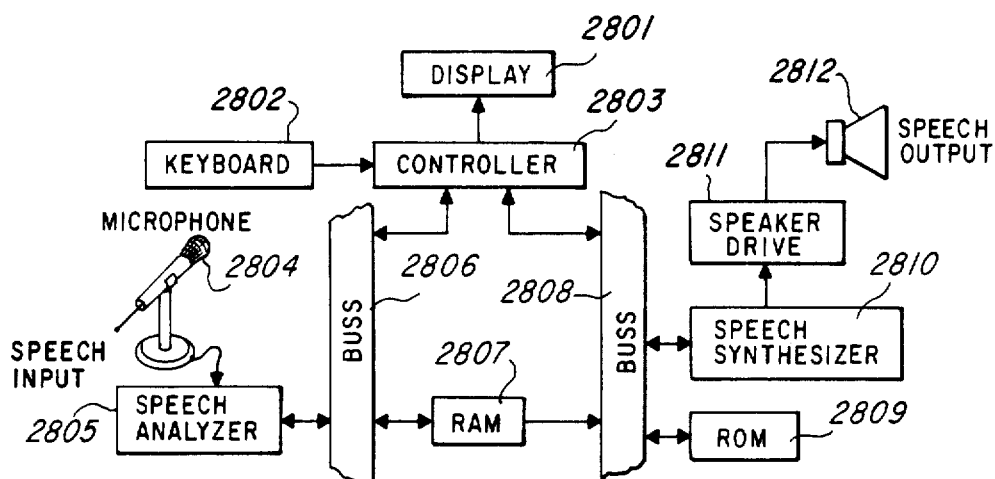

FIG. 28 is a block diagram of an embodiment of the spelling learning aid.

Figure 29:
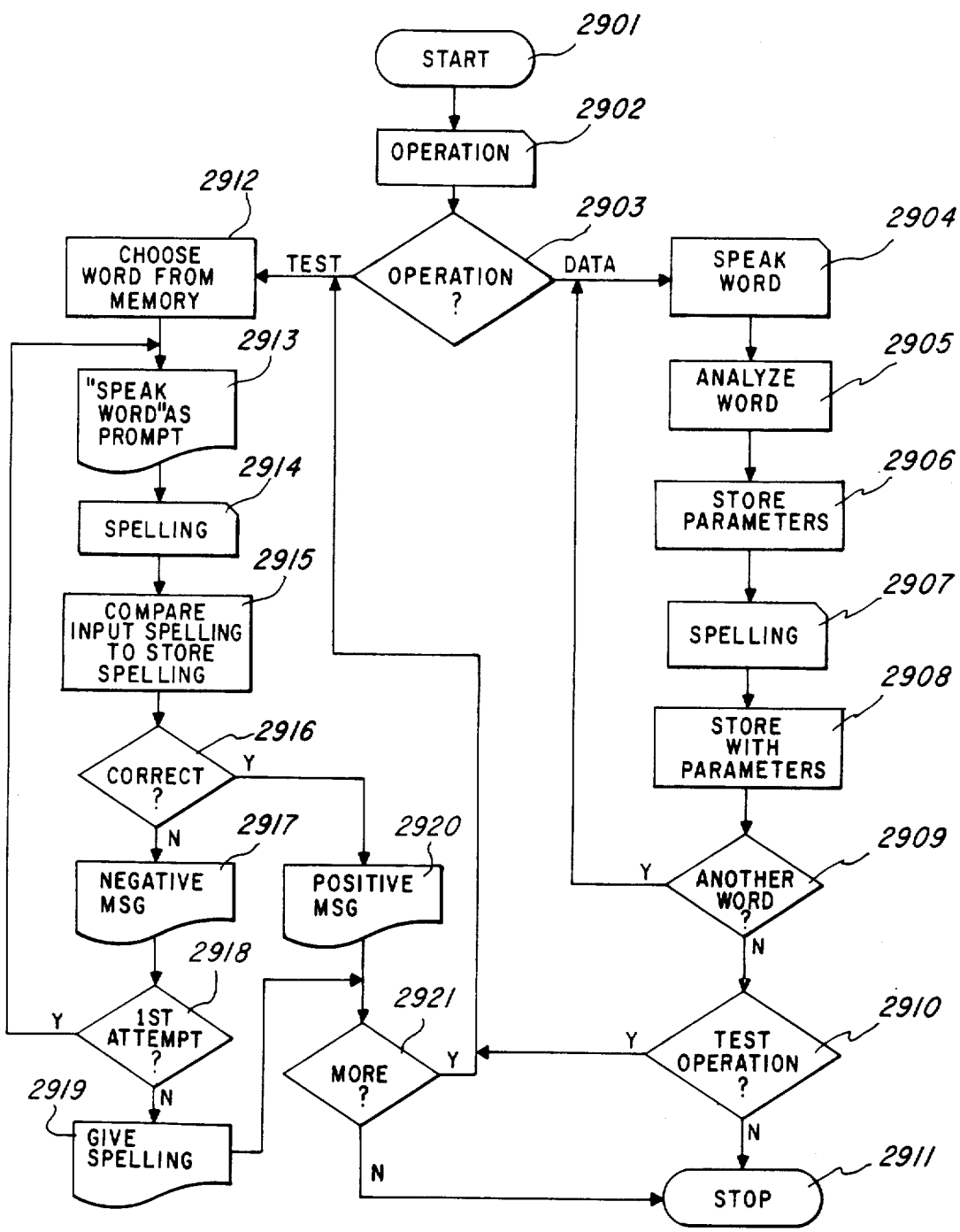

FIG. 29 is a flow chart of an embodiment of the spelling learning aid.

DRAWINGS IN DETAIL

Figure 1:
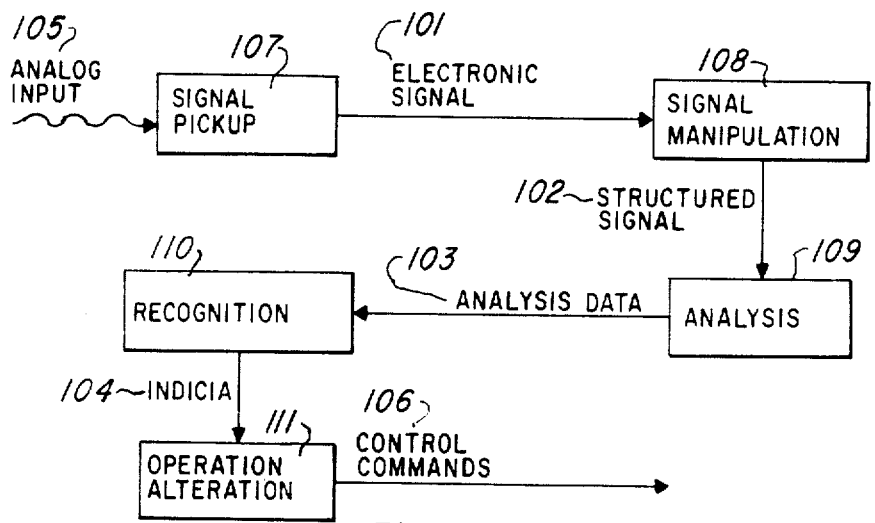
FIG. 1 is a block diagram of a recognition apparatus.

FIG. 1 is a block diagram of an embodiment of the recognition operation. The analog input 105 from the operator is picked up by the signal pick up means 107. Signal pick up means 107 translates the analog input into an analog electronic signal 101 which is communicated to the signal manipulation means 108. The signal manipulation means 108 structures the analog electronic signal 101 into a form which is readily used by the analysis means 109. Manipulation includes rectification, multiplication, filtering, and the like.

The analysis means generates data and other indicia relative to the structured signal 102 so as to form a "fingerprint" of the original analog input 105. The analysis means 109 communicates this analysis data 103 to the recognition means 110. The recognition means 110 compares the analysis data to template data, not shown. Based upon this comparison, on indica 104 is communicated to the operation alteration means 111 which generates control commands 106 thereupon.

In this fashion, the analog input is translated, matched to an appropriate template and is used to alter the operation of the present apparatus or some other device apparatus. This architectural arrangement allows for a spoken command to effectively control an apparatus.

Figure 2:
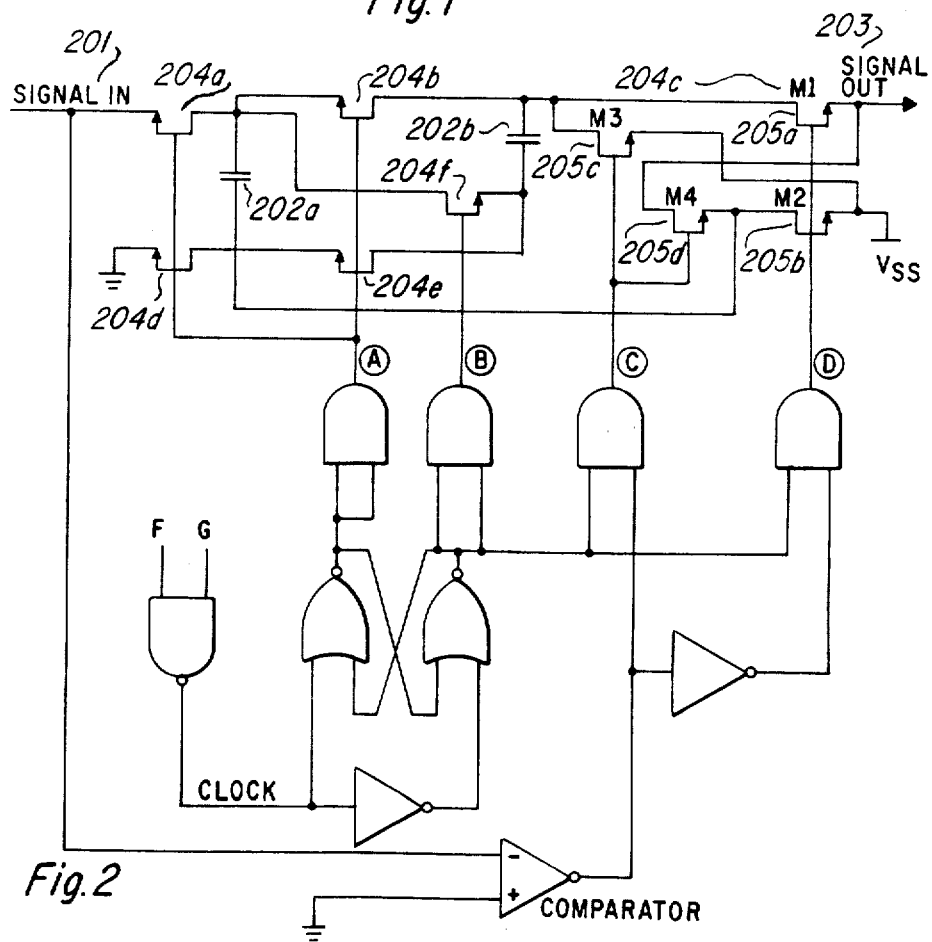
FIG. 2 is an electrical schematic of the rectifier multiplier circuit.

FIG. 2 is a schematic of the rectifier/multiplier apparatus. The incoming signal 201 is selectively communicated to the capacitor 202. In this embodiment, two capacitors, 202a and 202b, are used which are matched as to their capacitive ability. In an alternative embodiment, multiple capacitors are used and their relative capacitance is varied selectively so as to provide more flexibility in signal manipulation.

Upon the input of the signal, the switch arrangement 204a and 204f is interconnected so that the incoming signal is communicated in parallel to both capacitors 202a and 202b. At the appropriate clocking pulse, capacitors 202a and 202b are switched to a serial arrangement so as to double the original incoming signal 201. This signal, through the use of the switch arrangement 205a–205d rectifies the signal to be of a particular polarity.

This arrangement is particularly adaptable to being placed upon a semiconductor device. Additionally, the architecture provides easy multiplication and rectification without the loss due to clipping or other inadequacies found in the prior art.

Figure 3:
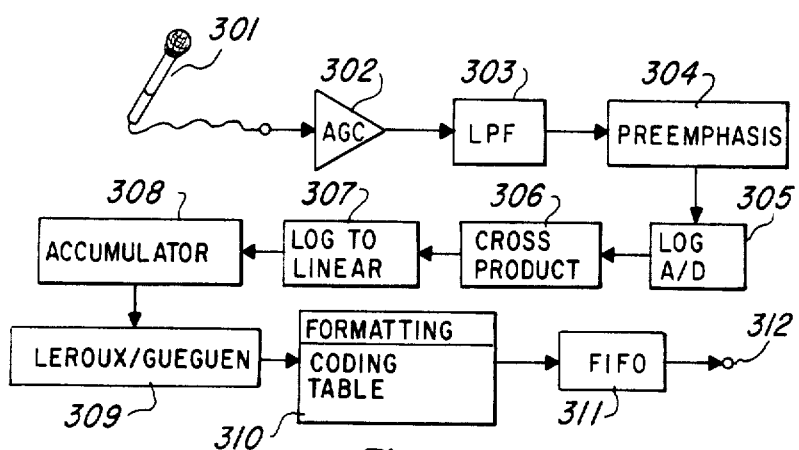
FIG. 3 is a block diagram of the preferred embodiment of the analysis apparatus.

FIG. 3 is a block diagram of an embodiment of the analysis circuit. Micriophone 301 receives the spoken analog signal which is communicated to an automatic gain control (AGC) 302.

The AGC 302 is used as an analog interface for the microphone 301. The AGC 302 provides a relatively constant peak output level having a sufficient amplitude so as to drive the low pass filter 303, the pre-emphasis 304, the logrithmic analog to digital (Log A/D) 305. The AGC 302 in providing this peak output level, allows for low level input signals to be effectively utilized and thereby reduces clipping.

In this capacity it has been found that an AGC providing a peak signal of less than 80% of voltage rail and greater than 40% of the voltage rail is suitable. Additionally it has been found that a gain being incremented in six (6) dB steps is acceptable.

The signal from the AGC 302 is communicated to the low pass filter 303 which is used to withdraw high frequency components of the signal. The low pass filter 303 also gives an anti-aliasing of the signal so that a high component of the signal is not able to overpower the system sample rate of preferably 8 KHz. This significantly reduces the interference signal normally found in speech.

The signal from the low pass filter 303 is communicated to pre-emphasis 304. The pre-emphasis 304 is used to eliminate the glottal waveform and lip radiation components of speech. These components typically interfere with vocal tract estimation and therefore the pre-emphasis 304 provides for a more accurate linear predictive coding (LPC) analysis. The use of the pre-emphasis 304 eliminates the variable frequency through a simple one pole differencing filter. In this context it has been found that a pre-emphasis being defined by the function:

$$\text{output} = S(n) - uS(n-1),$$

where S(n) is the sample at time n is acceptable.

The signal from the pre-emphasis 304 is communicated to the Log A/D 305 which translates the heretofore analog signal into its logarithmic digital equivalent. The translation to the logarithmic form allows for elimination of multiplication since logarithmic components, through their addition, effectively perform a multiplication.

The Log A/D 305 signal is communicated to a cross product means 306 which sums chosen elements from the Log A/D 305. These chosen sums are then translated to their linear equivalents 307 and subsequently accumulated selectively by an accumulator 308. In this process, the accumulatior 308 generates reflection coefficients which are usable by the LeRoux/Gueguen formula 309 for the generation of autocorrelation terms.

The autocorrelation terms are preferably formatted/encoded so as to be usable in a speech synthesis device. The autocorrelation terms so formatted are stored in a memory 311 in a first-in-first-out (FIFO) arrangement so that they are retrievable upon demand at 312.

In this manner, the incoming signal is controlled and generates analysis data which is usable for recognition and/or synthesis of a mimic word.

Figure 4:
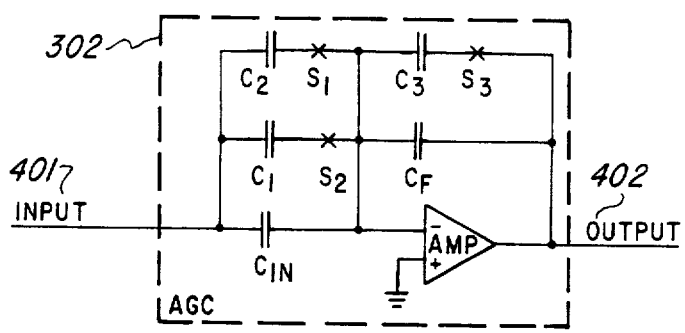
FIG. 4 is an electrical schematic of the automatic gain control of FIG. 3.

FIG. 4 is a schematic of the automatic gain control first described in FIG. 3. The AGC 302 of FIG. 4 accepts the input 401 and through the manipulation indicated by the circuitry, generates an output 402 having the characteristics already discussed.

Figure 5A:
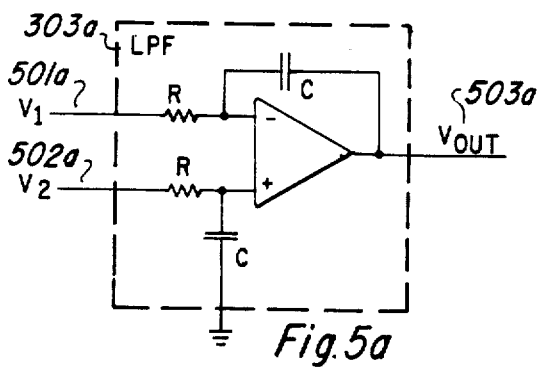
FIGS. 5a and 5b are alternative low pass filters applicable for the analysis circuitry of FIG. 3.
Figure 5B:
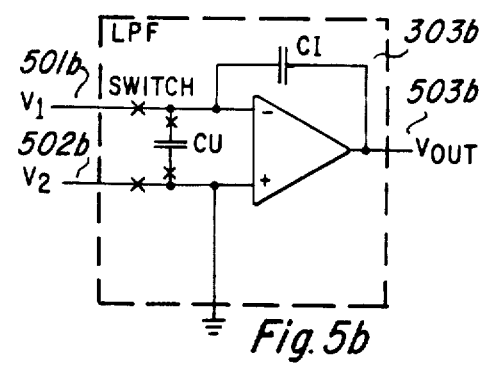

FIGS. 5a and 5b give alternative embodiments which are usable as the low pass filter 303 of FIG. 3. In both embodiments of the low pass filter 303 designated as 303a and 303b, respective input signals 501a, 502a and 501b, 502b are utilized as indicated by the circuitry for generation of output signals 503a and 503b respectively. It is clear that through a choice of the component values, the low pass filter is adjustable to meet the needs and demands of the particular circuitry.

Figure 6A:
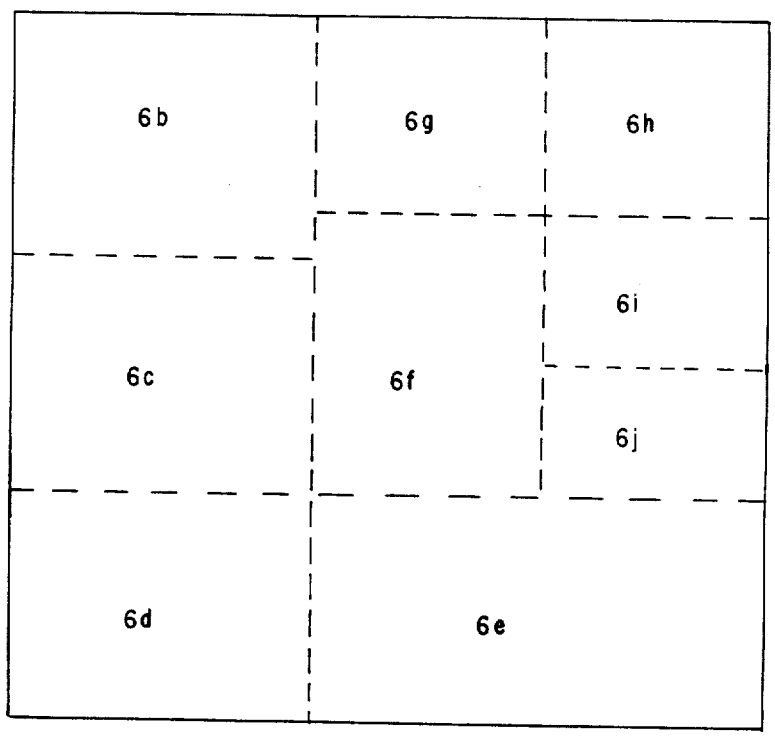

FIG. 6a is a block diagram describing the interrelationship of the various circuit diagrams of FIGS. 6b-6j.

The Log A/D controller circuitry of FIGS. 6b-6j controls in a sequential manner the operation of the switches of FIGS. 8b-8l as well as provides input signals for the circuitry of FIGS. 7b-7j.

Figure 6B:
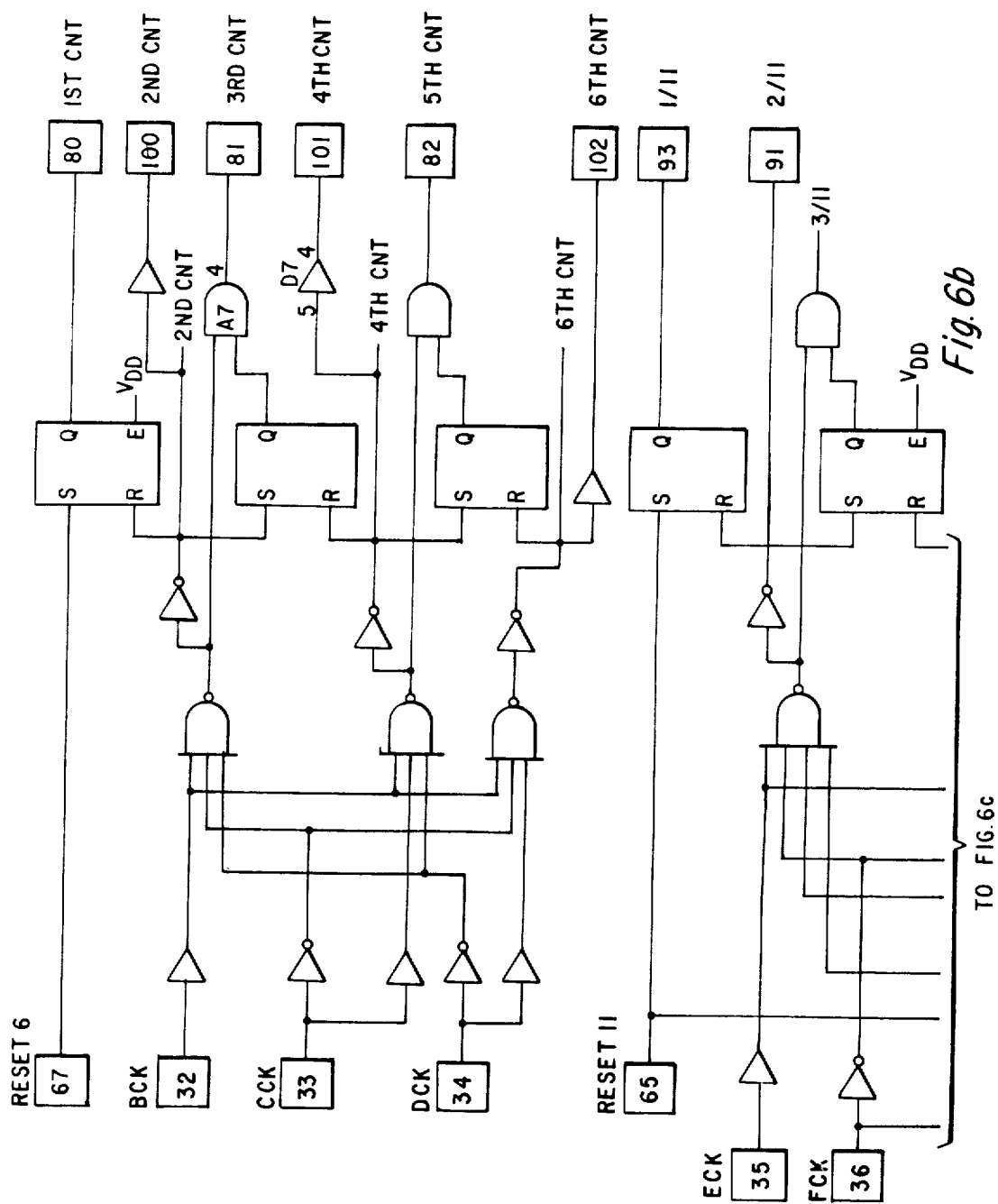
Figure 6C:
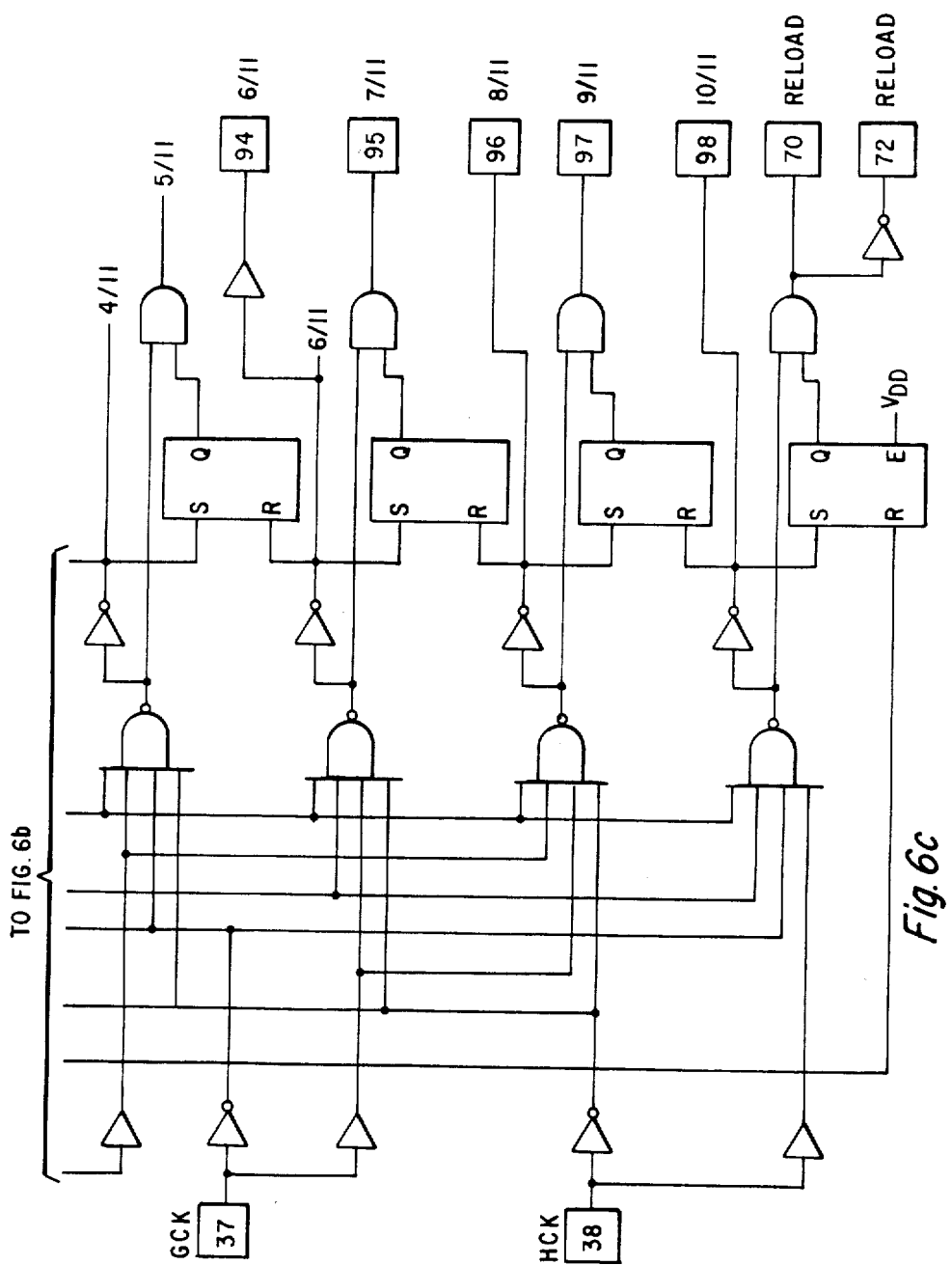
Figure 6F:
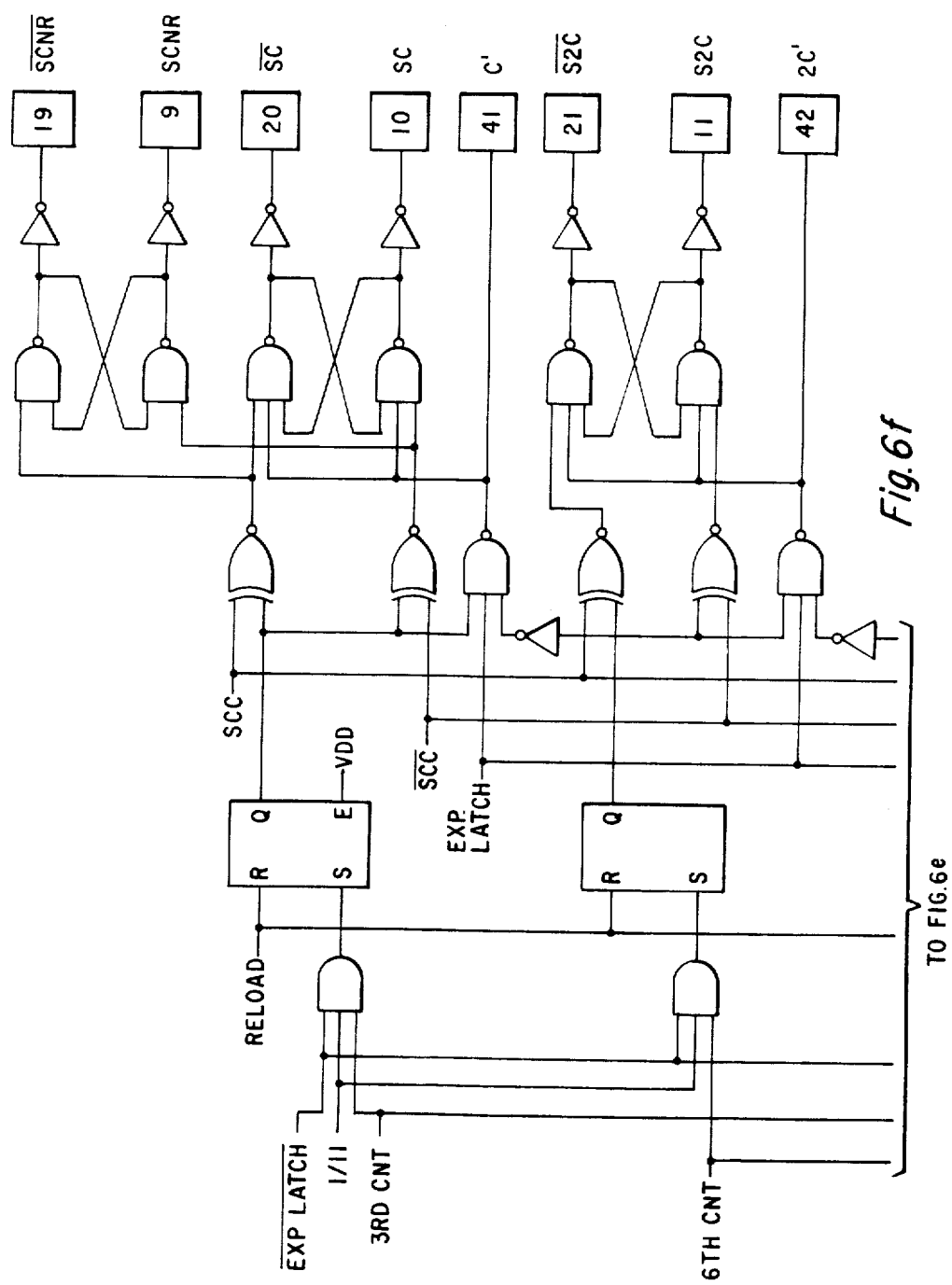

FIGS. 6b and 6c show the derivation of the clock signals which provide the sequential timing relationship for the operation of the Log A/D. These clock signals are repeated every sample period of the Log A/D. In FIG. 6d the decode for the fraction latch is shown. This fraction latch signal results when the Log A/D has completed a decode of the analog sample signal. This signal then drives the digital decode logic of FIGS. 8c and 8h-8j.

FIGS. 6e, 6f, 6i and 6j show the capacitor switch driving logic derivation. This logic sequentially drives each of the capacitor switches of FIGS. 8e-8g. The logic also prevents overlapping drive signals which would cause power spikes on the voltage supply lines.

Figure 6G:
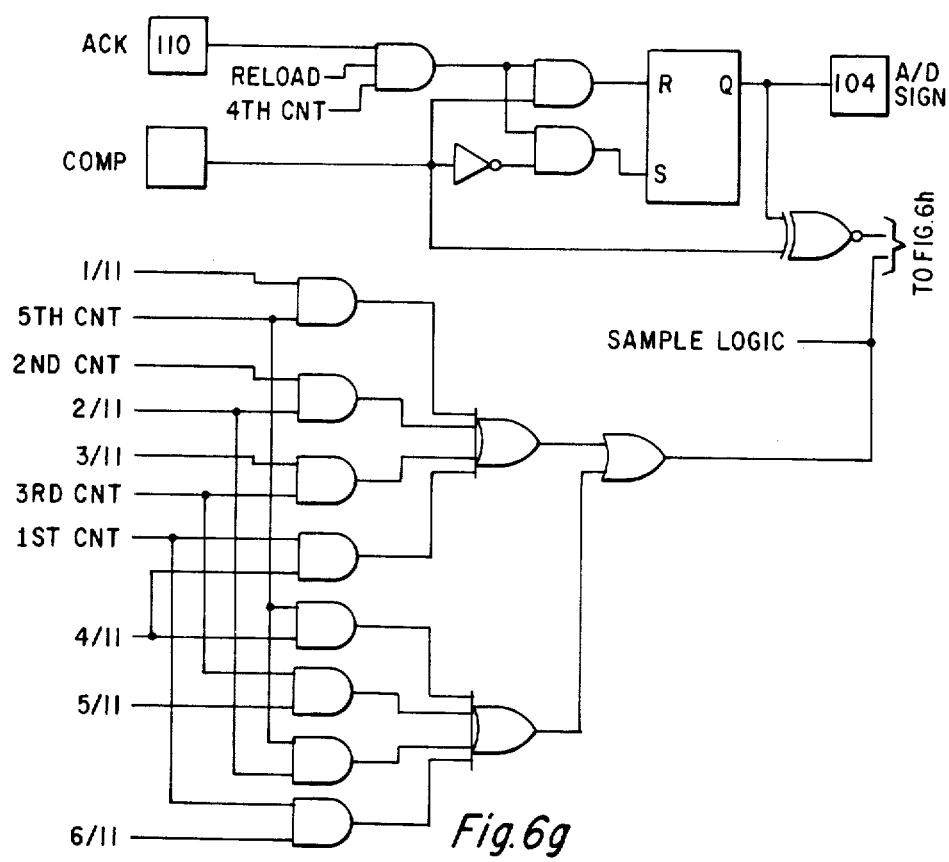
Figure 6H:
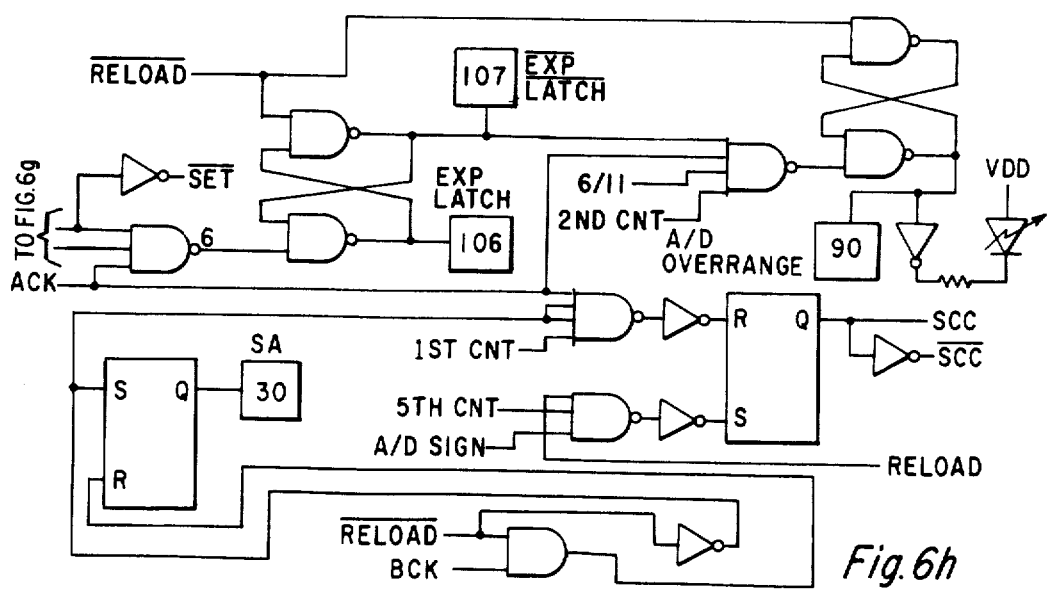
Figures 6I, 6J:
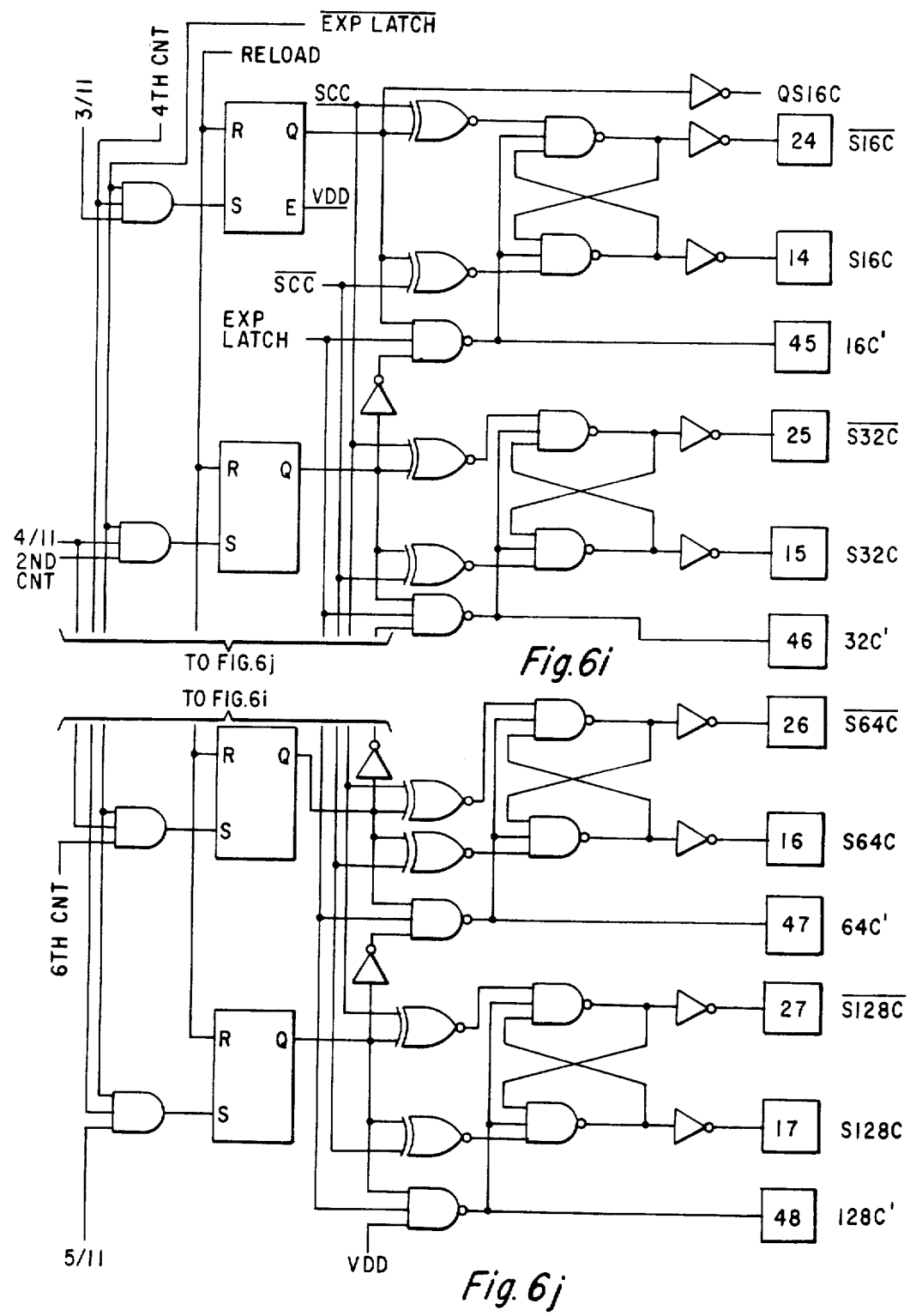

FIG. 6g shows the Log A/D sign decode logic and the sample logic for the log exponent decode. FIG. 6h shows the rest of the exponent decode logic.

Figure 7A:
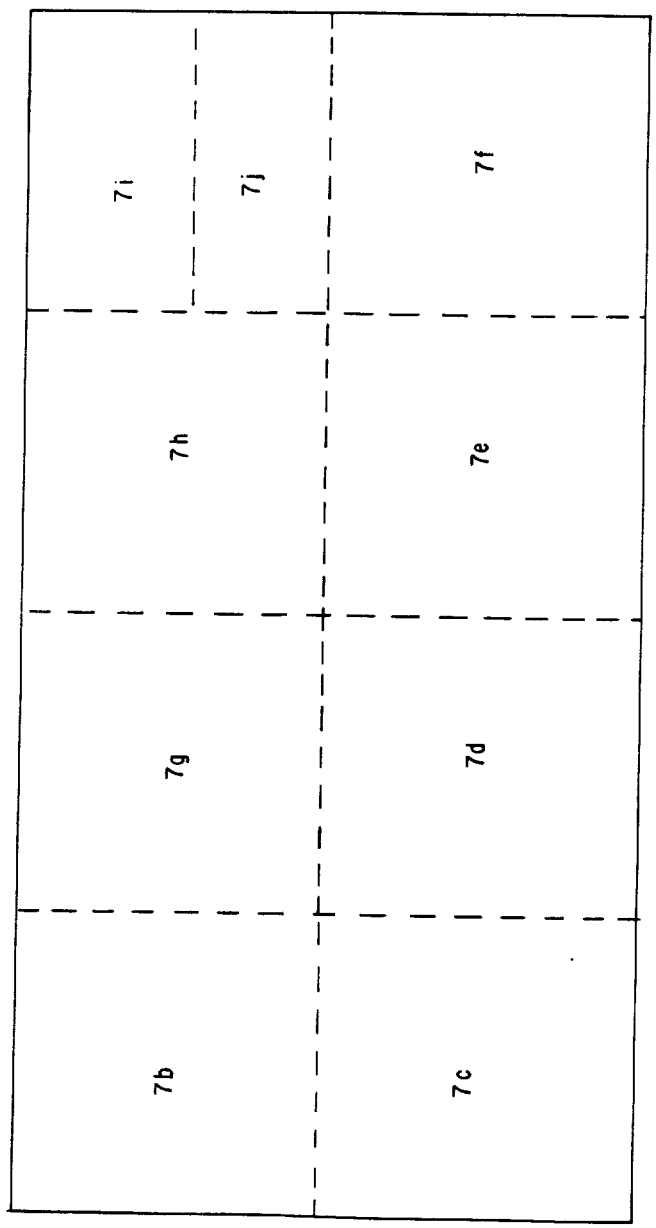
FIGS. 7a-7j are circuit diagrams of an apparatus for generation of the autocorrelation term first described in the analysis circuitry of FIG. 3.
Figure 7B:
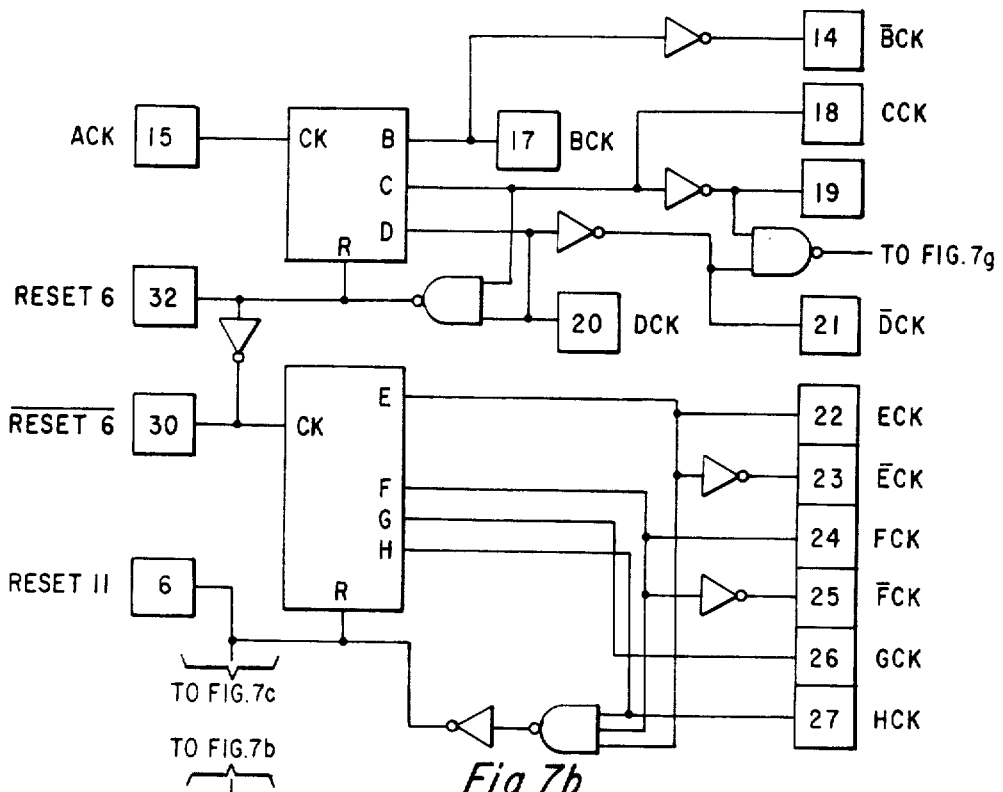
Figure 7C:
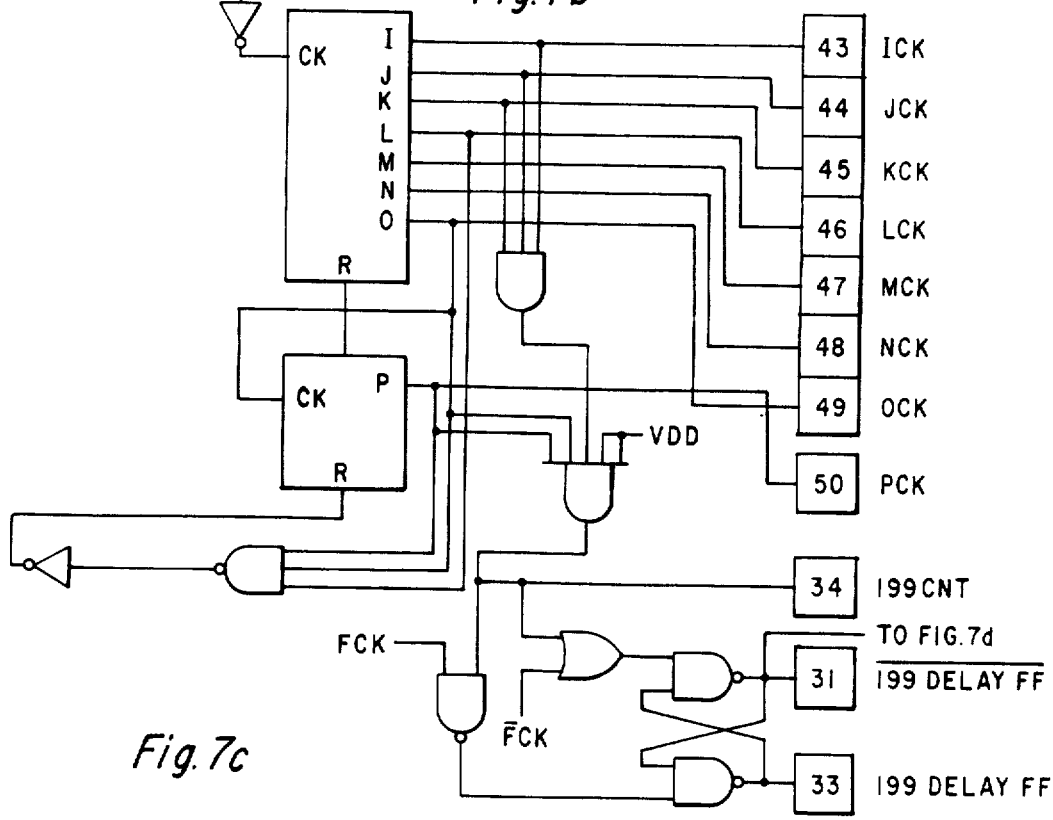

FIG. 7a is a block diagram of the interrelationship of FIGS. 7b-7j.

The FIG. 7 series comprises the autocorrelation circuitry for the speech analysis system. This section performs an autocorrelation function on the digitized speech signal from the Log A/D. FIGS. 7b and 7c show the clock timing logic for the autocorrelation section as well as other areas of the system. This logic provides the sequential timing required to control the autocorrelation function.

Figure 7D:
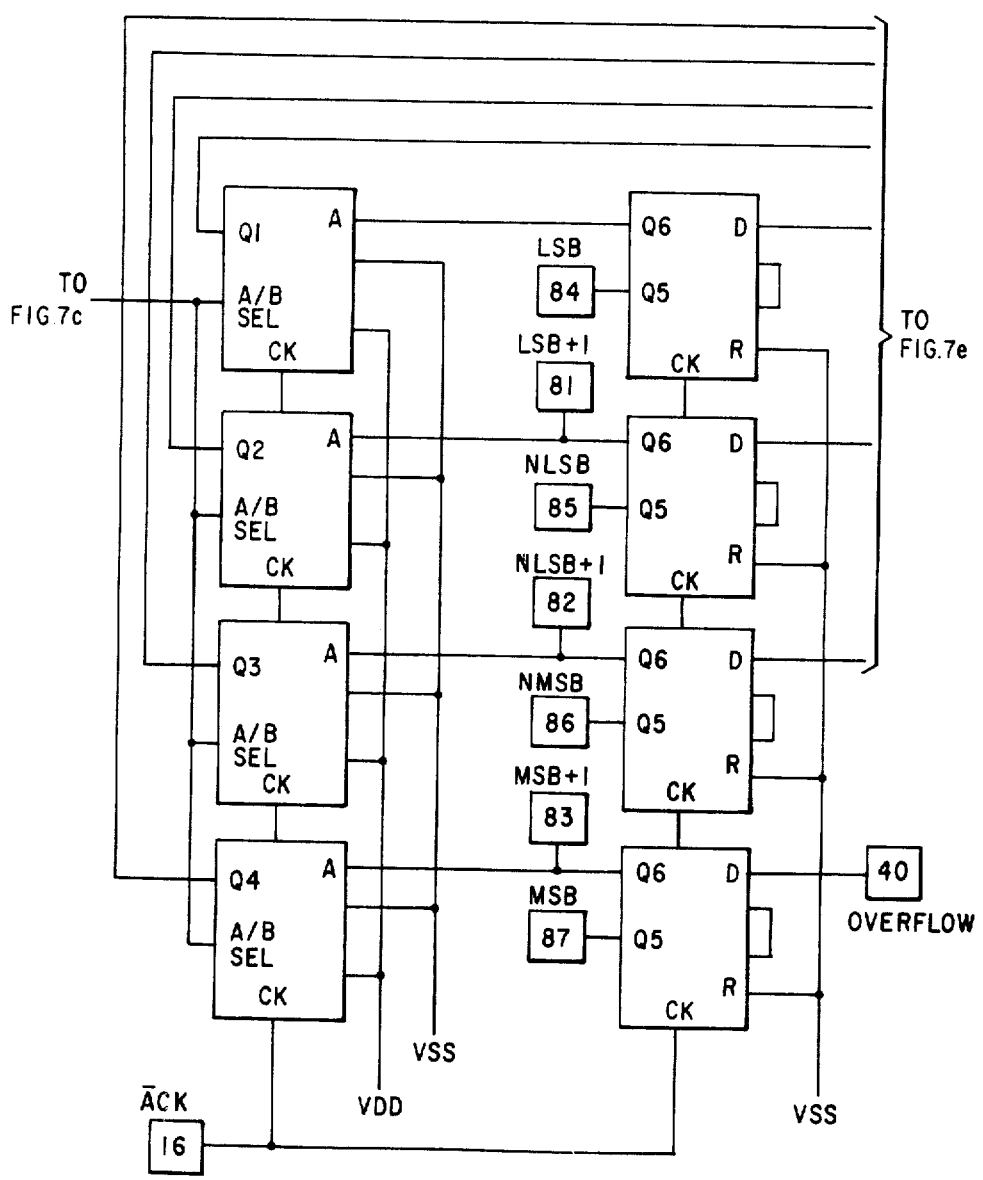
Figure 7E:
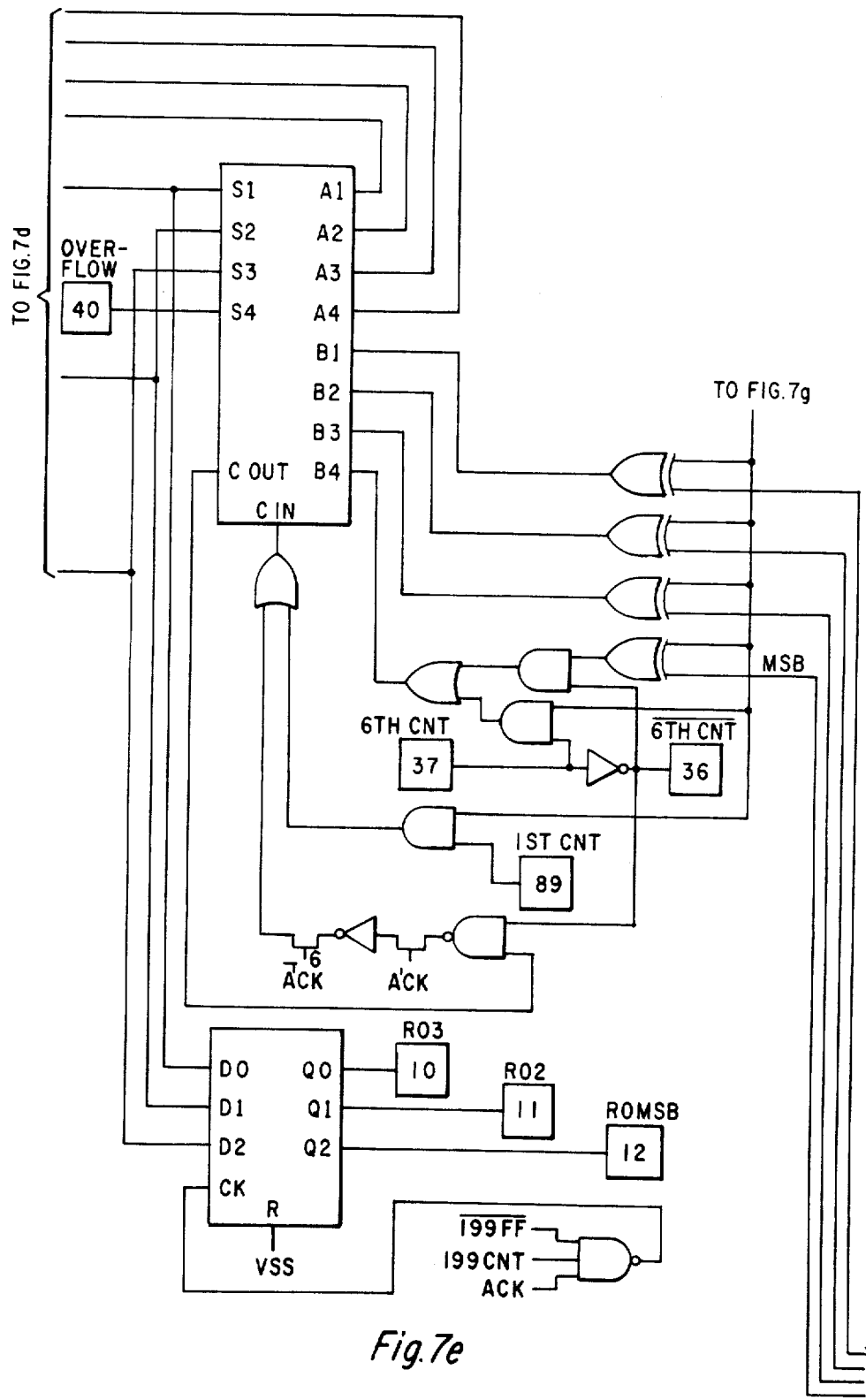
Figure 7F:
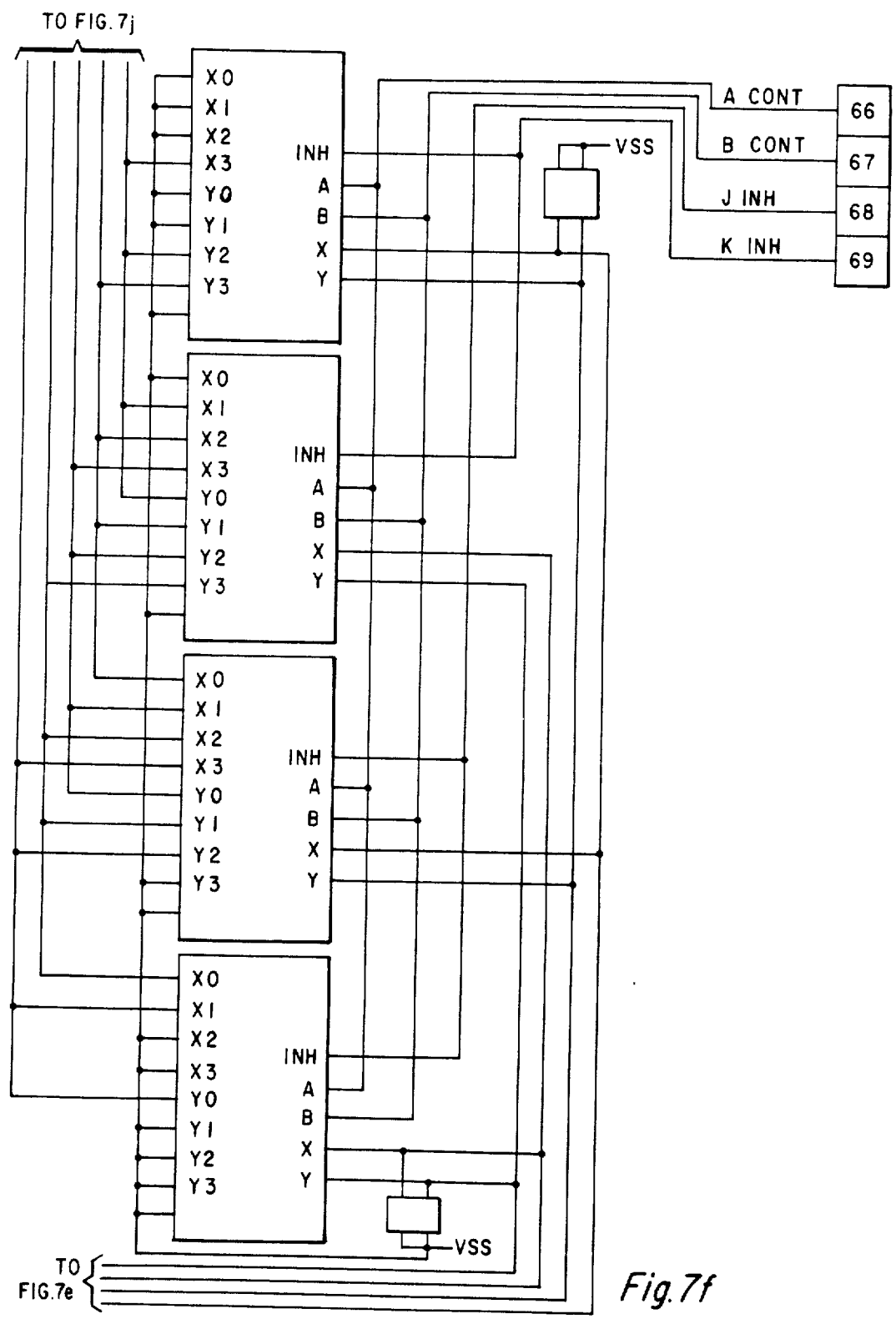
Figure 7G:
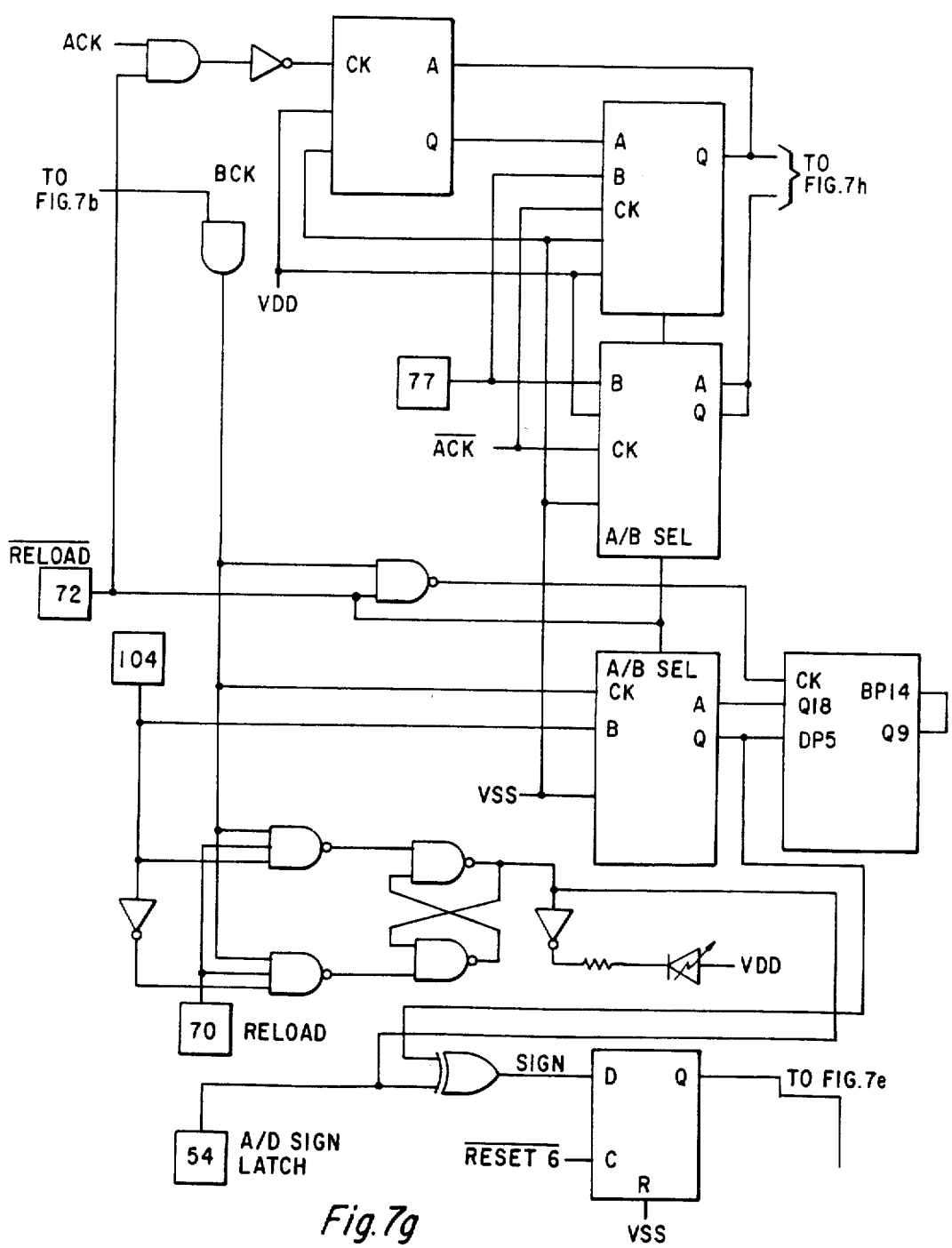
Figure 7H:
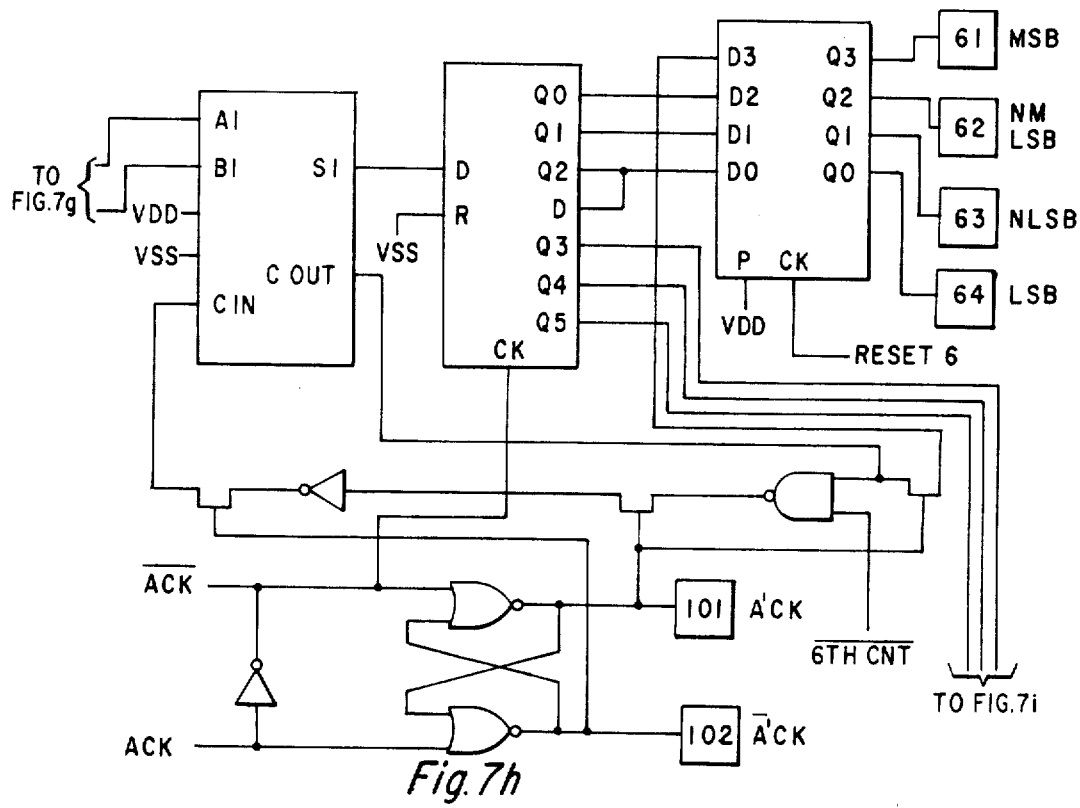

In FIG. 7g, the memory circuitry is shown which stores the Log A/D values prior to generating a cross product or log product function. Output signals from this section drive the cross product adder of FIG. 7h. This adder performs a logarithmic addition of the A/D values so as to in effect produce a multiplication of these values.

Figure 7I:
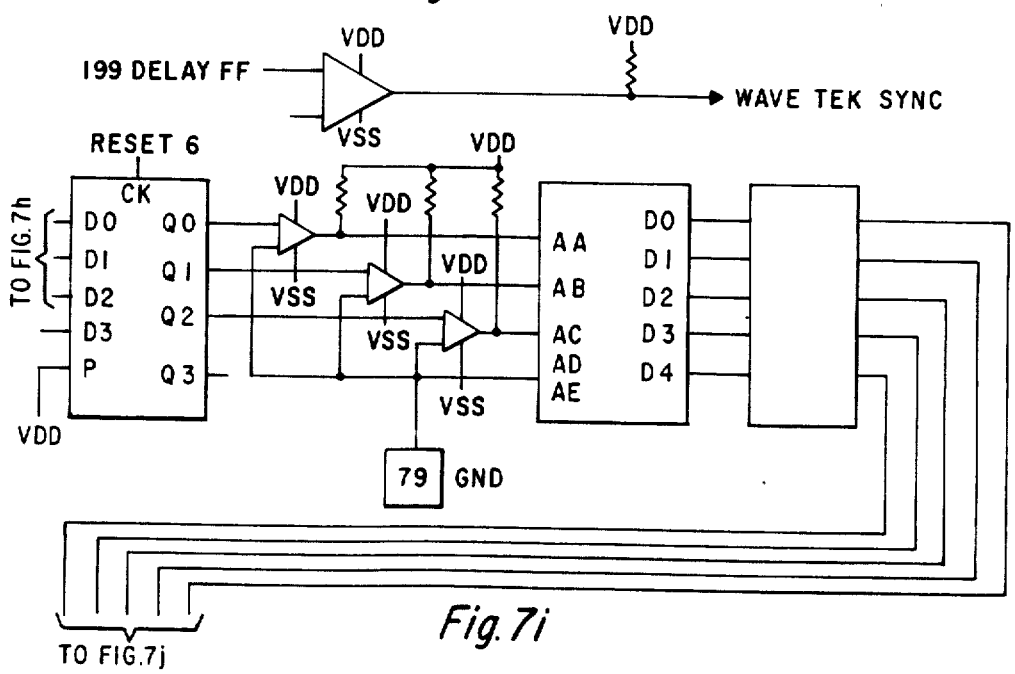
Figure 7J:
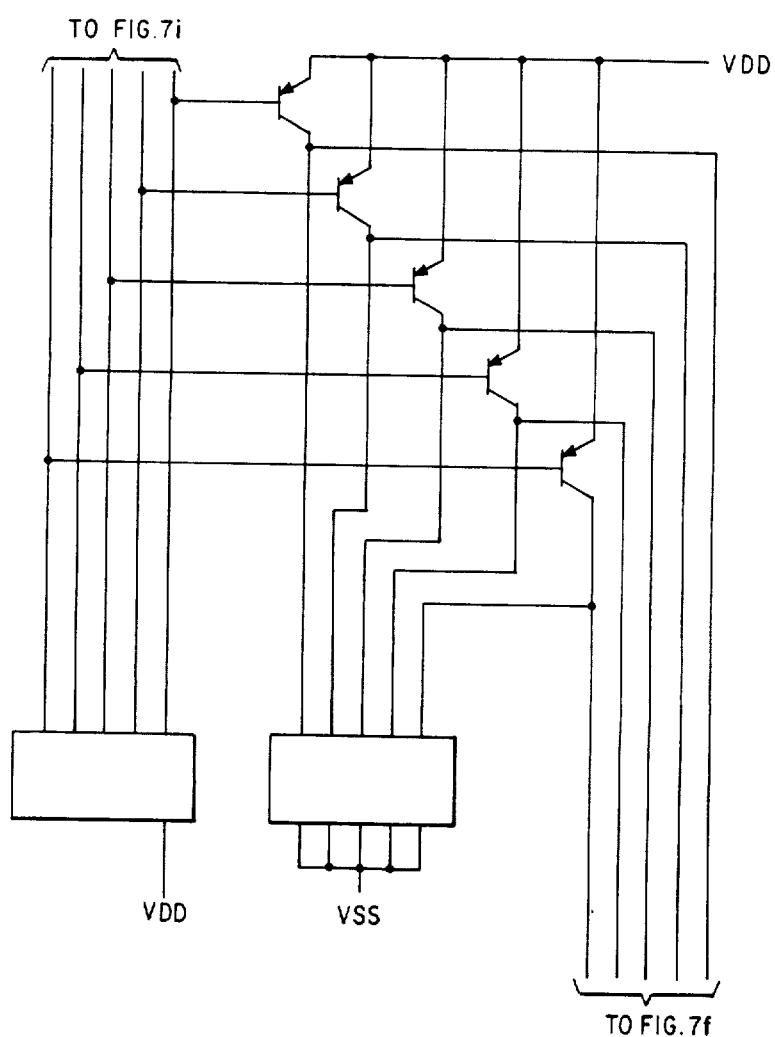

FIG. 7i comprises a log to linear table and along with the circuitry of FIGS. 7j and 7f completes the logarithmic-to-linear conversion of the cross product. This function allows algebraic addition to be performed on the cross products being generated in order to accumulate all cross products being generated for a given period of time.

The accumulator circuitry is shown in FIGS. 7d and 7e. The accumulator takes the linearized cross product functions from the Log-to-linear table and adds them to each other so as to complete the autocorrelation function. FIG. 7d shows the autocorrelation memory which stores each accumulation. In the preferred embodiment, there are eleven accumulated values stored in the memories each of which is a log correlation value. FIG. 7e shows the adder, complementor and control logic for the accumulator.

Figure 8A:
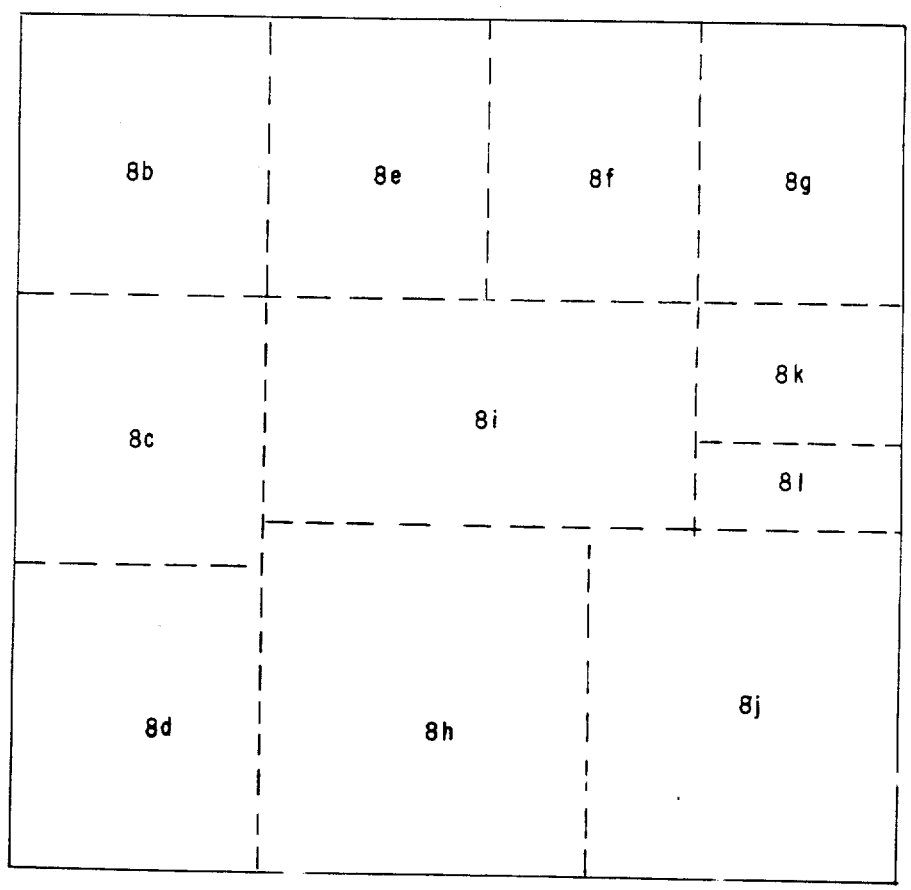
FIGS. 8a-8l are circuit diagrams of an apparatus for the logarithmic analog to digital generation first described in FIG. 3.

FIG. 8a is a block diagram of the interrelationship of FIGS. 8b-8l.

FIGS. 8b-8l are directed to the pre-emphasis section, Log A/D circuit, some additional Log A/D control logic not covered in FIGS. 6b-6j and finally the Log A/D decode logic which codes the log digitized value into binary arithmetic. FIGS. 8b-8l along with FIGS. 6b-6j comprise the preferred but not the only method of implementing a logarithmeic A/D.

Figure 8B:
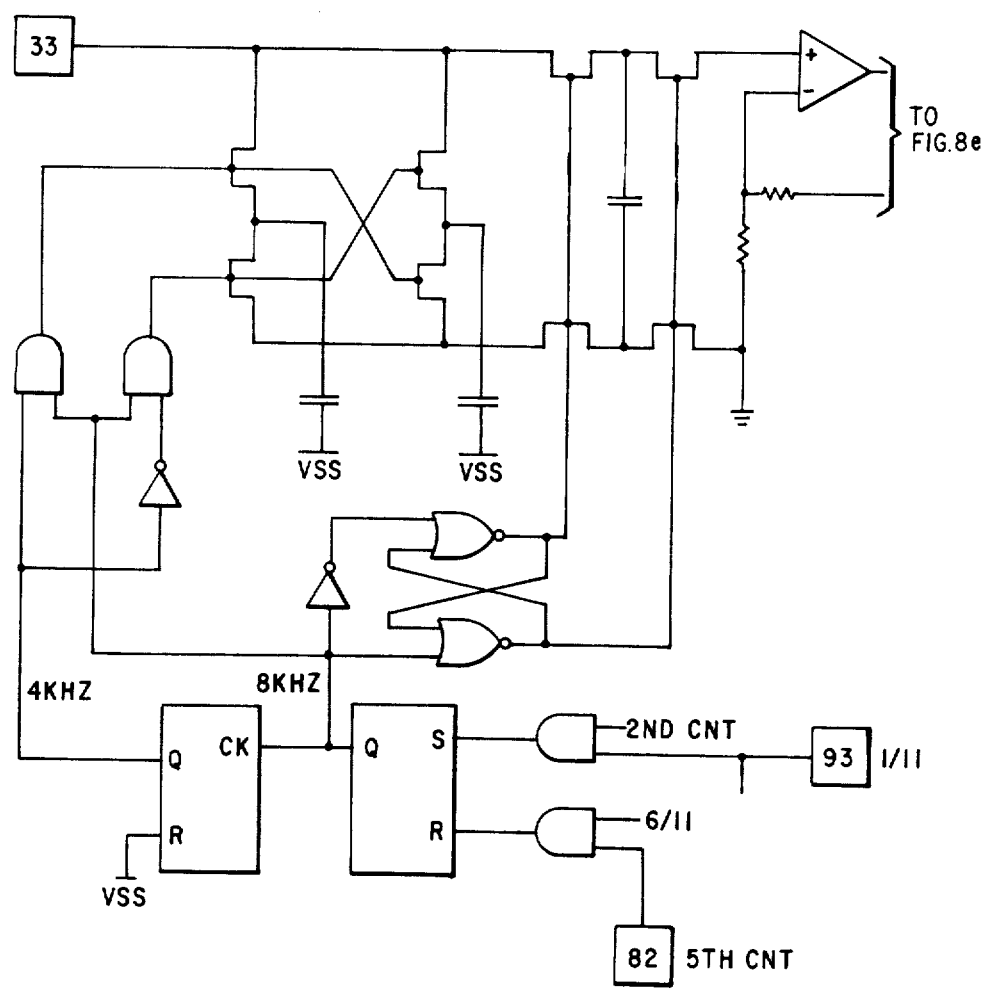

FIG. 8b is directed to an anlog pre-emphasis function which performs a filtering operation on the incoming analog speech signal before it is decoded by the Log A/D. The pre-emphasis function accentuates high frequency components of the analog signal so as to help eliminate some of the unwanted components of a low frequency nature in the speech signal.

Figure 8C:
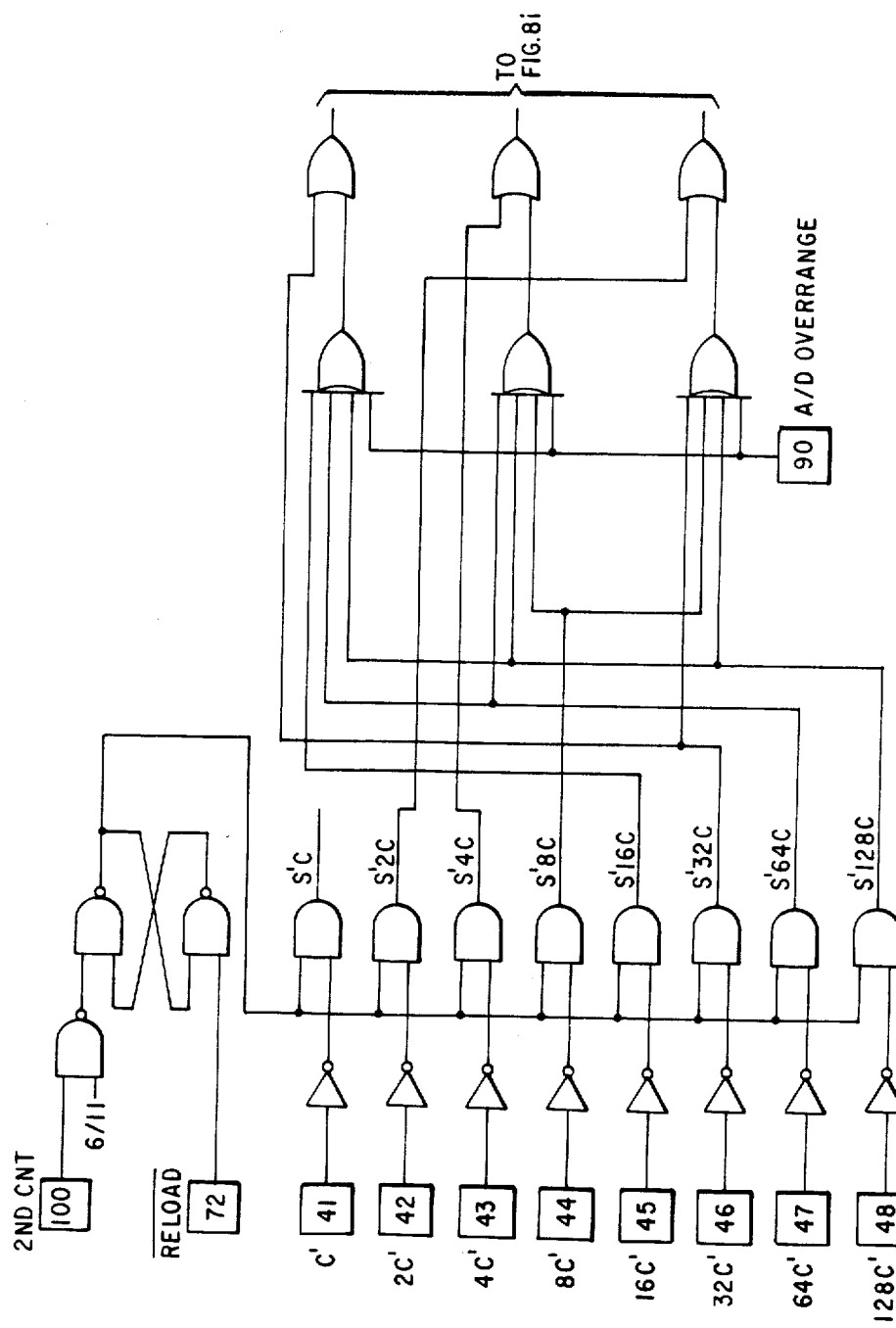
Figures 8D, 8E:
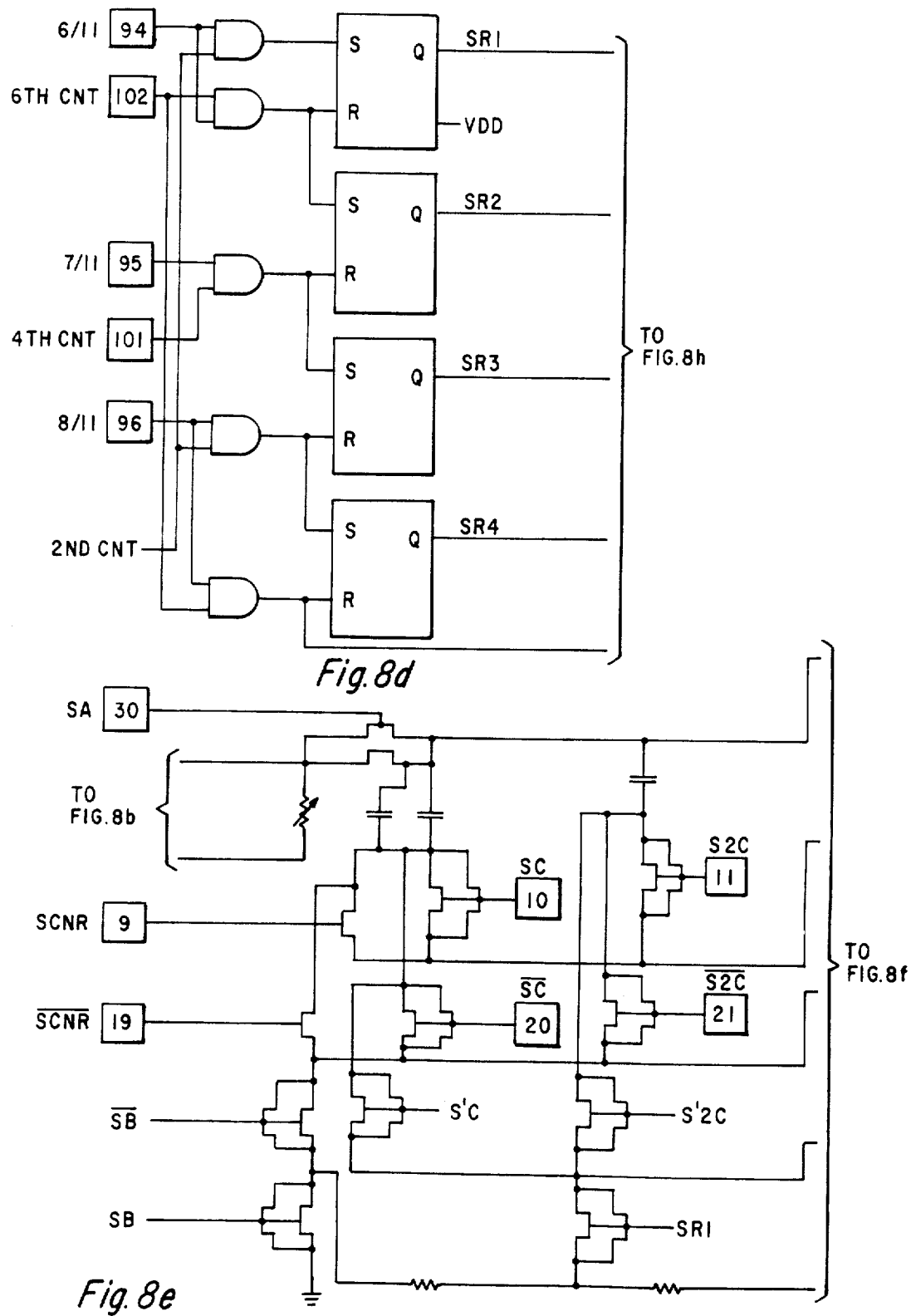
Figure 8F:
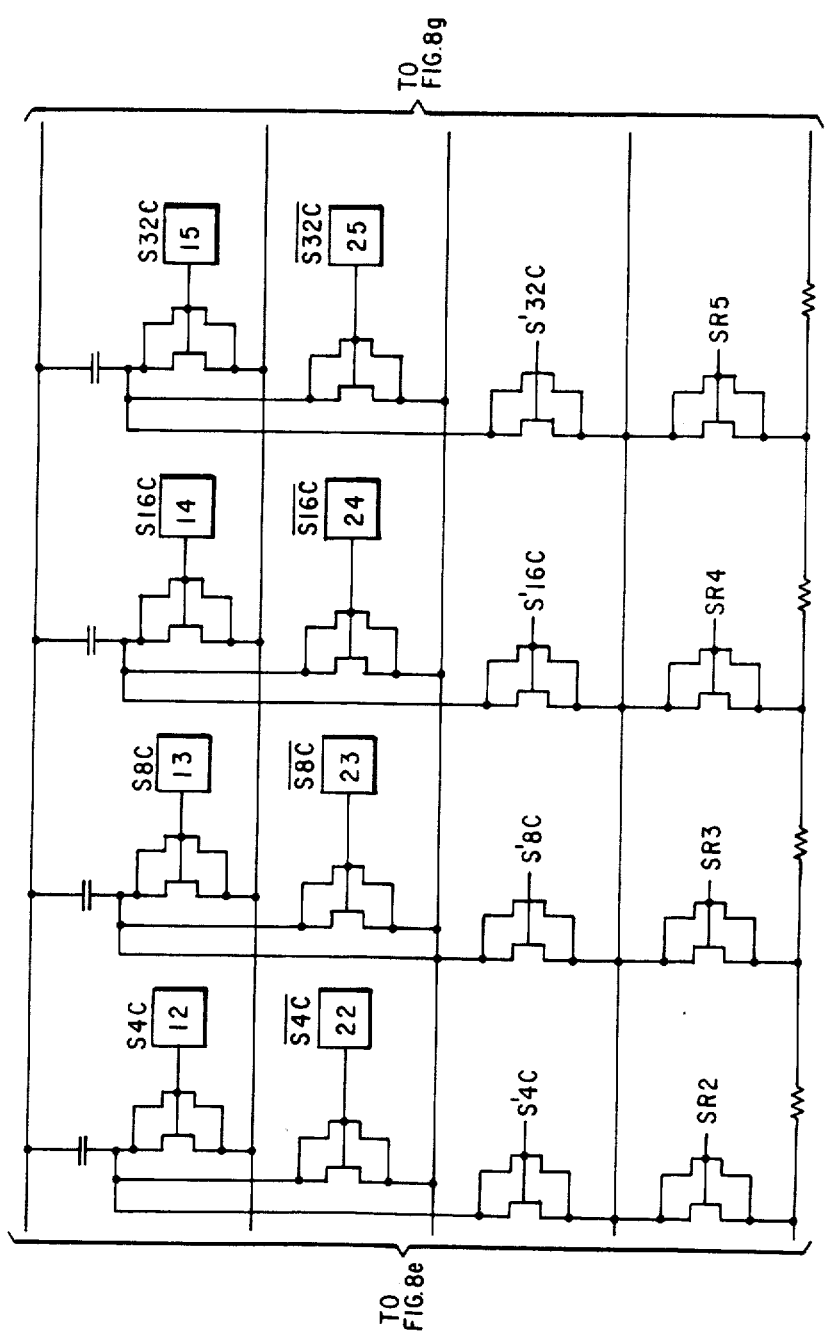
Figure 8G:
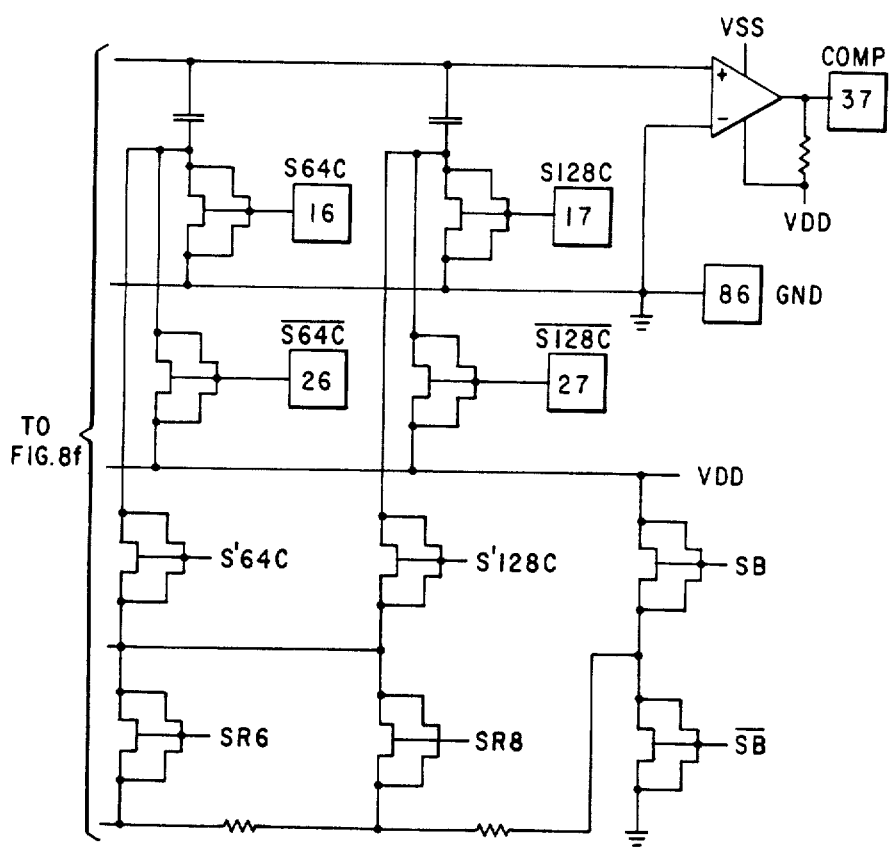
Figure 8H:
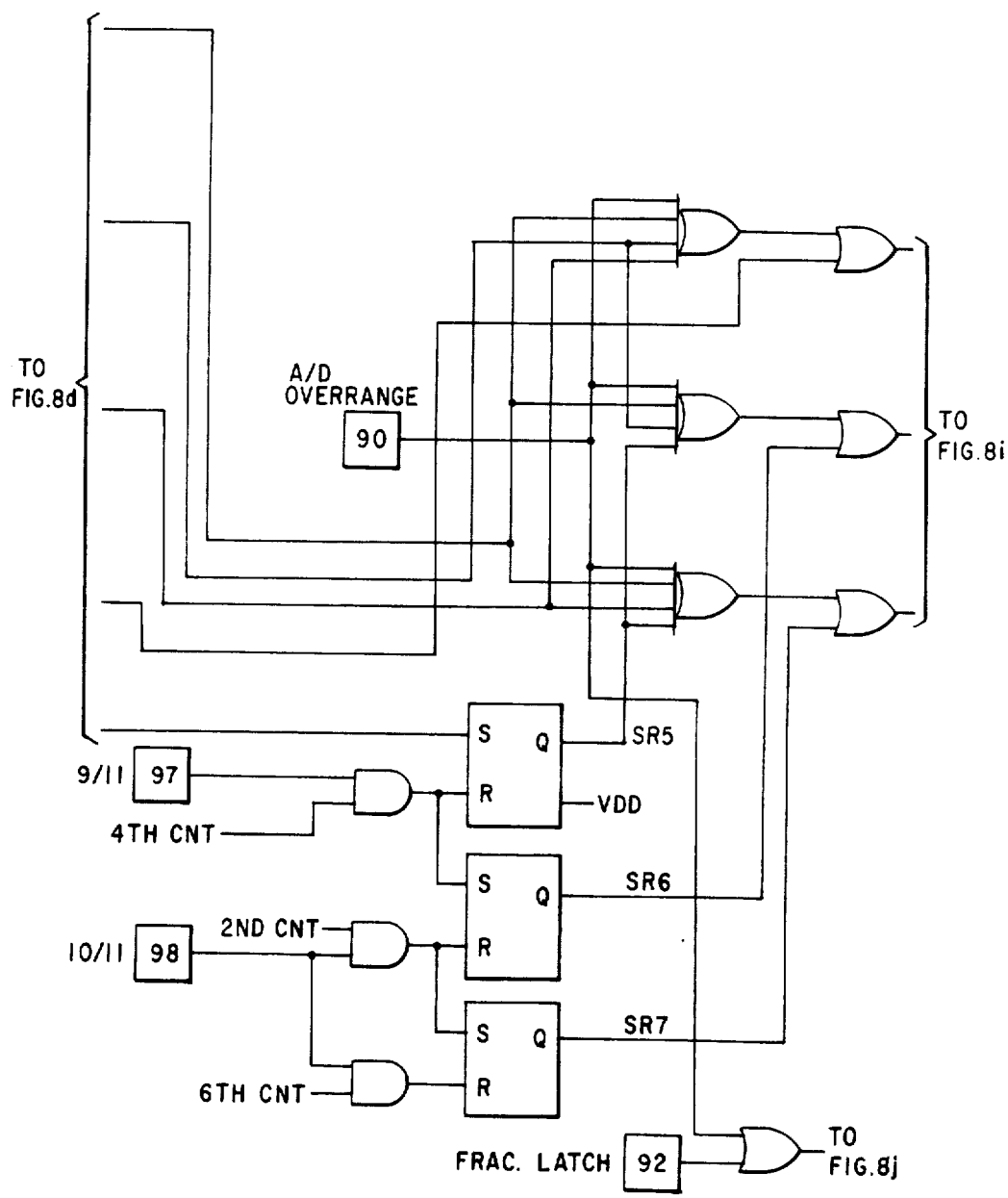
Figure 8I:
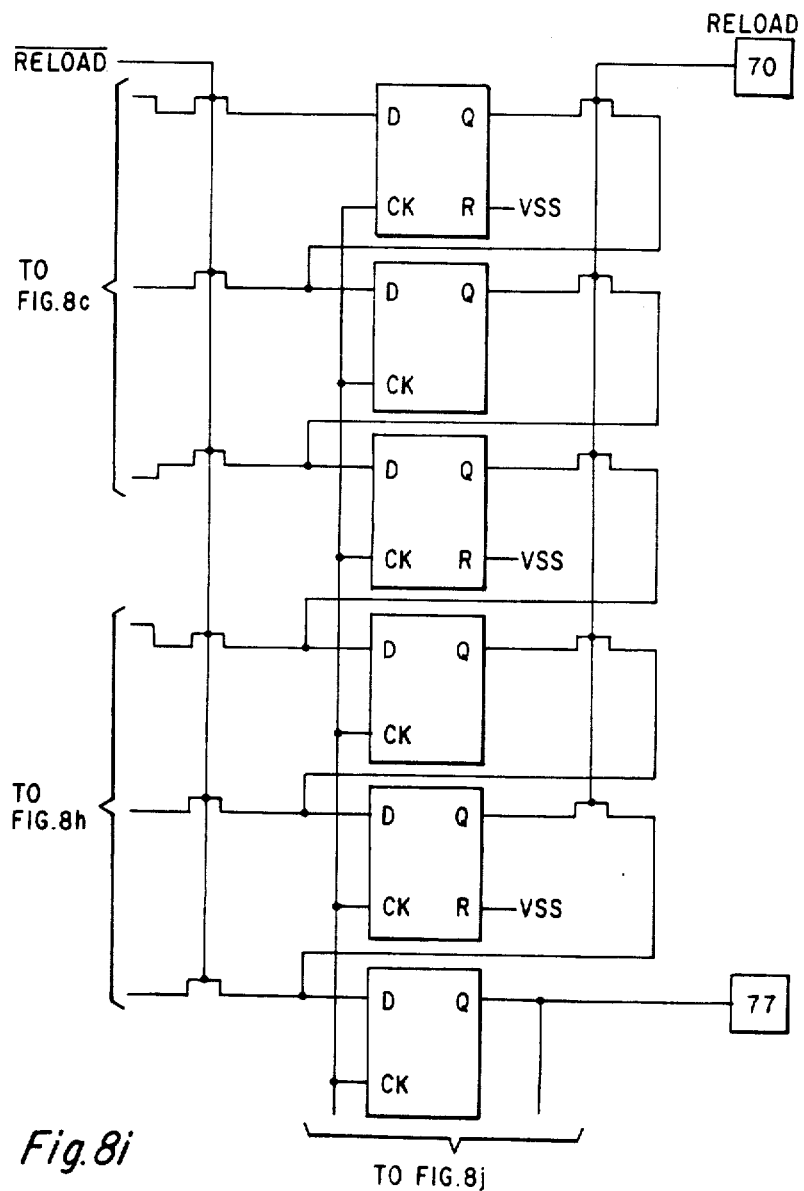
Figure 8J:
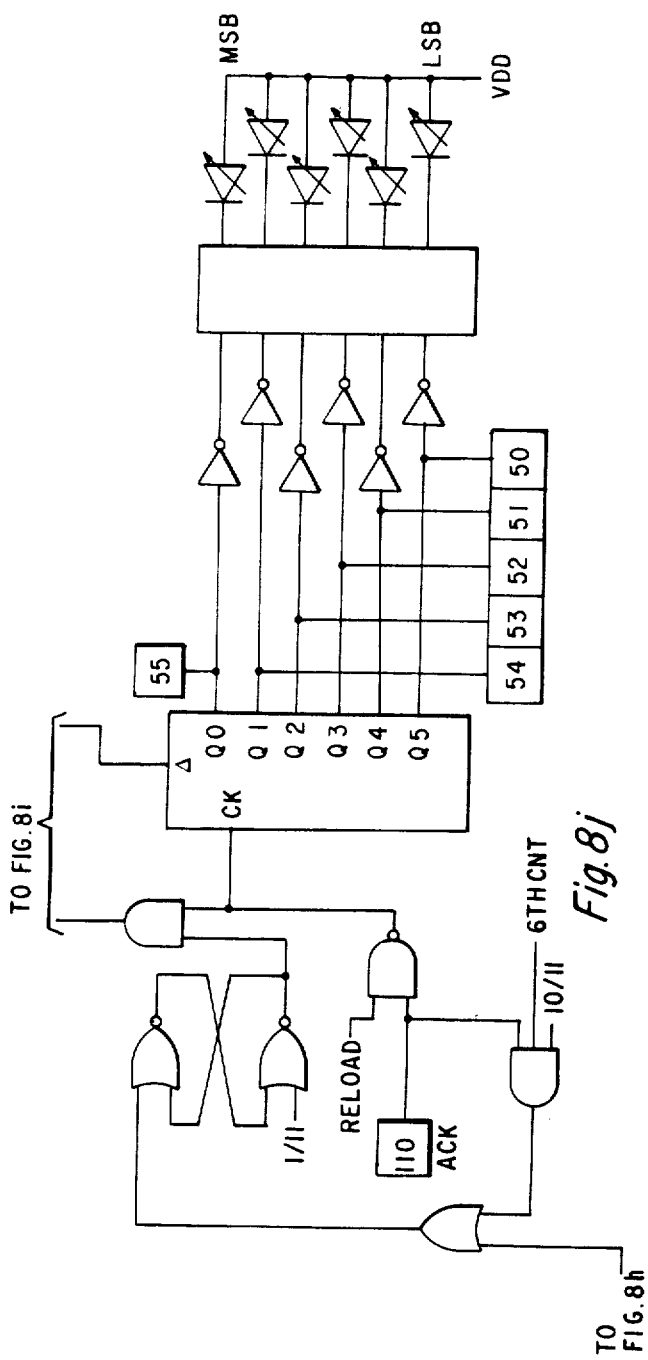
Figure 8L:
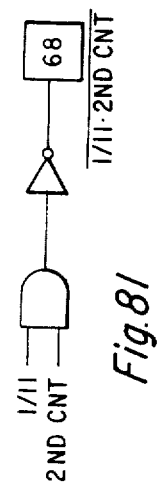
Figure 8K:
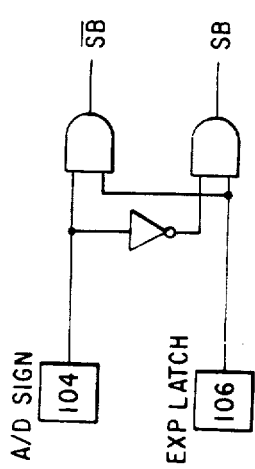

FIGS. 8d, 8h and 8k illustrate the circuitry which controls the resistor switching for the resistor strings of FIGS. 8e-8g. This circuitry provides the proper timing and logic control to switch resistor voltages generated in the resistor strings to one plate of the capacitors of FIGS. 8e-8g. This logic controls the fraction determination portion of the Log A/D.

FIGS. 8e-8g show the weighted capacitor, resistor divider string, and the control switches. The purpose of this circuit is to take the analog sampled signal from the pre-emphasis section and dissect it into discrete values of analog voltage so as to establish a digital value which represents the logarithmic equivalent to the original analog value.

FIGS. 8c and 8h show the circuitry required to decode the discrete values of analog voltage established by the circuitry of FIGS. 8e-8g into binary code. Additionally, FIG. 8c shows a memory output section of the Log A/D which keeps the resultant digitized log value until the autocorrelation section is ready for it. It also serializes the parallel Log A/D code so that it can more easily be used by the autocorrelation section.

FIG. 8j shows the clock decode section for FIG. 8c and also a display driver section which allows the logarithmic code to be displayed by the lighting of light emitting diodes or other suitable display.

Figure 9:
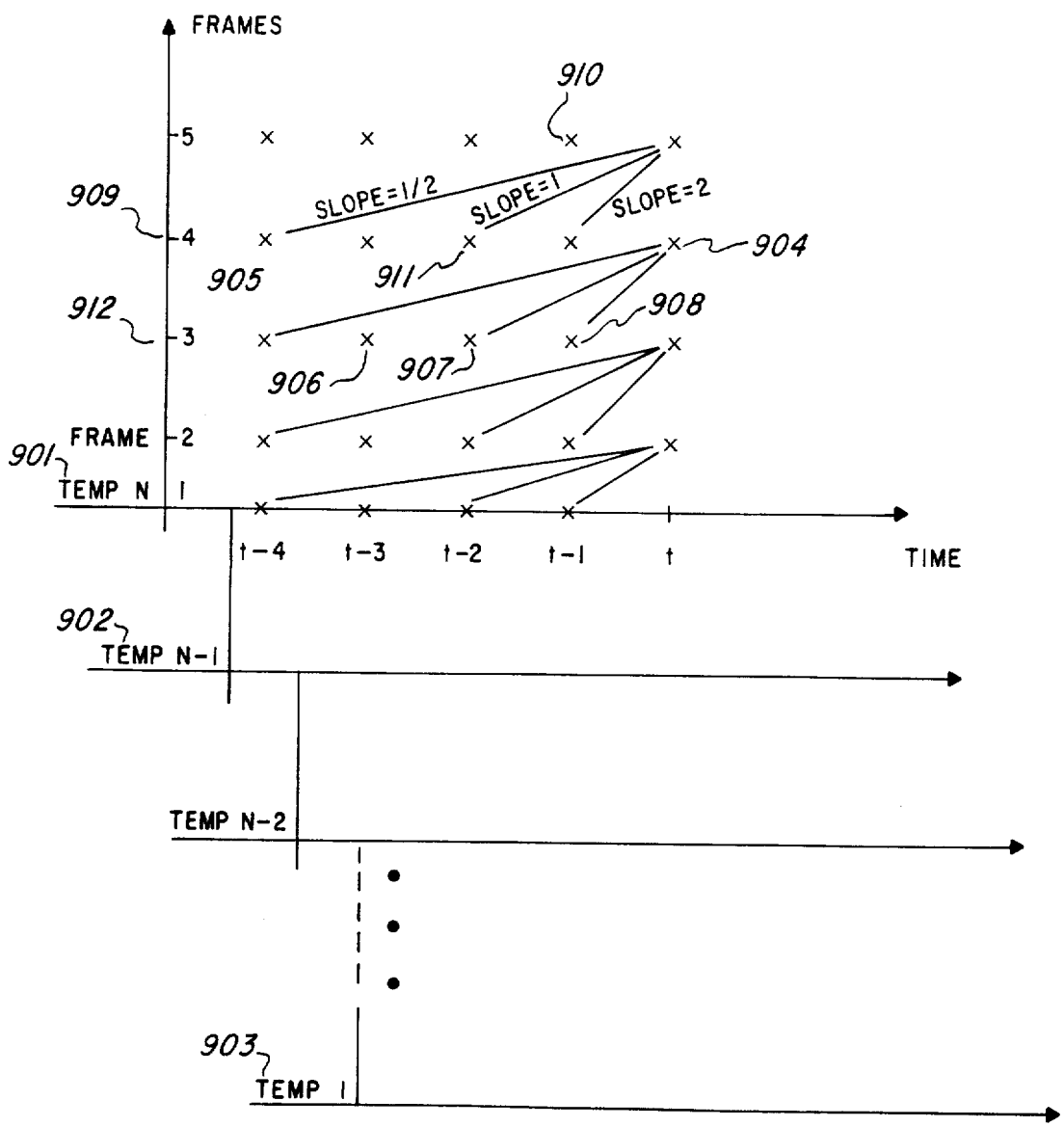
FIG. 9 is a graphical representation of the operation of dynamic time warping.

FIG. 9 is a diagram of the time warping attributes of the preferred template matching. A plurality of templates are stored in the memory means. These templates (901,902, . . . 903) are used for matching the analysis data as described earlier so as to determine which word, phrase or sound was originally spoken by the operator.

One of the handicaps with recognition is that the time necessary for the pronunciation of a particular word varies from speaker to speaker and additionally from occurrences to occurrences for the same speaker. These time differences are typically generated due to cultural, geographical, or physical variances between the speakers.

In the preferred embodiments, a frame time of 25 milliseconds is used. A particular input frame may correspond to any of the previous frames associated with a particular template.

As is shown by template N, 901, the objective is to find the minimal contour in matching an incoming frame of data to the target frame within the template 901. In this regard, the optimal contour contemplates the transition or mapping at x(t), 904, (time t) with all other possible time frames of matching templates. That is, at x(t), the input frame is optimally matched with all underlying frames. (i.e. all prior sequential frames are considered.)

For example, the incoming frame 904 is mapped relative to the target frame 909 which is the fourth frame within template N, 901. The input frame 904 is not mappable to any frame which occurs at a prior time (corresponding to a frame of higher hierarchical order). That is, frame 904 is not mappable to either the fifth frame at $x(t-1)$, 910, or to the fourth frame at $x(t-2)$, 911, since these are infeasible contours.

Input frame 904 is mappable to all prior hierarchical and time frames (times: $t-1, t-2, \ldots$; hierarchy: frame 3, frame 2, frame 1) in all possible orders.

So as to create an operable system, that is one that does not take an excessively long amount of time for computation, it has been found that consideration of the prior hierarchical frame alone (in this example frame 912) and only at selected prior times is sufficient. Only $x(t-1)$, $(t-2)$ and $(t-4)$ are considered. Hence, input frame at 904 is mapped to the frame 908, frame 907, and frame 905.

Continuous computation as to a minimal path to each of these target frames (905, 907, and 908 in this example) yields a minimal path to those points. In considering the path to frame 904, the minimal possible path from these target frames is made so that the minimal path to frame 904 is so derived. In subsequent computation, this minimal path so derived for frame 904 is utilized in the computation for $x(t+1)$ and subsequent times.

It should be noted that a frame occurring at x(t) must be mapped to all target frames; this includes each possible frame within each template. The sheer number of simple computations so required by this task necessitates that it be done as efficiently as possible so as to create an apparatus which is not excessively time consuming.

FIGS. 10a, 10b and 10c illustrate a memory arrangement for the computation of a dynamic time warping as described in FIG. 9. The present example utilizes LPC-4 (a lattice filter with four orders of filters). The input frame at x(t), 1001, is used relative to each of the templates within the repertoire. In this example template j, 1002, is being studied relative to the input frame 1001. Template j 1002 contains, in this example, five frames of LPC-4 data; hence, this word took 5×25 milsec = 125 m. sec to state. Comparison of each frame of data relative to the input frame 1001 generates a column distance matrix 1003. Although any function may be used in this comparison, the Euclidean distance is preferred.

The column distance matrix is used relative to a minimum matrix at $x(t-1)$, 1004. The minimum matrix 1004 has five rows (corresponding to the five frames in question) and four columns (corresponding to the previous four time periods). The minimum matrix 1004 indicates the minimal contour which has been generated up to $x(t-1)$. Note, that the apparatus as described herein is operating continuously and not sporadically or selectively; that is, the minimal matrix 1004 is continuously being updated as described hereinafter.

For example, the distance value 1008 (corresponding to frame 3) of the distance matrix 1003 is utilized with the minimal path to frame 2 at $x(t-1)$, $x(t-2)$, and $x(t-4)$ (1012, 1011, 1009 respectively). The minimal value to the target frame, frame 3, from frame 2 for the times in question ($t-1$, $t-2$, and $t-4$) yields the minimal contour available at x(t) for frame 3. In this situation, the minimal contour is from $t-2$ (having a value of 2) 1011, so as to generate the minimum value 1013 within the minimal column 1005. Note that the upper value 1007 of the minimal column 1005 is indicative of the score for a sequential input of frames ending at time t and matched to template j. This value 1007 is used relative to corresponding values in the other templates so as to enable choosing the word being recognized. The minimum column 1005 is placed within the minimum matrix to replace the oldest minimum column therein. In this example the minimum clock 1005 replaces the column previously denoted $t-4$.

Note that in this arrangement only four columns of data need to be kept for each template. This data is updated each time frame. This architectural arrangement significantly reduces the number and complexity of computations for the recognition of an input sequence.

FIG. 11 is an architectural arrangement for implementation of dynamic time warping as already described. Note that this architectural arrangement computes all values necessary for a single template. The input frame 1101 is communicated to a local distance computation means 1109. The local distance computation means 1109 utilizes the input frame 1101 together with frame 1, 1102, of the chosen template in computing the Euclidean distance therebetween. This Euclidean distance is communicated to a summer 1110 and additionally to a memory 1106.

The memory 1106 (illustrated here as a random access memory) stores the past four errors or distances derived by the local distance computation means 1109. Only in the lowest filter arrangement is this memory 1106 necessary. The memory 1106 communicates the three relevant past errors (corresponding to $x(t-1)$, $(t-2)$, and $(t-4)$ to the past errors memory 1107. The past errors 1107 communicates these relevant errors or distances to the minimization means 1108 which chooses the minimum of the three. The minimum of the three, together with the current local distance is summed by the summer 1110 and communicated to the next lattice or filter memory means 1107 (in this instance 1107a).

Thereafter each lattice or filter for computation performs exactly alike; that is, it receives the past error in its memory 1107, communicates it to a minimization means 1108, and sums it with the Euclidean distance from the input 1101 and the template for that target frame 1103 via the local distance generator 1109a. The output is communicated to the next higher lattice to be used in its computation for subsequent time periods. The output of the final filter 1111 is used as an indicia representative of the matching ability of the previous sequence of input frames relative to this template j. This output 1111 is used relative to the output of other templates for choosing the best match.

FIGS. 12a and 12b illustrate a second architectural arrangement for performing the dynamic time warping as explained earlier. In FIG. 12a, each frame has a dedicated hardware arrangement for performing its minimization operation. All frame architecture is identical except for frame 1.

In frame 1, 1201, the LPC-4 data from the sample (1206, 1207, 1208 and 1209) is communicated to their respective differencing means (1202, 1203, 1204, and 1205 respectively). The differencing means utilizes the template frame data (1210, 1211, 1212 and 1213 respectively) in determining the Euclidean distance to the sample. Each differencing means communicates its four bit resolution to the adder 1214 for completion of the Euclidean distance. The resultant from the adder 1214 is communicated to the next frame 1202.

The architectural arrangement of frame 2 through frame n is described in FIG. 12b. The four bit data communicated from the previous frame 1215 are stored in four different single bit stacks (1216, 1217, 1218 and 1219); hence, within a four bit sequence ABCD, the most significant bit A is stored in 1216, bit B in 1217, bit C in 1218 and the least significant bit D in 1219. The memory stacks, such as 1216, are first-in-first-out (FIFO) arrangements in which at each clock period, the contents are moved downward. The contents within the stacked memory corresponding to x(t−1), (t−2) and (t−4) are communicated to a minimizing means such as 1220. Minimizing means 1220 determines, according to the three single bits, if a minimum value is determinable. If this minimum value is determinable, it is communicated to the other minimizing means via a two bit line 1227. Similarly if it is not determinable this also is communicated by the two bit line 1227. The four minimizing comparators 1220, 1221 etc. determine the minimal value from the possible three time periods in consideration. This minimal value is communicated to the adder 1222.

For example, assume that the four bit strings to be compared are A=0001, B=0101, C=1001 and D=1111. Minimizing means 1220 determines that only A and B should be further considered since their initial bit is a "0". Minimizing means communicates "0" to adder 1222 and a control signal to minimizing means 1221.

The control signal instructs minimizing means 1221 only to consider A and B. Minimizing means 1221 determines that of its possible selections, (A and B) A is lower since its second bit is a "0", not a "1" (B). Minimizing means 1221 communicates a "0" to adder 1222 and a control signal to minimizing means 1229.

Since only one selection exists for minimizing means 1229 (A), it communicates a "0" (third bit of A) to adder 1222 and a control signal to minimizing means 1230. Similarly, minimizing means 1230, since it has only one choice, communicates a "1" (fourth bit of A) to the adder 1222.

In this step manner, the minimal value is communicated to the adder 1222 for its use.

During this process, the Euclidean distance for the template relative to the sample is being computed via the differencing means 1223, 1224, 1225 and 1226 in conjunction with the scaler/adder 1228. The use of a scaler in which the resultant is divided by a constant factor or otherwise decreased prevents the overflow in the addition from occurring.

The resultant from the scaler/adder 1228 is communicated to the adder 1222 and a four bit number is generated therefrom. This four bit number is communicated to the next frame architecture.

Eventually an output 1205 (FIG. 12a) is generated which is indicative of the score for the previous sequence of sample data achieved relative to the template.

FIG. 13 is a block diagram of a word recognition apparatus. The operator generated input 1301 is communicated to the microphone 1302 where it is translated into an electronic signal.

Details of the LPC analyzer 1303 have been explained previously. The LPC-10 analyzer 1303 generates reflection coefficients which are communicated to a suitable controller 1304, a TMS 7000 microprocessor in this drawing, available from Texas Instruments Incorporated of Dallas, Tex. The controller 1304 compares the generated data to templates and chooses what is recognized as the word of the original input 1301.

A memory means 1306 such as a ROM is connectable to the controller 1304 so as to expand the repertoire of recognizable words. In this manner the repertoire of the apparatus is changed simply by the attachment/detachment of a suitable ROM.

FIG. 14 is a flow chart of a method of determining the proper template which optimally matches the input of the speaker. After the start up 1401, speech is generated and received by the apparatus 1402. The autocorrelation terms are generated at 1403 from this data.

Comparison is then made through the N templates, 1404 by determining the Euclidean distance 1405 with respect to a particular template and comparing to see if the minimal distance has been found 1406. If the minimal distance is found, an indicia representative thereof is stored 1407; otherwise, the next template is considered by looping back to 1404. Upon termination of the examination of all of the templates, the stored indicia is used to accordingly alter the operation 1407.

FIGS. 15a, 15b and 15c illustrate the computation of the Euclidean distance between an input at each of the five templates given as examples. For ease in illustration it is assumed that each word takes five frames and an LPC-1 (only one value per frame) is utilized. The discussion herein is readily extendable to multifilter and a large number of templates.

Each word 1501 is comprised of five frames of data 1502, 1503, 1504, 1505 and 1506. The input 1507 is compared with each frame of each word and an absolute distance is determinative thereof. For example, for word #3, 1508, the distances in the first frames are "3" (1509), "1" (1510), "1" (1511), "0.5" (1512), and "2.5" (1513). Hence the total Euclidean distance for word #3 is the sum of $3+1+1+0.5+2.5=8.0$. By determining the Euclidean distance, a best match is possible.

FIGS. 16a, 16b, 16c, and 16d illustrate a method of determining which word has the minimal Euclidean distance value in a minimal number of computational steps. In the first step, FIG. 16a, each first frame Euclidean distance is compared. The word having the minimal value therein is chosen; in this case word #2 (1601) with a value of "0" (1602) is chosen. This word is pursued by adding on the next distance until its total value exceeds any of the prior values. In this example word #2 is pursued to the second frame giving a value of "1" (1603) which exceeds the value of 0.5 (1609). Word #1, the current lowest is thereafter pursued until its summed total (1604) exceeds the minimal value previously analyzed.

In this manner of considering only a possible minimal in its summation value, the number of summations which must be performed to determine the optimal match (1608) is minimized. This eliminates many arithmetic operations which must be performed and still derives the optimal best match in the recognition of the input.

FIG. 17 is a pictorial diagram of a speech recognition apparatus in a hand held situation. In this apparatus, the speech recognition is utilized for the operation of a calculator function. The microphone 1702 receives the spoken operator commands and translates these into control signals for operation of the hand held calculator 1705.

The hand held calculator 1705 additionally communicates with the operator via the speaker 1703 which requires a synthesis means (not shown). A visual display 1701 is also included in the hand held calculator 1705 for communication of information to the operator. Keyboard 1704 allows the operator to manually input data as well as orally input data.

In this application, the operator is allowed to verbally communicate commands to the hand held calculator and thereby control its operation. The operation, once completed, is communicated back to the operator via the speaker 1703 which typically indicates the final product from the arithmetic operation.

FIG. 18 is a flow chart of an embodiment of the pronunciation tutor. Once start up 1801 has occurred, a word is chosen, 1802, from the memory.

This chosen word is communicated to the operator, 1803, through either a visual display, a synthesized message, or other such means. The operator attempts to pronounce the chosen word 1804. The apparatus determines the parameters associated with the speech input via its analysis, 1805, (previously discussed at length). These parameters are compared to a threshold level, 1806, to generate a score value upon the pronunciation relative to the chosen word. If the pronunciation is of good enough quality 1807 (below threshold), a praise message 1808, is given to the operator as well as the score. If the pronunciation did not make a good enough score 1807 (above the threshold), a correction message, 1809, containing particulars as to the deficiency of the attempted pronunciation, the score, as well as other pertinent data is given.

In one embodiment of the invention, the original word is synthesized as well as the imitation or attempt by the operator. This allows the operator to analyze his attempt relative to what is considered proper pronunciation. If it is the first attempt at the word, 1810, the operator is given another chance at the word and the apparatus communicates the word once again to the operator, 1803. If it is the second attempt, the operator is not given another chance and a new word is chosen. In this fashion a word which is particularly troublesome to the operator is not repetitively asked so as to frustrate and alienate the operator.

This structure allows the apparatus to choose a word for pronunciation and to communicate it for operator imitation. The operator is given his score so as to determine his quality of imitation as well as another chance should the quality not be sufficient. Through the use of plug-in modules, the repertoire of words is expandable so as to meet the particular needs of the student/operator. In one embodiment of the pronunciation tutor, the modules contain foreign language words or highly specialized words with which the study is to become familiar.

FIG. 19 is a flow chart of an embodiment of the sentence score apparatus. Once start up has occurred, 1901, the operator is able to input words 1902 which generate, via the analysis and recognition circuits already discussed, an initial identification, 1903.

The initial identification checks to see if a threshold level of identification has been met. If the input so fails, a prompt message 1905 is communicated to the operator so as to allow the operator to re-input the word 1902. If a proper identification of the word has been made 1904, it is stored, 1906. This process is continued, 1907, until the end of the sentence has been determined which triggers the apparatus to recall the entire sentence identification string, 1907.

A score on the matching of the entire sentence 1908, is made which preferably includes the timing and stress made by the operator. If a good pronunciation 1909 is made, a praise and score are communicated to the operator, 1910; otherwise, the correction message 1911, together with the proper pronunciation is communicated, 1912, to the operator.

In this fashion, the operator is able to state an operator developed sentence and have it analyzed and scored by the apparatus. This is particularly useful where the operator wants to vary the input at his will.

It is clear from the foregoing that other alternative methods exist which allow the operator to pronounce a word, in a sequence, so as to generate a phrase or sentence and have the entire phrase or sentence evaluated and scored. This allows the operator to state standard phrases and have them scored based upon his pronunciation ability.

FIG. 20a is a block diagram of the translation from a host speech input to a non-host speech output. The original host speech 2024 is accepted by an allophone recognizer 2025 which utilizes the allophone templates 2026 in the generation of an allophone sequence therefrom. This allophone sequence is utilized together with a dictionary 2028 in a word construction operation 2027.

In constructing each individual word, the word construction operation 2027 utilizes the dictionary 2028 which contains a mapping set of allophones to words. In this manner, the sequence of allophones is separated into its component parts which constitute the words within the original speech. Once the words have been so separated, they are placed in sequential order to perform the sentence.

This sentence is communicated to the contextual adjustment 2029 for maintaining the integrity of the original speech. This integrity is maintained by determining the proper spelling for homonyms and also for sound alike words. As noted before, this operation maintains the integrity of the original speech so that its contents are not diluted.

The words in the host language are communicated to a word-to-word look-up table 2030. The word-to-word look-up table 2030 maps from the host language to the non-host language and generates a sequence of words in the non-host language. This sequence must be contextually adjusted, 2031, so as to maintain the integrity in the non-host language as well. This contextual adjustment, 2031, allows for the transmutation of a sentence or the retention of egomatic speech from the original host language to the non-host language. In this manner an idiom phrase such as "you're pulling my leg" should not be translated to a foreign human language in a word for word manner; that is, an idiomatic phrase in the foreign language should alternatively be used. Obviously this adjustment is not necessary where the non-host language is a mechanical control signal.

The non-host sentence is communicated to an allophone stringer 2032 which utilizes an allophone library 2033 for the generation of an allophone string. This allophone string is communicated to a synthesizer 2034 for the generation of speech 2035 in the non-host language.

This particular embodiment is particularly adaptable for acceptance of a textual message 2036 prior to the word-to-word look-up table 2030. This addition allows for the withdrawal of textual material 2037 after it has been appropriate adjusted in the non-host language. In this manner, the operator is able to type in a particular sentence and have it translated into the proper foreign language for subsequent print out.

It is obvious from the above that the present embodiment of the translator allows for easy entry, whether by speech or by keyboard entry, of the host language which is readily translated into a non-host language.

FIG. 20b is a flow chart of an embodiment of the translator. Once the start has occurred 2001, the operator is able to state a sequence of words. Each word is entered, 2002, and is matched to the host language, 2003. In this context the use of the phrase "host language" is used to signify the language in which the operator originally generates the word. The matching to the host language is done via any of the methods previously discussed.

Indicia representative of the match is stored, 2004, and an end of phrase or sentence is determined. If the end of phrase has not occurred, the next incoming word is analyzed and matched as discussed; otherwise, the entire sequence is retrieved from storage, 2006.

The sequence of words which have been identified is contextually adjusted, 2007. Contextual adjustment allows for words which sound alike but have different meanings to be mapped to different words. In this context the word "blue", although recognized as being the same word as "blew" does not have the same meaning. The contextual relationship within the sequence of words indicates whether an adjective (blue) or a verb (blew) is proper. This contextual adjustment, 2007, is particularly important where the true meaning of the sequence of words is to be maintained.

Once the sequence of words has been contextually adjusted, it is translated to a non-host or foreign language 2008. The foreign language or non-host language includes both human foreign language and machine operable language. In this context, the foreign language so translated is outputted in the foreign language 2009, and the translation apparatus returns to again listen for a new sequence of words to be spoken by the operator.

It is clear that the operator is therefore able to input the specific sentence and have it translated into a foreign language. Hence, the operator is able to say "go to the house" and have it translated properly into "va' a la casa" and not have a misinterpretation as to the proper translation of the word "to".

Besides human foreign language, the non-host language includes operational commands which are communicated, for example, to an electro-mechanical device for control thereof. This operation allows the operator to vocally input data which is translated into a non-host language, for example, typewriter control signals, which causes the electro-mechanical device to operate appropriately. Therefore, the operator is able to state "go to the house" and have the phrase "go to the house" be typed on the page.

FIG. 20c is a flow chart diagram in which a plurality of possible templates are stored for each word and then are contextually adjusted to fit the sequence of words. After start up 2010, a particular word is received, 2011, and compared to the first template within the library, 2012.

A distance measurement, as discussed before, is made relative to the template in question, 2013. If the distance is within a threshold level, 2014, it is stored for later analysis, 2015; otherwise it is not stored. Afterwards a determination is made if all templates have been considered, 2016, and if more need to be considered the template is withdrawn, 2017, and again matched to the input, 2013.

Once all of the templates have been considered for a particular word, a determination is made as to whether it is the end of the phrase or sentence, 2018. If it is not the end of the sentence, the apparatus returns to accept a new word, 2011; otherwise the sequence so stored is withdrawn from memory, 2019. The sequence stored in memory is then contextually adjusted, 2020, thereby eliminating a plurality of choices for a particular word and determining a sequence which is contextually pure.

Once it is adjusted, it is translated to a non-host language, 2021, and outputted, 2022, in the non-host language. Thereafter the operation terminates, 2023.

In this operation, the operator is able to state a sequence of words, typically a sentence, and be assured that although its pronunciation is closer to a particular template than to the template desired, the apparatus, through its contextual adjustment, does not ignore the desired template but rather takes the entire sequence of words in context. This allows the operator to input the statement "turn on the light" and although he mispronounces the word "light" ever so slightly, it will not be confused with the sequence "turn on the blight".

FIG. 21 is a block diagram of the translator. The operator is able to speak into a microphone 2101 which is coded 2102 in any of the fashions so far discussed.

The controller 2103 utilizes the signals in conjunction with a memory 2104 for contextually maintaining the integrity of the sentence. Memory 2104 is composed of two parts, the memory templates 2105 constituting the individual words, and the memory grammatical rules 2106, which are used to maintain the contextual meaning within the sentence.

As long as the contextual meaning is maintained, the sequence of words has not lost their true controllability. In this manner, the contextually maintained sentence or phrase is usable for control of a synthesizer 2107 in the generation, via speaker 2108, of a analog output 2109. The user is able to translate into a non-host language and have it synthesized for the listener immediately after the speech input.

Additionally the non-host language includes the ability to be communicated to a electro-mechanical device 2110 for the generation of typing. Other electro-mechanical devices may include an orally controllable elevator or other such device.

It is clear from the foregoing, that the translator provides a complete interface since the contextual meaning of the word has not been lost in analysis and matching.

FIG. 22 is a flow chart embodiment of the voice actuation apparatus. After the start up 2201, the voice input 2202 is received by the apparatus. A determination, 2203, is made on whether it is noise or whether it is a true voice input. If it is noise, the apparatus returns to seek a further input 2202; otherwise, the input is matched to a template, 2204, which is used to determine if a match is made with the proper security identification, 2205.

If a valid match does not occur, a failure flag 2208 is set for later reference; otherwise, a determination is made as to whether an end of input 2207 has occurred. If the input or sequence of data has not been completed, a return for input 2202 is made; otherwise the locking combination has been completed.

Upon completion of the input sequence, a determination is made based on the failure flag state, 2209. If it has been set, a failure message 2210 is communicated to the operator. This failure message includes a buzzer or a voice synthesis message communicating a default.

If the failure flag has not been set, 2209, this indicates that the input has been accepted and access to the electrical apparatus is permitted. In this situation a pass message, 2211, is communicated to the operator indicating a proper input and the state of the electrical apparatus is changed, 2212.

In this embodiment of the invention, the entire operation ceases, 2213, at this point; but, in alternate embodiments, a loop is made back to the input 2202 so as to provide additional sequential operations in the same manner.

This operation allows for the input of a command sequence for security identification. This "combination lock" arrangement provides for a plurality of words to be necessary for access to the electrical device.

In FIG. 23, a flow chart of a single word access embodiment is illustrated. Upon the start, 2301, the voice input 2302 is accepted. If the input is noise, 2303, a loop is made back to search for more input, 2302; otherwise, the input is matched to the best template available, 2304. If this template is not within a threshold level (indicative of an unidentifiable person trying to gain access) a loop is made back for input 2302; otherwise, the state of the electronic apparatus is changed, 2306. Afterwards a loop is made back so as to seek more input, 2302. In this fashion, the apparatus continues to monitor for voice inputs and act accordingly.

This embodiment allows for the voice control of a remote device and to change the states therein solely by voice commands. The comparison to the threshold level allows the apparatus to be speaker determinative so as to not recognize or act upon the non authorized speaker.

This operation is particularly well suited for adversary type games or for security access so as not to allow but a single speaker or a selected group of speakers access to the apparatus.

FIGS. 24a and 24b are illustrative of the speaker activation invention. In FIG. 24a, an electronic game is being played between two contestants who are directing their respective tanks in a combat situation. Each contestant is able to control his tank alone through a voice command. In this fashion, speaker 2401 in stating "reverse" is able to address tank 2402 and not tank 2403. Speaker 2404 is able to direct only tank 2403. The contestants are able to vocally control their respective apparatus; the apparatus is not confused by commands from the other contestant.

In FIG. 24b, a remote activation apparatus is illustrated. In this embodiment, an operator 2406 is able to vocally state a command, "lights on", and have the light of a lamp 2407, activated through the recognition apparatus, not shown. The recognition apparatus utilizes a microphone 2408 in receipt of the vocal command. The light of the lamp 2407 is powered by an external power source 2409, illustrated here as a wall plug-in.

In this fashion, the operator is able to enter a darkened room and activate a light without knowledge as to location of the light or manual switches.

Referring to FIG. 25, a block diagram of an embodiment of the telephone answering apparatus is illustrated in which a remote telephone 2509 communicates with an interface 2501. The interface 2501 communicates with a microprocessor 2502. The microprocessor 2502 acts as a controller of the apparatus. The microprocessor 2502 communicates with the other components within the answering apparatus via a bus 2506.

In this embodiment, the microprocessor 2502 communicates the control signals necessary for a synthesizer 2503 to communicate a message via the interface 2501 back to the remote telephone 2509. In a similar fashion, analysis means 2504 performs an analysis upon the incoming messages from the remote telephone 2509 via the interface 2501. The analysis means 2504 utilizes a memory RAM 2505 in its operation. Analysis means 2504 communicates to the microprocessor 2502 via the bus 2506.

If the connection is to be made to the local telephone 2510, interface 2507 is activated by the microprocessor 2502. Keyboard 2508 allows for entry of operator selected commands. These commands include the selective retrieval of messages stored within RAM 2505 based upon key words or other such indicia. This architectural arrangement allows for receipt of an incoming message and its analysis in operation based thereon. Connection to the local telephone is conditioned upon the incoming message meeting certain criteria; additionally, the incoming message is stored in RAM after it has been appropriately analyzed. The operator is able to selectively withdraw any message within the RAM upon entry of the keyboard.

Entry of voiced input from the local telephone allows for addressing the RAM, not through the keyboard, but through the normal microphone of the telephone therein.

FIGS. 26a and 26b are flow charts of two embodiments of the selective connection characteristics of the telephone answering apparatus. In FIG. 26a the start, 2601, allows for an interrupt 2602, from the remote transmitter. A message 2603, is communicated to the remote transmitter. A unit of time is clocked off, 2604, and a determination of whether or not the remote transmitter is still connected to the answering apparatus, 2605 is made. If connection remains, the buzzer on the local telephone 2606, is activated for alarm and connection of the remote transmitter to the local receiver. Afterwards the operation stops, 2607.

If the remote transmitter disconnects during the time period, the operation similarly stops, 2607.

Another embodiment of selective connection is illustrated in FIG. 26b. After start-up, 2608, an interrupt is determined, 2609, followed by a message, 2610, communicated to the remote telephone. Input, 2611, is received from the remote telephone and an analysis, 2612, is performed thereon.

If the input corresponds to the selected word, "emergency", 2613, the buzzer on the local telephone, 2614, is activated and a connection is made therebetween; otherwise the message is stored, 2615, for later retrieval by the operator of the local telephone. Thereafter the operation stops 2616.

This structure allows for the input of messages from the remote transmitter and their selective connection if an emergency situation exists. It is obvious to those skilled in the art that other sources of interrupts besides emergencies are allowable by this embodiment.

FIGS. 27a, 27b, and 27c are flow charts of the operation of the telephone answering apparatus for the selective withdrawal of messages based upon their key words.

In FIG. 27a, the start, 2701, allows for the input, 2702, of key words by the operator of the local receiver. Each key word is stored, 2703, and the operator is prompted if more key words are requested, 2704. If more key words are to be entered, the operation feeds back to entry of the keyword 2702; otherwise the input operation illustrated in FIG. 27a terminates, 2705.

In operation, FIGS. 27b starts, 2706 and receives an interrupt, 2707 from a remote telephone. A message, 2708, is communicated to the remote telephone, followed by input, 2709 of the auditory message from the remote telephone. Analysis, 2710, is performed upon the incoming message and an indicia therefrom is stored, 2711. An end of message, 2712, is determined. If it is not the end of message, a loopback for receipt of the new word, 2709, is made; otherwise, the indicia within the message are checked with the keyword library, 2713, for the key words which have been previously stored as described in FIG. 27a. The sequence of indicia for the message and flags associated therewith (indicative of keywords therein) are stored, 2714. Thereafter, the operation stops, 2715.

The operation of FIG. 27b is repetitively performed for each incoming message so as to provide a library of messages with flags.

FIG. 27c illustrates the selective retrieval based upon the flags generated for each sequence of messages. The start, 2716 is followed by the input by the operator of the local receiver of the key word desired, 2717. The messages having the selected key word, 2718, are retrieved from memory and communicated to the local operator, 2719.

Communication of the message is preferably by way of synthesis of the message based upon the sequence of indicia associated with the message. Thereafter the operation stops, 2720.

It is obvious from FIGS. 27a, 27b, and 27c that the operation therein provides for the operator selection of key words, the entry of messages and flagging of messages according to these key words and the selective retrieval of the local receiver operator of these messages associated with the key words. This operation permits high priority messages to be addressed first and not in a first-in-first-out arrangement.

FIG. 28 is a block diagram of an embodiment of the spelling learning aid. The operator inputs the oral speech via the microphone 2804 which communicates its electronic signals to the speech analyzer 2805. The speech analyzer 2805 generates synthesis control data which is stored in RAM 2807 via bus 2806. Entry via the keyboard 2802 as communicated to the controller 2803 provides the second part of each set of data. The entry from keyboard 2802 is stored within the RAM 2807 in the appropriate location so as to be associated with synthesis control data. A plurality of synthesis control data and keyboard entry data is stored within the RAM 2807.

Display 2801 allows for feedback of operator input and also for prompting of the operator by the controller 2803.

In the testing mode, the controller 2803 withdraws a selected one of the synthesis control data and its associated characters. This information is communicated via bus 2808 to the controller 2803 which utilizes the synthesis control data with the speech synthesizer 2810 in control of the speaker driver 2811 and generates a speech output via the speaker 2812. This enunciates the word or sound.

ROM 2809 additionally provides program instructions and messages for use by the controller 2803 in its interaction with the operator.

In this fashion, the controller 2803 is able to synthesize the word based upon the original input by the operator via microphone 2804. The operator attempts to spell the word via the keyboard 2802. The attempted spelling is compared with the correct spelling as stored in RAM 2807 and a score based thereon is derived. If the score is good, a positive reinforcing message is given; otherwise a negative message is given and the operator is preferably given another attempt at spelling the word. Preferably if the operator fails to spell the word in two attempts, the apparatus spells the word via the visual display and an auditory prompting message via the speech synthesizer 2810 is given.

The present apparatus allows for the creation of a repertoire of problems which are tailored to the specific operator/student needs.

FIG. 29 is a flow chart diagram of the operation of the spelling learning aid. After start, 2901, the operation selected by the operator is inputted, 2902. A determination on the operation chosen, 2903 is made. If the operation chosen is for data entry, the operator inputs the oral word, 2904 which is analyzed, 2905 to generate synthesis control data. This synthesis control data is stored, 2906. The operator inputs the correct spelling, 2907, for the oral input. The correct spelling is stored with the parameters generated from the oral input, 2908.

A determination is made if another word is requested. If more words are to be entered to expand the repertoire even more, a return is made to allow the operator to speak another word, 2904; otherwise, a determination is made if the operator desires to enter the test mode, 2910. If the operator does not desire to enter the test mode, the apparatus terminates operation, 2911; otherwise the apparatus returns to choose a word from memory, 2912. The word from memory is also initiated after initial start-up in the determination of which operation, 2903 is requested by the operator.

Once the word set is chosen from memory, 2912, the operator is prompted, 2913, by the apparatus speaking the word. The operator attempts to spell the word, 2914, which is used in comparison with the correct stored spelling, 2915. The correctness of the spelling is then determined, 2916. If the spelling is correct, a positive message, 2920 is given. After the positive message is given, a determination as to whether the operator desires to continue in the test mode, 2921 is made. Continuance in the test mode requires the production of another word from memory, 2912; if no more testing is desired by the operator, the operation terminates, 2911.

If, however, the spelling by the operator was incorrect, as derived by the decision 2916, a negative message, 2917 is given to the operator. A negative message includes "that was incorrect for the word_____" in which the appropriate selected word is spoken in the blank.

A determination is made if it is the first attempt, 2918, by the operator to spell the selected word. If it is the first attempt, the operator is again prompted through an oral prompt, 2913, to enter the spelling of the word; otherwise, the correct spelling is given to the operator, 2919. After the correct spelling a determination is made if the operator wishes to continue in the test mode, 2921. As noted earlier, continuation in the test mode requires the selection of another word from memory, 2912; otherwise the operation terminates, 2911.

It is clear from the foregoing, that the operator is able to input his repertoire of problems to be solved and have the apparatus select one of these problems for operator attempt. This application allows for the learning aid to be tailorable to the specific need and desires of the operator/student.

We claim:

1. An electronic apparatus comprising:

memory means having digital data stored therein including a first plurality of digital speech data templates respectively representative of synthesized speech in a host language as grouped in speech segments of the host language, and a second plurality of digital data templates representative of a non-host language and having corresponding counterparts in said first plurality of digital speech data templates representative of synthesized speech in the host language;

operator input means including at least speech input means for receiving at least one word as spoken speech from an operator, said speech input means converting the operator-generated speech into an analog speech signal representative of a sequence of speech segments spoken by the operator;

speech analysis means operably connected to said operator input means for analyzing said analog speech signal and generating a sequence of speech data sets representative thereof;

control means operably connected to said speech analysis means and to said memory means and including speech recognition means for matching each respective speech data set from said speech analysis means with a particular digital speech data template of said memory means in response to the respective speech data set and the remaining speech data sets within said sequence of speech data sets and providing as a control signal output the digital data template of said second plurality of digital data templates representative of the non-host language; and output means coupled to said control means for receiving the control signal output therefrom.

2. An electronic apparatus as set forth in claim 1, wherein said memory means includes allophone library means in which digital signals representative of allophone-defining speech parameters identifying the respective allophone subset variants of each of the recognized phonemes in the host language as modified by the speech environment in which the particular phoneme occurs are stored, said allophone library means being responsive to said speech recognition means of said control means to provide digital signals representative of the particular allophone-defining speech parameters corresponding to a respective speech data set from said speech analysis means.

3. An electronic apparatus as set forth in claim 2, wherein said allophone library means includes stored digital signals representative of allophone-defining speech parameters identifying the respective allophone subset variants of each of the recognized phonemes in at least one non-host language in addition to the host language ad modified by the speech environment in which the particular phoneme occurs.

4. An electronic apparatus as set forth in claim 1, wherein said memory means further includes a memory portion containing digital signals representative of grammatical rules and respectively determinative of the appropriate location of a word in the host language in a word sequence in the host language, said memory portion operating in conjunction with said speech recognition means of said control means in matching each respective speech data set from said speech analysis means with a particular digital speech data template of said memory means so as to provide an appropriate sequence of speech data sets definitive of a particular word order in a given word sequence.

5. An electronic apparatus as set forth in claim 1, wherein said output means comprises speech synthesizer means coupled to said control means for receiving the control signal output therefrom in the non-host language and providing analog signals representative of synthesized speech in the non-host language; and audio output means operably connected to the output of said speech synthesizer means for receiving said analog signals representative of synthesized speech in the non-host language to produce audible synthesized speech in the non-host language.

6. An electronic apparatus as set forth in claim 5, wherein the non-host language is a foreign language such that the control signal output comprises digital data representative of the foreign language equivalent of the spoken speech input from the operator at said operator input means.

7. An electronic apparatus as set forth in claim 1, wherein said output means comprises an electro-mechanical apparatus, and said non-host language comprises a command as a control signal output to said electro-mechanical apparatus for regulating the operation thereof.

8. An electronic apparatus as set forth in claim 7, wherein said electro-mechanical apparatus is a typewriter.

9. An electronic apparatus as set forth in claim 1, further including means operably associated with the output of said control means for converting the character of said control signal output therefrom into a programming language instruction set for reception by said output means.

10. An electronic apparatus as set forth in claim 1, wherein said memory means includes dictionary means in which digital speech data is stored comprising at least first and second tables of digital speech data representative of speech segments in a host language and in a non-host language; and said control means being responsive to the matching of each respective speech data set from said speech analysis means with a particular digital speech data template in said memory means corresponding to digital speech data included in said first table of said dictionary means for providing as a control signal output the digital speech data included in said second table of said dictionary means and comprising the non-host language equivalent to the host language.

11. An electronic language translator comprising:

memory means having digital data stored therein including a first plurality of digital speech data templates respectively representative of synthesized speech in individual words of a host language, and a second plurality of digital data templates respectively representative of synthesized speech in individual words of a non-host language and having corresponding counterparts in said first plurality of digital speech data templates representative of synthesized speech in individual words of the host language;

said memory means further including a memory portion having digital data stored therein representative of a plurality of grammatical rules relating to the syntactical significance of word sequences in the host and non-host languages and being determinative of the location of a given word in a word sequence occurring in the host and non-host languages;

operator input means including at least speech input means for receiving at least one word as spoken speech in the host language from an operator, said speech input means converting the operator-generated speech into an analog speech signal representative of a sequence of speech segments in the host language as spoken by the operator;

speech analysis means operably connected to said operator input means for analyzing said analog speech signal and generating a sequence of speech data sets in the host language representative thereof;

control means operably connected to said speech analysis means and to said memory means and including speech recognition means for matching each respective speech data set from said speech analysis means with a particular digital speech data template of said memory means in the host language in response to the respective speech data set and the remaining speech data sets within said sequence of speech data sets as determined by said memory portion in which said digital data representative of grammatical rules are stored;

said control means being responsive to a matched sequence of speech data sets in said host language as determined by said speech recognition means for accessing digital data templates from said memory means representative of the non-host language equivalent to the matched first plurality of digital speech data templates in the host language and providing the digital data templates representative of the non-host language as a control signal output therefrom;

the non-host language being a foreign language such that the control signal output comprises digital data representative of the foreign language equivalent of the spoken speech input from the operator at said operator input means; and output means coupled to said control means for receiving the control signal output therefrom and communicating the control signal output to the operator as the foreign language equivalent of the spoken speech input.

12. An electronic language translator as set forth in claim 11, wherein said output means comprises speech synthesizer means coupled to said control means for receiving the control signal output therefrom as digital data representative of the foreign language equivalent of the spoken speech input from the operator at said operator input means and providing analog signals representative of synthesized speech in the foreign language; and audio output means operably connected to the output of said speech synthesizer means for receiving said analog signals representative of synthesized speech in the foreign language to produce audible synthesized speech in the foreign language.

* * * * *